United States Patent
Bruneel

(10) Patent No.: US 9,903,133 B2
(45) Date of Patent: Feb. 27, 2018

(54) UNDERWATER CLEANER

(71) Applicant: KOKIDO DEVELOPMENT LIMITED, Kowloon (HK)

(72) Inventor: Jean Julien Bruneel, Hong Kong (CN)

(73) Assignee: KOKIDO DEVELOPMENT LIMITED, Kowloon (HK)

(*) Notice: Subject to any disclaimer, the term of this patent is extended or adjusted under 35 U.S.C. 154(b) by 0 days.

(21) Appl. No.: 15/146,408

(22) Filed: May 4, 2016

(65) Prior Publication Data

US 2016/0326763 A1 Nov. 10, 2016

Related U.S. Application Data

(60) Provisional application No. 62/158,779, filed on May 8, 2015.

(51) Int. Cl.
*E04H 4/16* (2006.01)
*C02F 1/00* (2006.01)
*C02F 103/42* (2006.01)

(52) U.S. Cl.
CPC .............. *E04H 4/1672* (2013.01); *C02F 1/00* (2013.01); *E04H 4/1636* (2013.01); *C02F 2103/42* (2013.01)

(58) Field of Classification Search
CPC ....... E04H 4/1672; E04H 4/1636; C02F 1/00; C02F 2103/42
USPC ........ 210/167.16, 167.17, 232, 416.2; 15/1.7
See application file for complete search history.

(56) References Cited

U.S. PATENT DOCUMENTS

| | | |
|---|---|---|
| 3,225,930 A | 12/1965 | Willinger |
| 3,667,084 A | 6/1972 | Valbona et al. |
| 3,695,006 A | 10/1972 | Valbona et al. |
| 3,755,843 A | 9/1973 | Goertzen, III et al. |
| 3,758,914 A | 9/1973 | Nupp et al. |
| D239,243 S | 3/1976 | Hachtmann et al. |
| 4,011,624 A | 3/1977 | Proett |
| 4,171,169 A | 10/1979 | Williams |
| 4,209,875 A | 7/1980 | Pugh et al. |
| 4,240,173 A | 12/1980 | Sherrill |
| D264,139 S | 4/1982 | Pearman, Jr. |
| D266,962 S | 11/1982 | Hachtmann et al. |

(Continued)

FOREIGN PATENT DOCUMENTS

| | | |
|---|---|---|
| CA | 2505438 | 11/2005 |
| EP | 1579096 | 2/2008 |

(Continued)

OTHER PUBLICATIONS

U.S. Appl. No. 15/146,272 to Jean Julien Bruneel, filed May 4, 2016.

*Primary Examiner* — Fred Prince
(74) *Attorney, Agent, or Firm* — Greenblum & Bernstein, P.L.C.

(57) ABSTRACT

An underwater cleaning apparatus includes a front body having a filter and a rear body removably attachable to the front body. The rear body includes a motor having a shaft, an impeller configured to draw in water through an inlet opening in the front body, and a gap. The impeller is positioned in the gap in the rear body. A lock is configured to secure the rear body to the front body. A battery is configured to supply electrical power to the motor to drive the shaft and a power switch is configured to control the supply of electrical power to the motor.

38 Claims, 31 Drawing Sheets

(56) References Cited

U.S. PATENT DOCUMENTS

| | | |
|---|---|---|
| 4,513,470 A | 4/1985 | Toya |
| 4,642,841 A | 2/1987 | Berfield et al. |
| 4,644,605 A | 2/1987 | Joss et al. |
| 4,745,654 A | 5/1988 | Yamamoto et al. |
| D296,372 S | 6/1988 | Toney et al. |
| 4,876,763 A | 10/1989 | Cho et al. |
| 4,920,608 A | 5/1990 | Hult et al. |
| 4,924,548 A | 5/1990 | Touya et al. |
| 4,935,980 A | 6/1990 | Leginus et al. |
| 4,944,101 A | 7/1990 | Goble |
| 4,962,559 A | 10/1990 | Schuman |
| 5,105,505 A | 4/1992 | Reed, Jr. |
| 5,134,751 A | 8/1992 | Reed, Jr. et al. |
| 5,263,224 A | 11/1993 | Lovelady |
| 5,311,631 A | 5/1994 | Smith, Jr. |
| 5,317,776 A | 6/1994 | DeMoura |
| D355,058 S | 1/1995 | Phelan |
| 5,423,102 A | 6/1995 | Madison |
| 5,450,646 A | 9/1995 | McHugh et al. |
| D373,230 S | 8/1996 | Sebor et al. |
| 5,542,142 A | 8/1996 | Young |
| 5,599,401 A | 2/1997 | Brosky et al. |
| D379,690 S | 6/1997 | Howell et al. |
| D387,516 S | 12/1997 | Murray et al. |
| 5,787,546 A | 8/1998 | Bass et al. |
| D398,099 S | 9/1998 | Leung |
| 5,839,158 A | 11/1998 | Schupp et al. |
| 5,867,861 A | 2/1999 | Kasen et al. |
| 5,869,947 A | 2/1999 | Zahuranec et al. |
| D406,420 S | 3/1999 | Sin |
| D420,774 S | 2/2000 | Schupp |
| 6,125,500 A | 10/2000 | Kat |
| 6,146,434 A | 11/2000 | Scalfani et al. |
| D443,959 S | 6/2001 | Leibson |
| D443,960 S | 6/2001 | Shimko et al. |
| 6,245,120 B1 | 6/2001 | Stanek |
| D453,246 S | 1/2002 | Nimmo |
| 6,347,428 B1 | 2/2002 | Shimko et al. |
| 6,572,711 B2 | 6/2003 | Sclafani et al. |
| D483,162 S | 12/2003 | Lausevic |
| D485,652 S | 1/2004 | Erlich |
| 6,687,952 B1 | 2/2004 | Mohan, Jr. |
| D487,826 S | 3/2004 | Supra |
| D490,195 S | 5/2004 | Rod |
| 6,797,157 B2 | 9/2004 | Erlich |
| 6,895,632 B2 | 5/2005 | Murray |
| 6,939,460 B2 | 9/2005 | Erlich |
| D518,253 S | 3/2006 | Erlich et al. |
| D522,191 S | 5/2006 | Erlich |
| D522,700 S | 6/2006 | Rademeyer |
| 7,060,182 B2 | 6/2006 | Erlich et al. |
| 7,178,188 B1 | 2/2007 | Jaakola |
| D538,986 S | 3/2007 | Ingram |
| D556,396 S | 11/2007 | Mah et al. |
| RE40,542 E | 10/2008 | Coburn et al. |
| D590,111 S | 4/2009 | Wiljanen et al. |
| D590,112 S | 4/2009 | Sun |
| 7,520,015 B1 | 4/2009 | Ajello |
| 7,636,975 B2 | 12/2009 | Mah et al. |
| D611,665 S | 3/2010 | Braithwaite |
| D621,112 S | 8/2010 | Benacquisto |
| D637,779 S | 5/2011 | Bruneel |
| D660,526 S | 5/2012 | Erlich et al. |
| D666,819 S | 9/2012 | Erlich et al. |
| 8,281,441 B1 | 10/2012 | Erlich et al. |
| D682,493 S | 5/2013 | Erlich et al. |
| D683,918 S | 6/2013 | Erlich et al. |
| D685,542 S | 7/2013 | Erlich et al. |
| 8,490,811 B2 | 7/2013 | Erlich et al. |
| D713,110 S | 9/2014 | Erlich et al. |
| 9,091,092 B1* | 7/2015 | Hui .................. E04H 4/1636 |
| D790,782 S | 6/2017 | Bruneel |
| 2001/0052165 A1 | 12/2001 | Anderson et al. |
| 2003/0101523 A1 | 6/2003 | Lepley, Jr. |
| 2004/0034962 A1 | 2/2004 | Thur et al. |
| 2004/0134022 A1 | 7/2004 | Murphy et al. |
| 2005/0081321 A1 | 4/2005 | Milligan et al. |
| 2005/0247613 A1 | 11/2005 | Bishop et al. |
| 2006/0085929 A1 | 4/2006 | Deklinski |
| 2006/0265820 A1 | 11/2006 | Erlich et al. |
| 2008/0109972 A1* | 5/2008 | Mah .................. E04H 4/1636 15/1.7 |
| 2015/0128361 A1 | 5/2015 | Erlich et al. |
| 2016/0060887 A1* | 3/2016 | Tryber ............... E04H 4/1654 15/1.7 |

FOREIGN PATENT DOCUMENTS

| | | |
|---|---|---|
| EP | 1921228 | 5/2008 |
| GB | 2015331 | 9/1979 |
| JP | S63-107714 | 5/1988 |
| WO | 2004/040083 | 5/2004 |

* cited by examiner

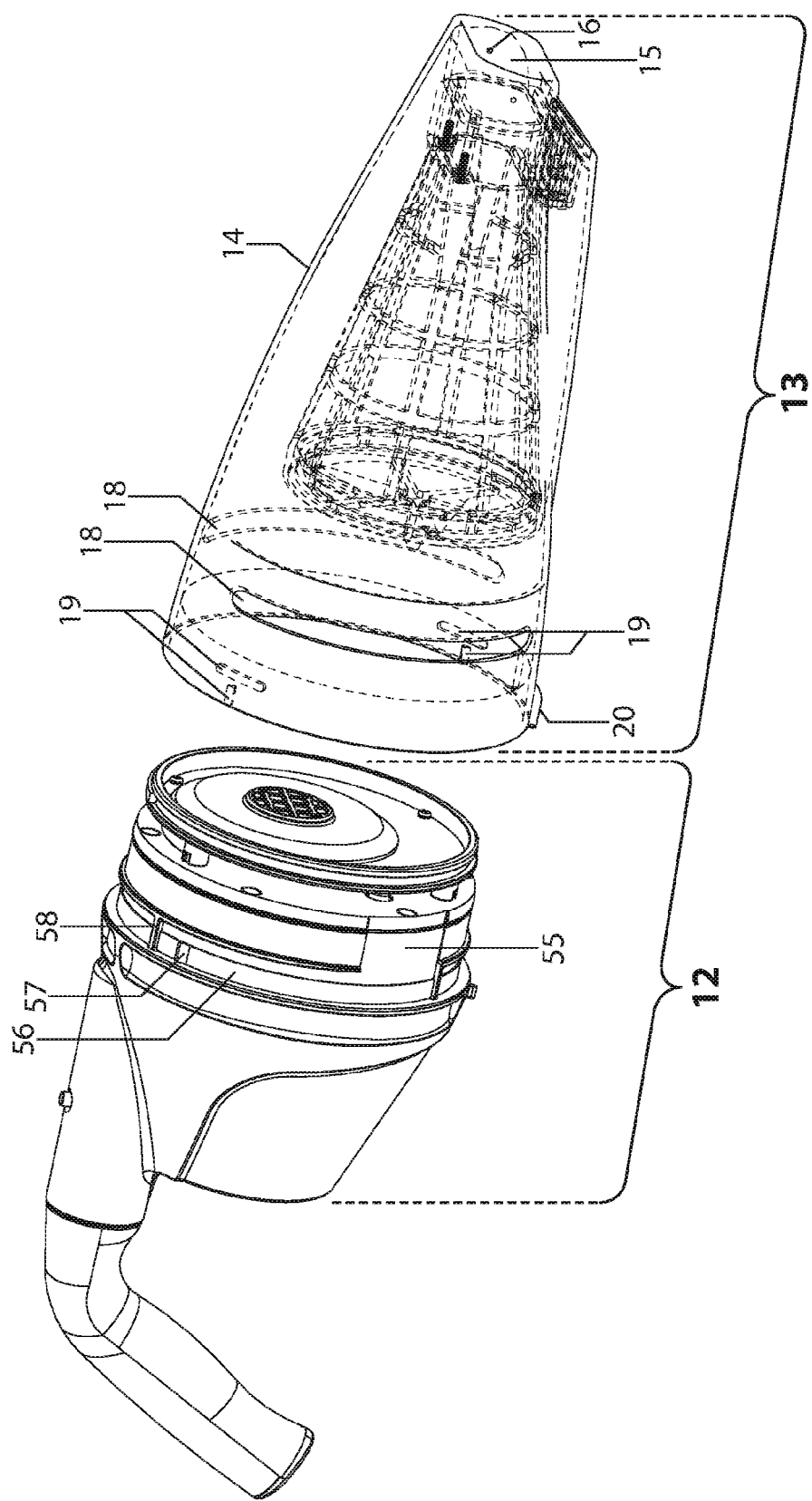

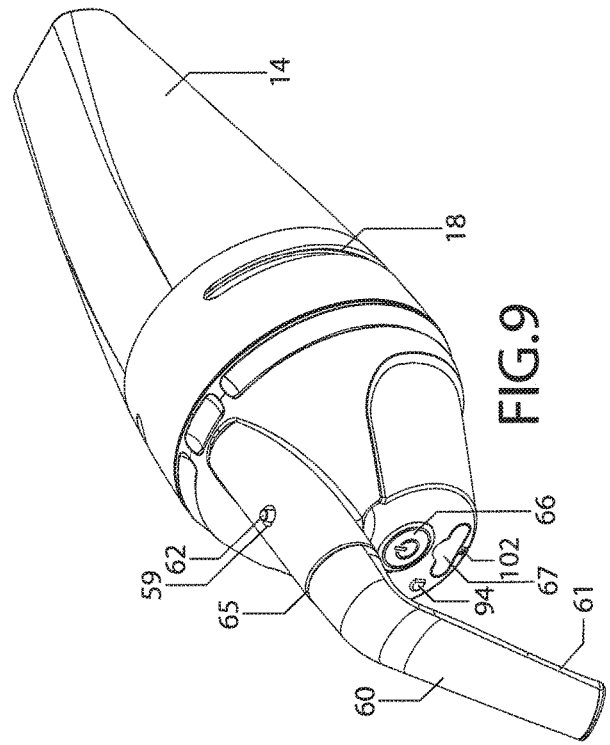
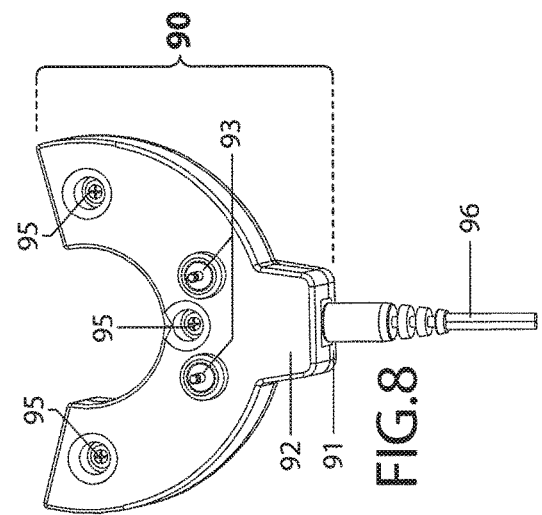
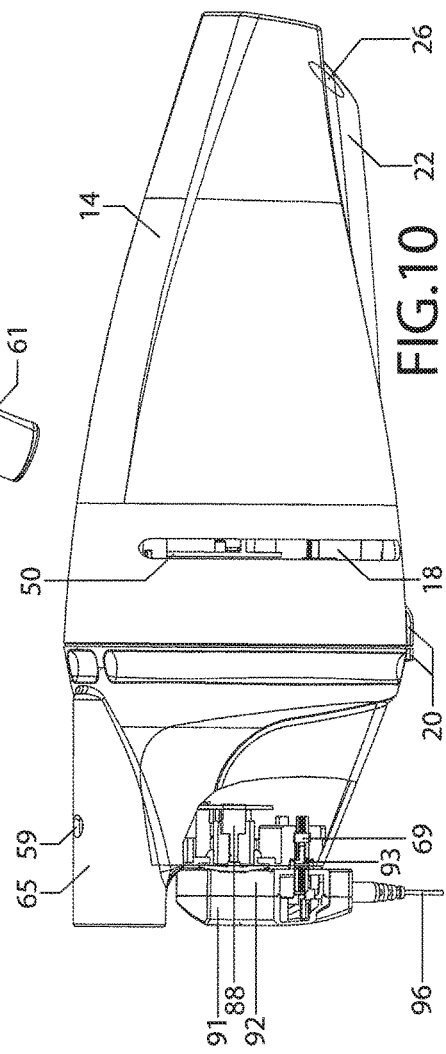

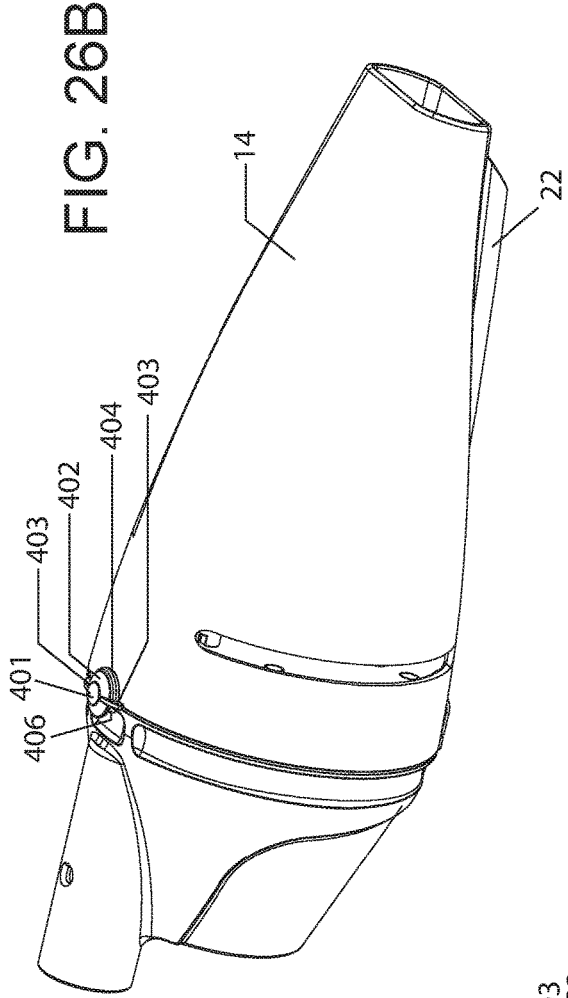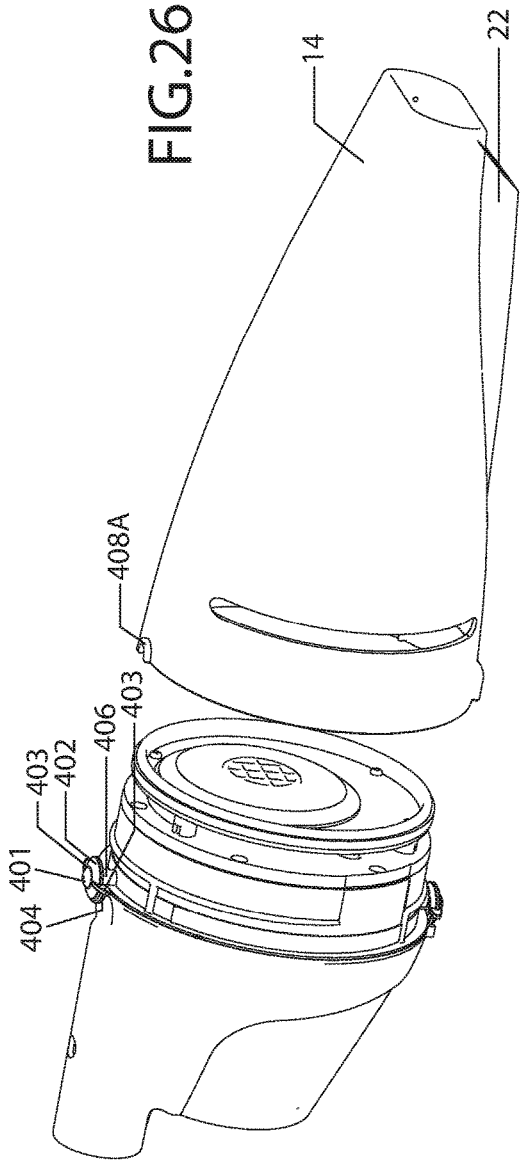

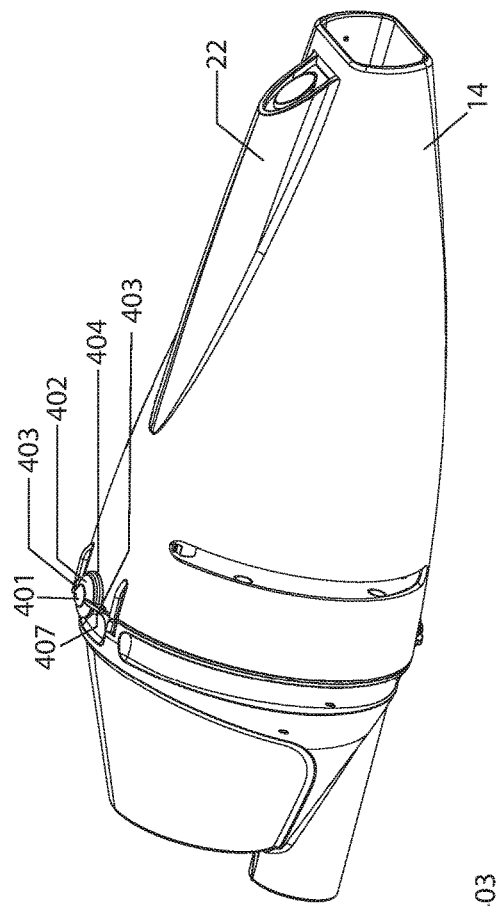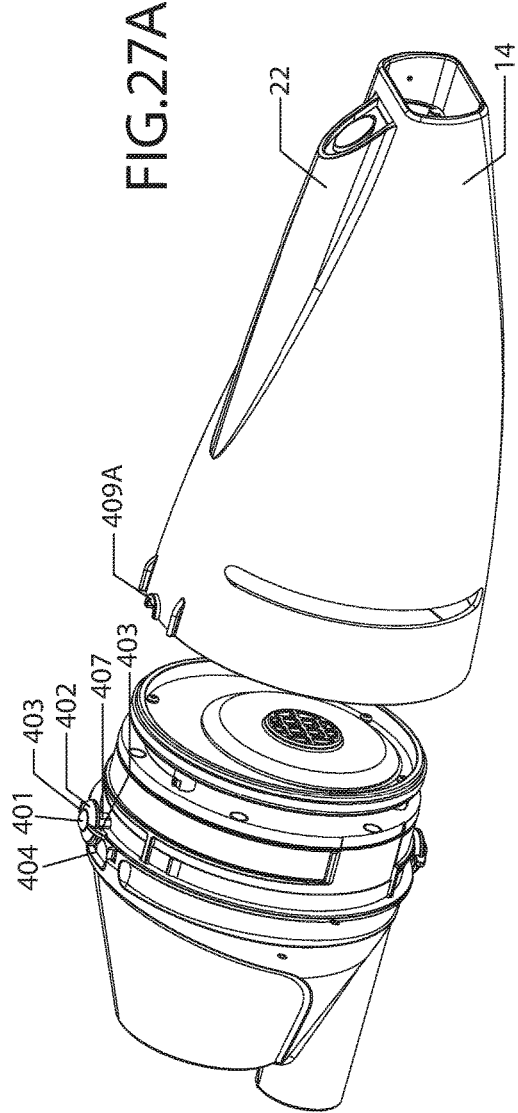

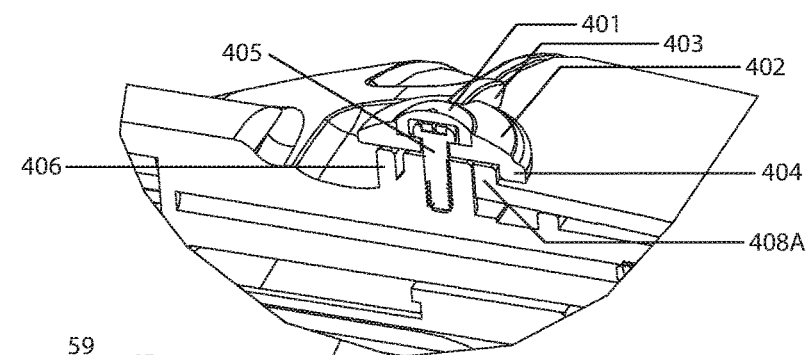
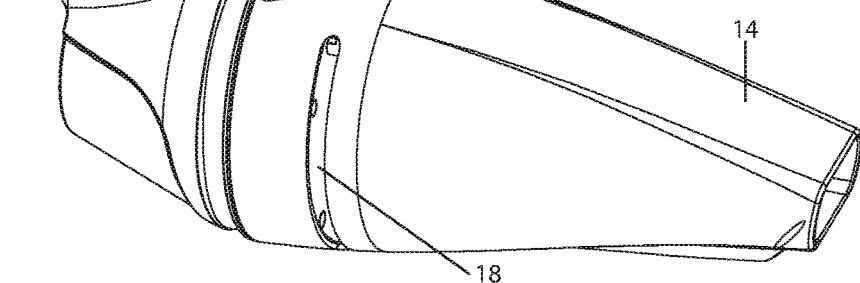
FIG.29 (Knob locking position)
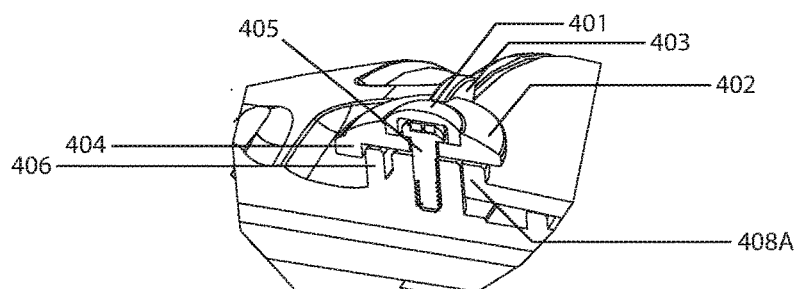
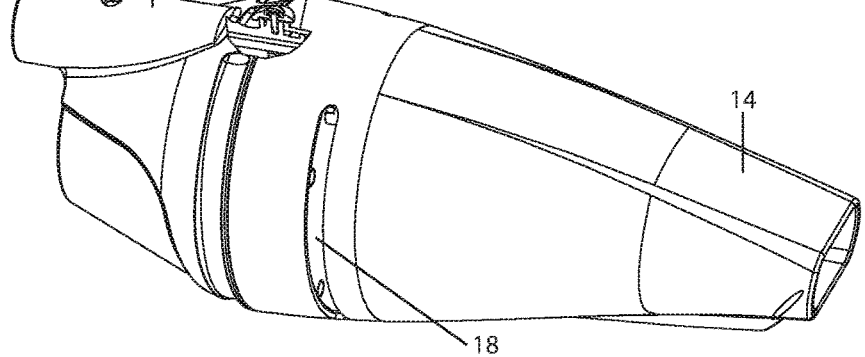
FIG.30 (Knob release position)

UNDERWATER CLEANER

CROSS-REFERENCE TO RELATED APPLICATION

This application claims the benefit of U.S. Provisional Patent Application No. 62/158,779 filed on May 8, 2015, the disclosure of which, including the specification, drawings, and claim, are expressly incorporated herein by reference in their entireties.

BACKGROUND

1. Field of the Disclosure

The present disclosure relates to the field of cleaning devices. More particularly, the present disclosure relates to an underwater cleaner.

2. Background Information

Swimming pool cleaners are used to remove debris from swimming pools. Various designs have been proposed.

Some existing cleaners use pressure or suction. Generally, debris is removed from water received by the cleaner.

Existing devices have limited utility, particularly with respect to their range of applications, maintenance, and re-energizing.

BRIEF DESCRIPTION OF THE DRAWINGS

In the figures of the accompanying drawings, like reference numerals refer to similar elements and corresponding parts throughout the drawings.

FIG. 3 is an exploded view of the right side of one arrangement of the underwater cleaner, according to an aspect of the present disclosure;

FIG. 8 is a perspective of a charger base, according to an aspect of the present disclosure;

FIG. 9 is a rear perspective showing one arrangement of the right side of the underwater cleaner, according to an aspect of the present disclosure;

FIG. 10 is a plan view of the right side of the underwater cleaner showing the charger base attached to the rear body, according to an aspect of the present disclosure;

FIG. 26A is a top plan view of a second embodiment of an interface between a front body and a rear body of the first arrangement with the front body detached from the rear body, according to an aspect of the present disclosure;

FIG. 26B is a top plan view of the second embodiment of an interface between a front body and a rear body of the first arrangement with the front body attached to the rear body, according to an aspect of the present disclosure;

FIG. 27A is a bottom plan view of the second embodiment of an interface between a front body and a rear body of the first arrangement with the front body detached from the rear body, according to an aspect of the present disclosure;

FIG. 27B is a bottom plan view of the second embodiment of an interface between a front body and a rear body of the first arrangement with the front body attached to the rear body, according to an aspect of the present disclosure;

FIG. 29 is a detail exploded view of the second embodiment of the interface between a front body and a rear body in a knob locking position of the first arrangement, according to an aspect of the present disclosure;

FIG. 30 is a detail exploded view of the second embodiment of the interface between a front body and a rear body in a knob release position of the first arrangement, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods of operation. Further, any reference to claim elements in the singular, for example, using the articles "a," "an" or "the", is not to be construed as limiting the element to the singular.

Figure 1A:
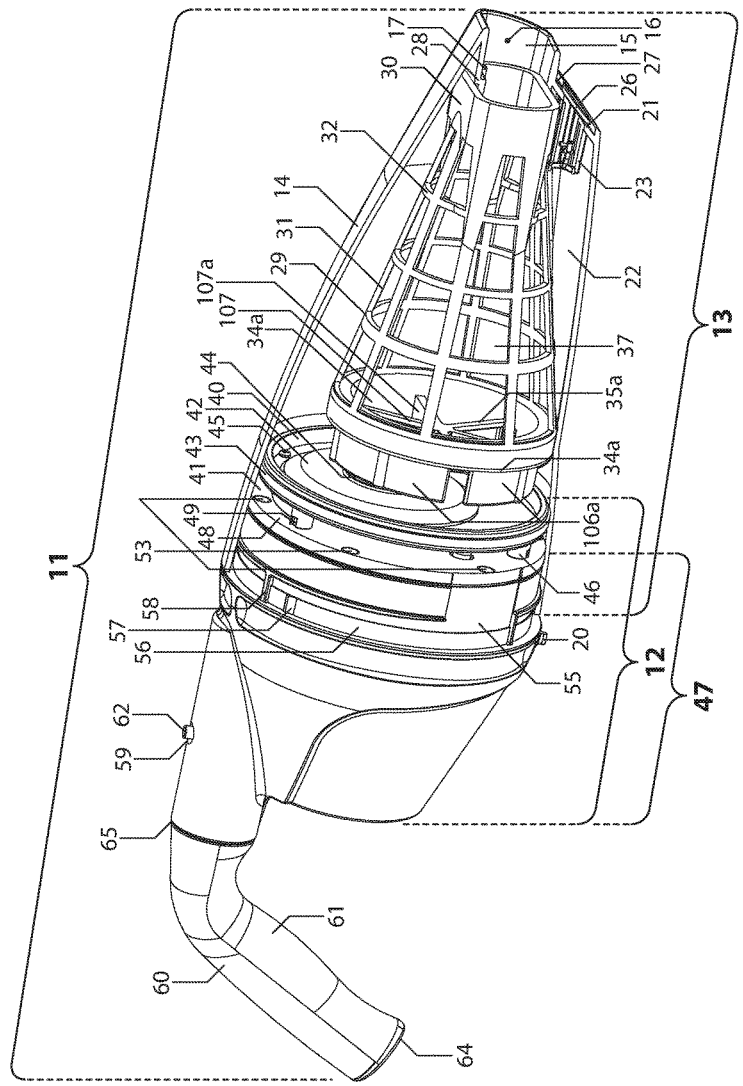
FIG. 1A is a perspective showing a right side of one arrangement of an underwater cleaner, according to an aspect of the present disclosure.

FIG. 1A is a perspective showing a right side of one arrangement of an underwater cleaner, according to an aspect of the present disclosure. As will be explained, the present disclosure includes a modular system in which multiple arrangements of an underwater cleaner are provided. That is, the underwater cleaner includes a rear body that is configured to accept multiple interchangeable front bodies, depending upon the need and preference of the user. As will be understood, the rear body disclosed herein is identical, regardless of which front body is being discussed. Therefore, for the sake of brevity, not every feature of the rear body will be discussed with reference to each front body. That is, certain features of the rear body have only been discussed once; although, it should be clear that those features and operations of those features apply equally to each of the front bodies discussed herein.

Figure 17:
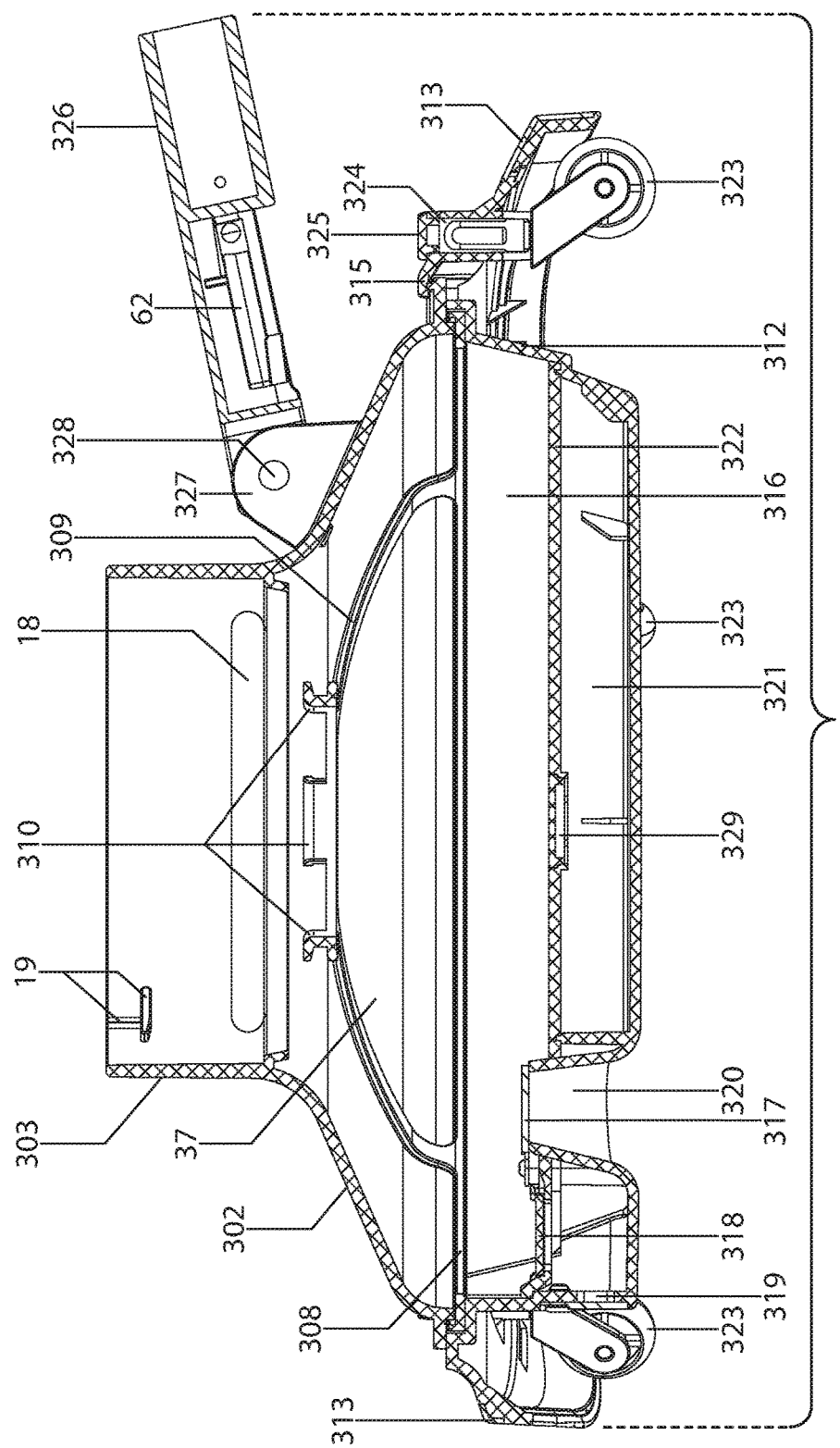
FIG. 17 is a side plan view of a second arrangement of the underwater cleaner, according to an aspect of the present disclosure.

An underwater cleaner 11 is shown as having a substantially cylindrical rear body 12. In a first arrangement, the cleaner 11 includes a front body 13. In a second arrangement the cleaner 11 includes a front body 301 (FIG. 17). The discussion of the features and operation of the front body 13 apply equally to the front body 301, except where noted herein and/or as indicated in the drawings.

Figure 7:
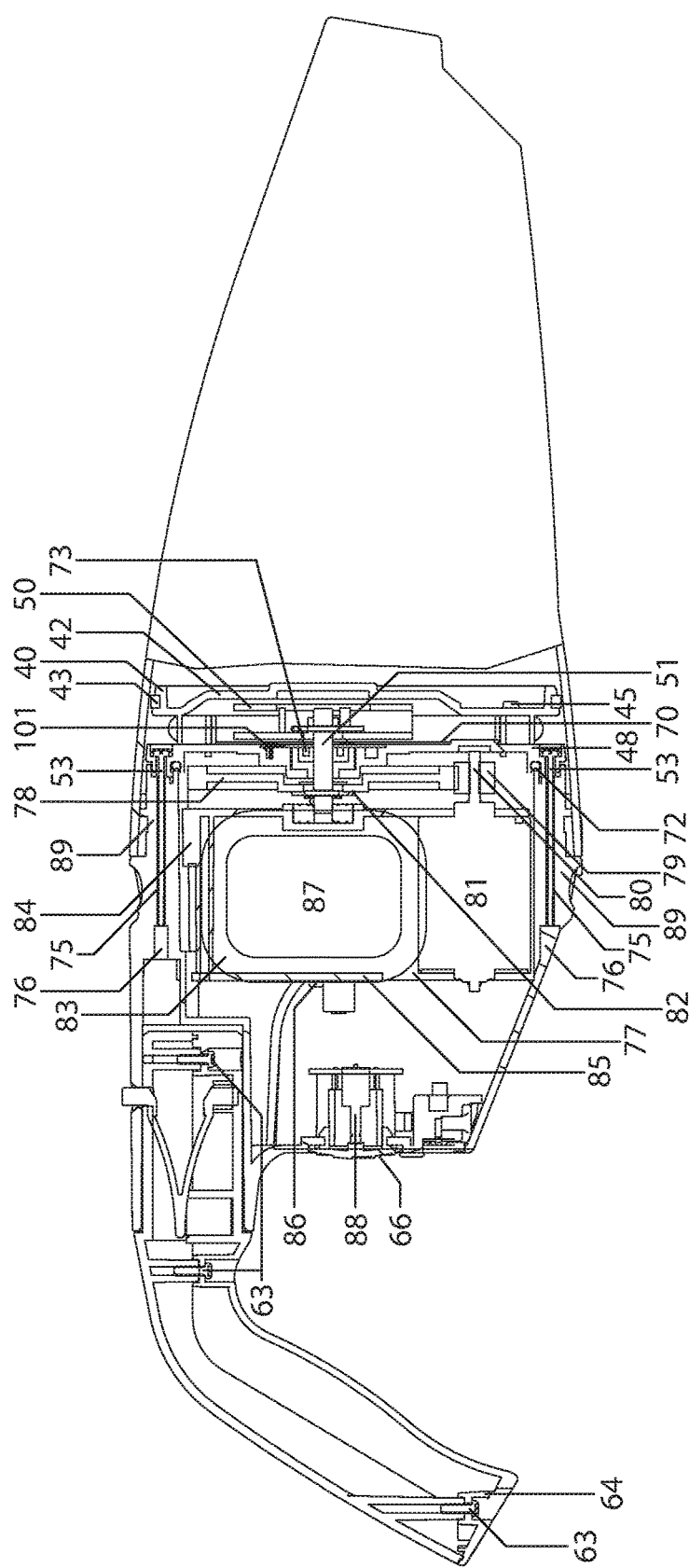
FIG. 7 is a partial cutaway view of one arrangement of a right side of the rear body of the underwater cleaner, according to an aspect of the present disclosure.

The rear body 12 includes a main body 47, a sealing plate 40, a gap 41, an impeller 50 (FIG. 2), a motor 81 (FIG. 7), and a battery pack 87 (FIG. 7). As shown, the sealing plate 40 is positioned adjacent to the impeller 50, whilst the impeller 50 resides within the gap 41.

In one embodiment, the battery pack 87 is a rechargeable battery. In a one embodiment, the battery pack 87 includes at least one lithium-ion (Li-ion) battery. In other embodiments, at least one nickel cadmium (NiCd) battery, at least one nickel-metal hydride (NiMH) battery, or at least on lithium ion polymer (Li-ion) battery is employed to supply power to the cleaner 11. Rather, than one battery, multiple batteries may be electrically connected. The battery pack 87 supplies power to the cleaner 11 to operate the motor 81. In another embodiment, power supplied by the battery pack 87 also operates accessories, lighting, and/or LED displays.

The front body 13 includes a cone-shaped housing 14 and a cone filter 29. The cone-shaped housing 14 is a cover into which water is ingested by the cleaner 11. The rear body 12 is removably attachable to the front body 13, as will be described herein.

The cone-shaped housing 14 may be constructed from a suitable polymer such as polycarbonate. According to one embodiment, the cone-shaped housing 14 is clear or transparent thermoplastic such as PMMA or ABS, which provides the user with ease of visual inspection of the interior of the cone-shaped housing 14. The cone-shaped housing 14 includes a first end (proximal end) that engages with the rear body 12 and a second end (distal end) opposite from the rear body 12. When attached to the rear body 12, at least a portion of the first end of the cone-shaped housing 14 extends over at least part of a gap 41 in the rear body 12. The gap 41 in the rear body 12 is formed by a space between the main body 47 and a sealing plate 40.

The second end of the cone-shaped housing 14 includes a water inlet opening 15 through which water is ingested by the cleaner 11. In one embodiment, the water inlet opening 15 is substantially rectangular; although, any suitable shape may be employed. In one embodiment, the water inlet opening 15 is sufficiently large such that no attachments or nozzles are required for cleaning operations. Further, in one embodiment, a narrow water inlet opening 15 may be employed, which would be useful to cleaning operations in tight spaces. Where no attachments or nozzles are used on the water inlet opening 15, the distal end of the water inlet opening 15 may be tapered in order that the user can obtain substantially flush contact between the water inlet opening 15 and the surface being cleaned.

A tab 16 is included on both sides of the water inlet 15 so that an attachment, for example, a nozzle or suction head may be attached to the cone-shaped housing 14. That is, the tab 16 fits into a corresponding hole or slot 153 in the nozzle to securely affix the nozzle to the cone-shaped housing 14. For example, the hole 153 in the suction head 151 receives the tab 16. In one embodiment, the tab 16 is round; although, any suitable shape may be employed. At least one post 17 (e.g., a screw post) is configured to accept a screw 25 or other fastener (shown in FIG. 2) in order to retain a flexible flapper 24 on an inlet extension 28, which opens inwardly of filter cone 29. In one embodiment, the inlet extension 28 is an oval-shaped extension. The inlet extension 28 is adapted to connect to the filter cone 29 by friction. In this regard, inner dimensions of the filter cone 29 at a distal end substantially correspond to the dimensions of the inlet extension 28. In one embodiment, the filter cone 29 is made of a rubber, polymer, or elastomer material. The filter cone 29 has a ribbed structure. The filter cone 29 of the front body 13 includes a grid structure upon which a net, mesh, or filter is supported, in order to collect debris. In one embodiment, the net, mesh, or filter, is integrally formed with the filter cone 29. In another embodiment, the net, mesh, or filter is affixed to the inside or outside of the skeletal structure of the filter cone 29. In another embodiment, the net, mesh, or filter is sandwiched between upper and lower halves of the ribbed structure of the filter cone 29.

The flexible flapper 24 functions as a door or gate to open and close the inlet extension 28. When the inlet extension 28 is open, by virtue of the flexible flapper 24 being in a horizontal (open) position, water and debris is permitted to pass through the extension 28 and the filter cone 29 during operation of the underwater cleaner 11. When the inlet extension 28 is closed by virtue of the flexible flapper 24 being in a vertical (closed) position, water and debris having entered the filter cone 29 through a filter extension 30 are prevented from escaping back through the inlet extension 28. In one embodiment, the extension 30 is oval-shaped; although, any suitable shape may be employed. The extension 30, on the narrow end of the filter cone 29, is connected by friction with the inlet extension 28. As will be discussed, the filter cone 29 is configured to collect debris from ingested water during operation of the cleaner 11.

A cone drain opening 21, which receives ingested water from a draining water channel 22, is provided beneath the extension 30 to drain out water from an inside of the front body 13. The draining water channel 22 guides the filtered water inside the front body 13 to the cone drain opening 21 at the front end of the front body 13. A draining extension 23 adjacent to the cone drain opening 21 provides housing for a draining plug 26 in a u-shaped recess area 27. The drain extension 23 includes a grid wall structure to allow a greater flow of water from the cone drain opening 21. The u-shaped recess area 27 prevents the draining plug 26 from accidentally moving outwardly to an open position during operation, thus blocking the cone draining opening 21 with debris.

The draining plug 26 is allowed to move back and forth within the draining extension 23. That is, when the underwater cleaner is in operation (ON), rotary movement of an impeller 50 (FIG. 5) creates a suction force with which the draining plug 26 is moved inwardly to a closed position. When the underwater cleaner is OFF, the draining plug 26 is moved outwardly to an open position since the suction force created by the impeller 50 no longer acts upon the draining plug 26 such that the water from the front body 13 housing is allowed to drain when the cleaner 11 is removed from the water. The draining extension 23 may include a grid wall design to allow the flow of more water from the cone draining opening 21.

Figure 2:
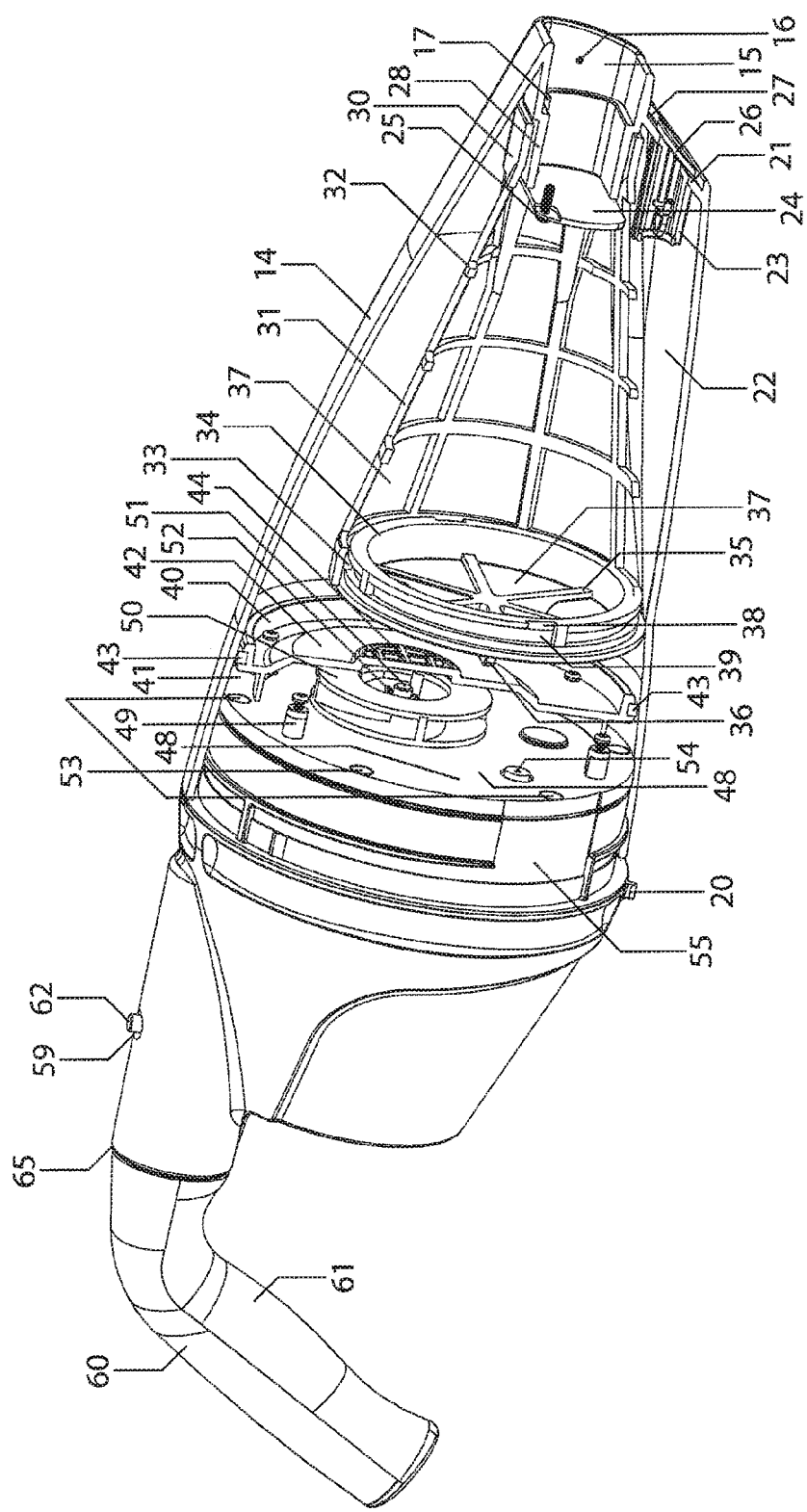
FIG. 2 is a partial cutaway view of the right side of one arrangement of the underwater cleaner, according to an aspect of the present disclosure.

The cone-shaped housing 14 includes vertical supporting ribs 31 and horizontal supporting ribs 32. The vertical supporting ribs 31 and horizontal supporting ribs 32, along with a removable filter cone base 34a, supports a net 37 (or screen or mesh or filter) to filter debris and particulate from the ingested water. The filter cone base 34a is removably attached to a proximal end of the filter cone 29. The net 37 allows water to pass through the filter cone 29, but keeps debris and particulate in the filter cone 29, for later removal by the user. A sliding rib 33 for assembling and securing the filter cone 29 to the removable filter cone base 34a is provided, as shown in FIG. 2. Essentially, the sliding rib 33 guides the filter cone 29 onto turning track channel 39 of the filter cone base 34a, and then secures the filter cone 29 onto the filter cone base 34a. Filter cone base support ribs 35a reinforce the filter cone base 34 and are connected to the net 37, such that the net 37 is with the ribs of the filter cone 29 and with the filter cone base 34a. A filter bottom side extension 106a is an extension of the filter cone base 34a that provides for a finger or fingers to hold and turn the filter cone base 34a when it is desired to remove debris inside the filter cone 29. A filter base support rib 107 is provided at an end of the filter cone base 34a. Additionally, a y-shaped middle extension support 107a also provides for a finger or fingers to hold and turn the filter cone base 34a when it is desired to remove debris inside the filter cone 29. The filter bottom side extension 106a and the y-shaped middle extension support 107a also provide a space between the filter cone 29 and grid hole 44 in order to maximize suction force when the filter cone 29 becomes full of debris.

At least one matching notch 38 is provided on the filter cone base 34a to enable the sliding rib 33 to slide along the turning track channel 39, thus allowing installation of the filter cone base 34a on the filter cone 29. That is, the matching notch 38 on the filter cone base 34a is aligned with the sliding rib 33 and then the filter cone base 29 is turned with respect to the filter cone base 34a along the turning track channel 39 until it stops, thus closing the filter cone 29. When desiring to remove debris from the filter cone 29 or change the filter cone 29, the user can turn the filter cone base 34a, as discussed above, with respect to the filter cone 29 in a direction opposite to the installation direction, in order to remove the filter cone base 34a, thus allowing user access to the filter cone 29 for removal or replacement of the filter cone 29.

Figure 1B:
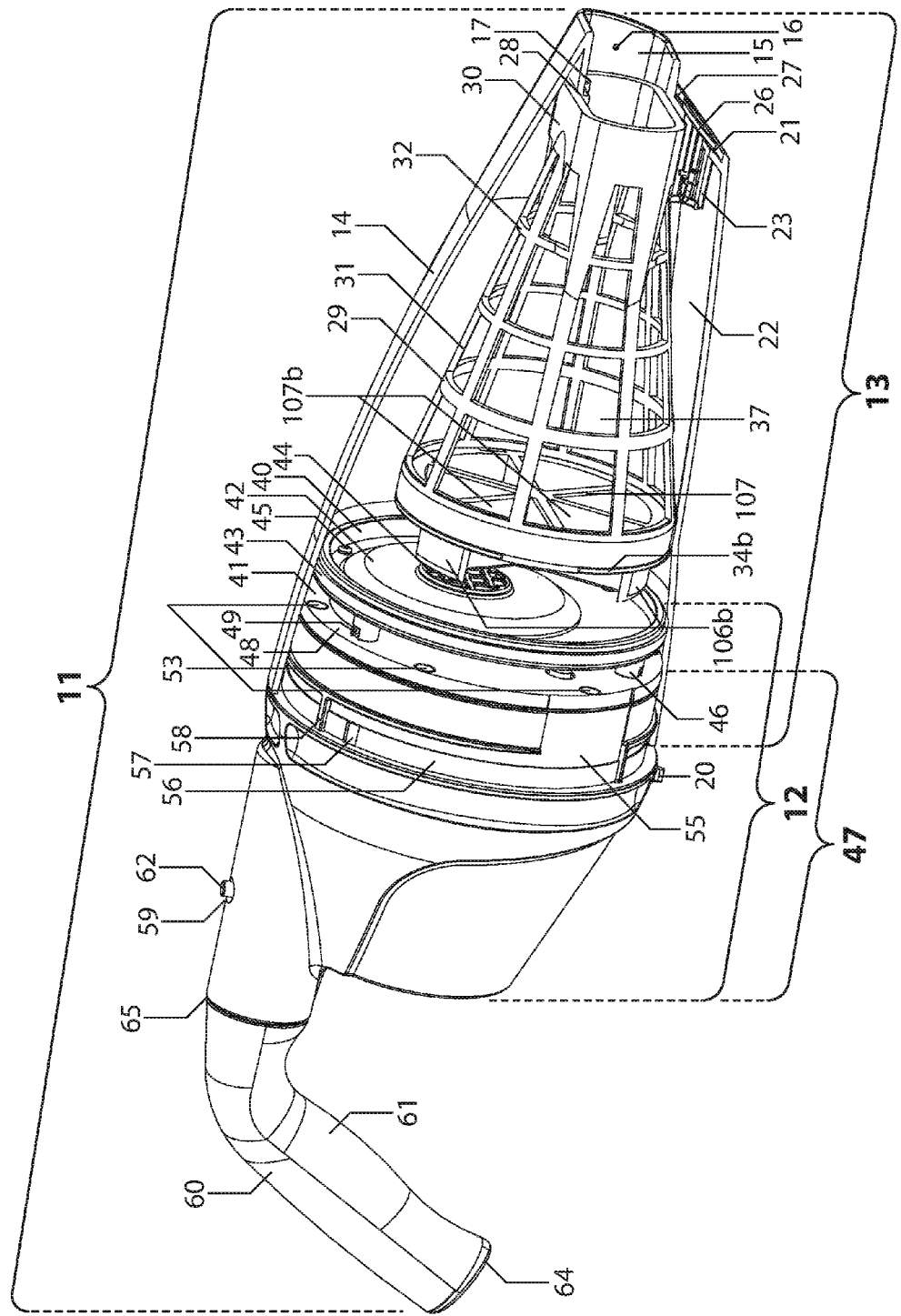
FIG. 1B is a perspective showing a right side of an underwater cleaner of one arrangement, according to another aspect of the present disclosure.

FIG. 1B is a perspective showing a right side of an underwater cleaner, according to another aspect of the present disclosure. In FIG. 1B, y-shaped middle extension support 107b includes separate filter cone base side extensions 106b at each distal end of the y-shaped middle extension support 107b. The filter cone base side extensions 106b extend fractionally in the circumferential direction from each leg of the y-shaped middle extension support 107b by a length shorter than a length of one leg of the y-shaped middle extension support 107b. The truncated filter cone base side extensions 106b allow for a greater water flow and reduced possibility of clogging by debris.

A filter bottom side extension 106b is an extension of the filter cone base 34b that provides for a finger or fingers to hold and turn the filter cone base 34b when it is desired to remove debris inside the filter cone 29 by opening the filter cone 29. A filter base support rib 107 is provided at an end of the filter cone base 34b. Additionally, the y-shaped middle extension support 107b also provides for a finger or fingers to hold and turn the filter base when it is desired to remove debris inside the filter cone 29. The filter bottom side extension 106b and the y-shaped middle extension support 107b also provide a space between the filter cone 29 and grid hole 44 in order to maximize suction force when the filter cone 29 becomes full of debris.

Figure 1C:
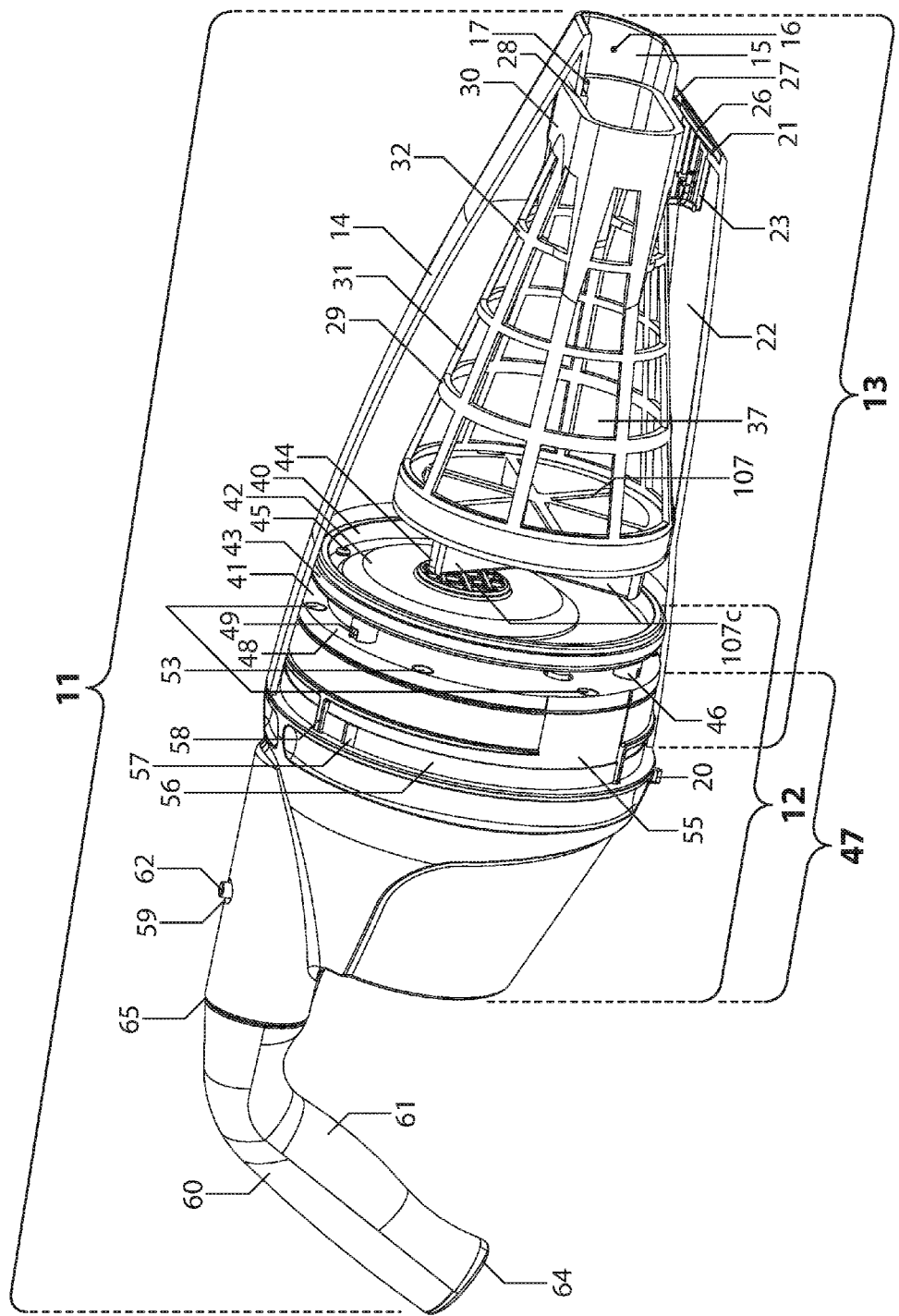
FIG. 1C is a perspective showing a right side of an underwater cleaner of one arrangement, according to another aspect of the present disclosure.

FIG. 1C is a perspective showing a right side of an underwater cleaner, according to another aspect of the present disclosure. In FIG. 1C, a filter base support rib 107 and a y-shaped middle extension support 107c are provided.

The y-shaped middle extension support 107c provides for a finger or fingers to hold and turn the filter base when it is desired to remove debris inside the filter cone 29 by opening the filter cone 29. The y-shaped middle extension support 107c also provides a space between the filter cone 29 and grid hole 44 in order to maximize suction force when the filter cone 29 becomes full of debris. The lack of filter cone base side extensions allow for a greater water flow and reduced possibility of clogging by debris.

As noted, the net 37 serves to filter particulate and debris from the ingested water. Particulate and debris filtered by the net 37 includes sand, dirt, dust, pollen, insects, leaves, grass, flowers, etc. As indicated previously, the net 37 may be attached to the inside or the outside of the filter cone 29, and is attached to the filter cone 29 and filter cone base 34a-c. In a one embodiment, the net 37 is a stainless steel mesh. However, nets made of other metals, cloth, polymers, and/or thermoplastics may be used. In a one embodiment, the net 37 is attached to the filter cone 29 and to the filter cone base 34a-c by an over-molding process in which the stainless steel mesh is positioned into the injection tool, and plastic is injection molded around the stainless steel mesh. The shape of the net 37 generally corresponds to the shape of the filter cone 29. In one embodiment, multiple filter cones may be provided with differing gauge nets so that the user may select between a fine mesh for filtering small particles and a large mesh for filtering only larger particles.

The sealing plate 40 is a substantially round plate over and circumferentially adjacent to the impeller 50. The sealing plate 40 includes the grid hole 44 on the side of the sealing plate 40 closer to the filter cone base 34a-c to allow a suction force generated by the rotation of the impeller 50 to traverse therethrough. Rotation of the impeller 50 is sufficient to draw in water through the water inlet opening 15 in the front body 13. The sealing plate 40 also includes a notch along its circumference to accommodate a flexible ring 43 such as an o-ring, in order to provide a seal with the cone-shaped housing 14 and protect against a loss of suction force generated by the rotating impeller 50 through the water inlet opening 15. The flexible ring 43 on the sealing plate 40 creates a watertight seal between the rear body 12 and the front body 13 by virtue of the shape of cone-shaped housing 14. The gap 41, in which the impeller 50 is positioned, of the rear body 12 is provided for discharging ingested water when the impeller 50 is rotating. The sealing plate 40 includes a convex surface 42 to accommodate the impeller and in order to minimize the width of the gap 41 and the potential of fingers being inserted into the gap 41 and coming in contact with the impeller 50. Four fixation screws 45 or other fasteners are provided to secure the sealing plate 40 onto chamber cover 48 by engaging with posts 49 such as screw posts. A screw positioner 46 on the bottom of the sealing plate 40 provides for alignment of the sealing plate 40 to screw post 49 on chamber cover 48 for applying the screws 45 or other fasteners.

The main body 47 houses a watertight cavity 77 (FIG. 7) in which various components are housed, such as the motor 81 and the battery pack 87, as will be discussed later. Chamber cover screws 53 or other fasteners secure the chamber cover 48 onto the main body 47, thus compressing flexible ring 72 to the cavity 77 top edge to prevent water from entering the cavity 77. The flexible ring 72 is accommodated inside a notch under the chamber cover 48, acting as a sealing ring for assembly of the chamber cover 48 to the cavity 77 to prevent water from entering the cavity 77.

As indicated, the rear body 12 includes the motor 81, a motor shaft 81, the impeller 50, and an impeller shaft 51. The impeller 50 spins about the shaft 51 (FIG. 2) upon which it is retained by metal locking pin 52. That is, the metal locking pin 52 extends through a hole of impeller 50 and shaft 51. In one embodiment, the metal locking pin 52 forms a loop at the end in order to prevent backing out of the hole of the impeller 50 and the motor shaft 51. Rotary movement of the impeller 50 causes water to be ingested through the water inlet opening 15 through a suction force generated by the spinning of the impeller 50.

In operation, and as shown in FIG. 7, when the user depresses the flexible membrane switch 66, which causes the ON/OFF switch 88 to be depressed, electric current is sent from the battery to the motor 81 to operate the motor 81. When the motor 81 is ON, the motor 81 causes the motor shaft 80 to spin. Pinion 79 is connected to the motor shaft 80, such that rotation of the motor shaft 80 causes the pinion 79 to turn. A gear 78 is connected to the pinion 79, such that rotation of the pinion 79 causes the gear 78 to turn. The shaft 51 is connected to the gear 78 such that rotation of the gear 78 causes the shaft 51 to rotate, which in turn causes the impeller 50, connected to the shaft 51, to rotate about the shaft 51. In a one embodiment, the impeller 50 is made of thermoplastic such as acrylonitrile butadiene styrenean (ABS) and includes a plurality of blades. In another embodiment, the impeller includes a plurality of fins. In other embodiments, the impeller 50 is made of a plastic, rubber, polymer, stainless steel, aluminum, or elastomer.

A check valve 54 (FIG. 2) or plug is provided to check the cavity 77 and ascertain whether a watertight condition is being maintained, by visual inspection of a user. That is, a hole is provided in the chamber cover 48, so that after assembly of the rear body, compressed air can be applied to the hole to make sure that the rear body assembly is airtight, and as a result, watertight. After this is checked, a permanent plug is positioned to seal the hole.

A matching notch 55 is provided in order to assemble the cone-shaped housing 14 (and top cover extension 303 of top cover 302 in FIG. 23) onto the main body 47 of the rear body 12. That is, the vertical locking rib 19 (FIGS. 3, 12-14) on the cone-shaped housing 14 are aligned in the matching notch 55 and moved into turning track channel 56. That is, the cone-shaped housing 14 is rotated along the turning track channel 56, passing tab 57 until contacting turning stopper 58, located at the end of the turning track channel 56, to secure the cone-shaped housing 14 into position.

Thus, by virtue of the turning track channel 56 and the vertical and horizontal locking rib 19, a twist and lock interface is provided to secure the rear body 12 to the front body 13 or to the front body 301. In one embodiment, the interface includes the turning track channel 56, (i.e., a circumferential channel), on the rear body 12 to engage with a surface (i.e., the vertical locking rib 19) of the cone-shaped housing 14 of the front body 13 in one arrangement or with a surface of the top cover extension 303 of the top cover 302 of the front body 301 in a second arrangement. Thus, the circumferential rib of the vertical and horizontal locking rib 19 mates with the turning track channel 56 to hold the front body 13 onto the rear body 12, while the longitudinal rib of the vertical and horizontal locking rib 19 acts as a stopper in rotation to block when the front body 13 is rotated to the fully assembled position.

However, in another embodiment, the turning track channel 56 may alternatively be located on the cone-shaped housing 14 of the front body 13 or the top cover extension 303 of the top cover 302 of the front body 301 to engage with a surface (i.e., the vertical locking rib 19) on the rear body 12.

In either case, when the turning track channel 56, (i.e., the circumferential channel), and the surface of the cone-shaped housing 14 or the top cover 302 are aligned, one of the rear body and the front body are rotated with respect to the other of the rear body and the front body passing tab 57 on the turning track channel 56 until stopper 58 is contacted; thus, securing the front body 13 to the rear body 12 or 301. The opposite procedure is performed to detach the front body 13 from the rear body 12.

In operation, the vertical locking rib 19 of the cone-shaped housing 14 of the front body 13 or the top cover extension 303 of the top cover 302 of the front body 301 are turned along the turning track channel 56, passing the tab 57, until the turning stopper 58 is contacted, thus securing the cone-shaped housing 14 or the top cover 302 onto the working system chamber of the rear body 12. The horizontal locking rib 19 prevents the detachment of the cone-shaped housing 14 or the top cover extension 303 of the top cover 302 from the rear body 12 without rotation of one with respect to the other in a direction opposite to that of the installation procedure. That is, turning the cone-shaped housing 14 or the top cover extension of the top cover 302 in the opposite direction to that which was used to install the same will allow the cone-shaped housing 14 or the top cover extension of the top cover 302 to be removed when the vertical locking rib 19 is aligned with the matching notch 55.

A handle/pole pin locking hole 59 is provided for securing v-clip 62 into position in order to secure a handle or pole connector inside handle/pole connector assembly chamber 65. Additionally, a v-clip 62 is positioned on an opposite end of a pole for connection to an extended pole. As shown in FIG. 7, handle fixation screws 63 or other fasteners are provided for the assembling of an upper handle section 60 and a lower handle section 61. In order to drain water that may accumulate in handle 60, 61 during operation, a handle water draining hole 64 is provided at the end of the handle through which water may be expelled from the handle 60, 61 during operation of the cleaner 11. The handle 60, 61 is ergonomic to facilitate ease of carrying and ease of manipulating during cleaning operations.

FIG. 2 is a partial sectional view of the right side of the underwater cleaner, according to an aspect of the present disclosure. As shown, the filter cone 29 is removably attachable to a front end of the front body 13, by virtue of the inlet extension 28, which holds the filter cone 29 to the front body 13 by friction. In this fashion, a user may remove the filter for cleaning or replace the filter when it becomes worn. Advantageously, the filter may easily be removed, particularly since only one end of the filter cone 29 is attached and there is a space between the proximal end of the filter cone 29 and the rear body 12. That is, the filter cone 29 is removably attached to the inlet extension 28 at a distal end of the filter cone 29. However, at the proximal end, opposite to the distal end, of the filter cone 29, there is no attachment to any part of the rear body 12 or front body 13. Therefore, as seen in FIGS. 1 and 2, the filter cone 29 is spaced from the sealing plate 40.

In order to remove or replace the filter, the user can separate the rear body 12 from the front body 13, in a manner discussed herein. Then, the user can reach into the cone-shaped housing 14 and grasp the finger grip 36 on the filter cone housing base 34a-c. By rotating the filter cone housing base 34a-c with the finger grip 36, the user can remove the filter cone housing base 34a-c to reach the filter cone 29. By pulling on the filter cone 29, the user can overcome the friction fit of the filter cone 29 to the inlet extension 28 to remove the filter. In order to replace the filter, the procedure is reversed. That is, the user can align the matching notch 38 of the filter cone base 34 a-c with the sliding rib 33 and then rotate the filter cone base 34a-c along the turning track 39 (a channel) until it stops.

FIG. 3 is an exploded view of one arrangement of an underwater cleaner, according to an aspect of the present disclosure. FIG. 3 shows the rear body 12 separated from the front body 13. Advantageously, an interface allows for the separation of the rear body 12 from the front body 13, as discussed. In this fashion, a user may connect the rear body 12 to multiple front bodies 13, depending upon need or preference. The interface provides a simple, efficient, and user friendly configuration for attaching and detaching the rear body 12 from the front body 13. This modularity provides the user with extraordinary flexibility. A lock is an exemplary interface.

As shown in FIG. 3, the interface includes the vertical and horizontal locking rib 19, the matching notch 55, the turning track channel 56, the tab 57, and the turning stopper 58. In order to attach the front body 13 on the rear body 12, the vertical and horizontal locking rib 19 are aligned with the matching notch 55. The vertical and horizontal locking rib 19 is located adjacent a proximal edge of the cone-shaped housing. The side slot opening 18 is located inside of the vertical and horizontal locking rib 19, in direction closer to a distal end of the cone-shaped housing 14. In one embodiment, there may be a plurality of vertical and horizontal locking ribs that can be aligned with an equal number of matching notches.

As discussed, when the vertical locking rib 19 of the cone-shaped housing 14 is aligned with the matching notch 55, a surface of the vertical locking rib 19 is placed into the turning track channel 56. When the vertical locking rib 19 is placed into the turning track channel 56, one of the rear body 12 and the cone-shaped housing 14 of the front body 13 is rotated with respect to the other of the rear body 12 and the cone-shaped housing 14 of the front body 13, passing tab 57, until the vertical and horizontal locking rib 19 contacts the turning stopper 58. In this embodiment, the cone-shaped housing 14 is rotated with respect to the rear body 12. At this point, the rear body 12 is securely attached to the front body 13 and the cleaner 11 is ready for operation.

In order to detach the rear body 12 from the front body 13, the user can rotate one of the rear body 12 and the cone-shaped housing 14 of the front body 13 with respect to the other of the rear body 12 and the cone-shaped housing 14 of the front body 13, in a direction opposite to the installation direction and opposite to that of the turning stopper 58, clearing the tab 57, until the vertical locking rib 19 is again aligned with the matching notch 55, at which time the rear body 12 may be separated from the front body 13. It should be noted that the vertical and horizontal locking rib 19 may alternatively be located on the rear body 12 and the matching notch 55, the turning track channel 56, the tab 57, and the turning stopper 58 may be alternatively be located on the cone-shaped housing 14 of the front body 13.

Figure 4:
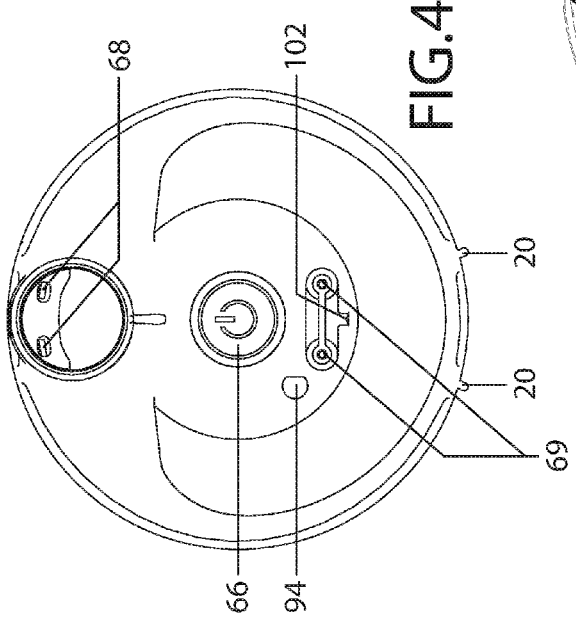
FIG. 4 is a rear plan view of one arrangement of the underwater cleaner, according to an aspect of the present disclosure.

FIG. 4 is a rear plan view of the underwater cleaner, according to an aspect of the present disclosure. As shown in FIG. 4, a flexible ON/OFF switch membrane 66 covers an ON/OFF switch 88 and which are electrically and/or mechanically connected together, in order to control the supply of electrical power to the motor 81. The flexible ON/OFF switch membrane 66 may be made of a flexible substrate such as rubber or an elastomer. Depressing the flexible ON/OFF switch membrane 66 will in turn depress the switch 88 to turn ON and OFF (depressing once will turn the motor 81 ON and depressing again will turn the motor 81 OFF) to operate the motor 81 via electrical current sent from the battery 87. That is, when the user depresses the flexible membrane switch 66, which causes the ON/OFF switch 88 to be depressed, electric current is sent from the battery to the motor 81 to operate the motor 81. When the motor 81 is ON, the motor 81 causes the motor shaft 80 to spin. Pinion 79 is connected to the motor shaft 80, such that rotation of the motor shaft 80 causes the pinion 79 to turn. A gear 78 is connected to the pinion 79, such that rotation of the pinion 79 causes the gear 78 to turn. The shaft 51 is connected to the gear 78 such that rotation of the gear 78 causes the shaft 51 to rotate, which in turn causes the impeller 50, connected to the shaft 51, to rotate about the shaft 51.

Draining water holes 68 shown in FIG. 4 are provided to drain water from side chamber 89 shown in FIG. 7. The side chamber 89 is the space around the cavity 77. In operation, the side chamber 89 fills with water; thus, draining water holes 89 are provided to allow water to drain from the side chamber 89. In order to recharge the battery pack 87, a charging socket 69 is provided to the rear of the rear body 12, as shown in FIG. 4. A contact plate 94 or diode near the charging chamber 67 prevents a short circuit condition, in a known manner, as could happen with current flow across the contacts in the charging socket 69, particularly in water. A charging chamber aqueduct 102 allows the drainage of water from the charging chamber 67. At least one support foot 20 is provided in order to allow the rear body 12 to stand, with or without the front body 13 attached to the rear body 12.

Figure 35:
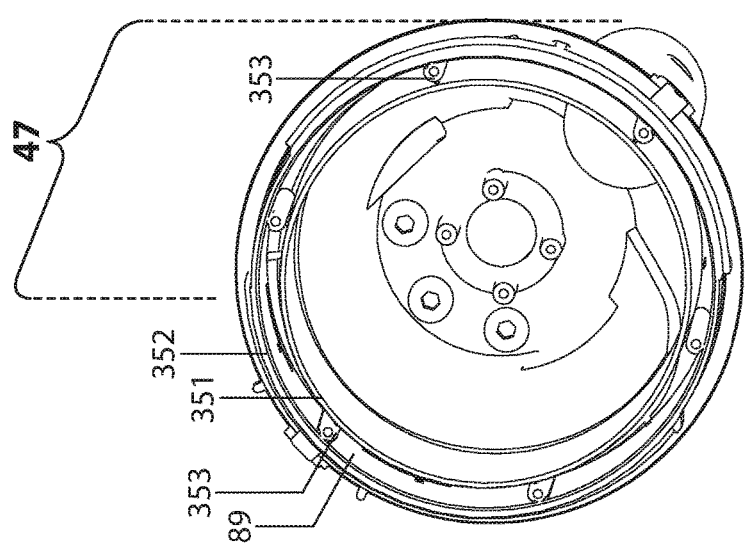
FIG. 35 shows a double hull design of the rear body of the underwater cleaner, according to an aspect of the present disclosure.
Figure 36:
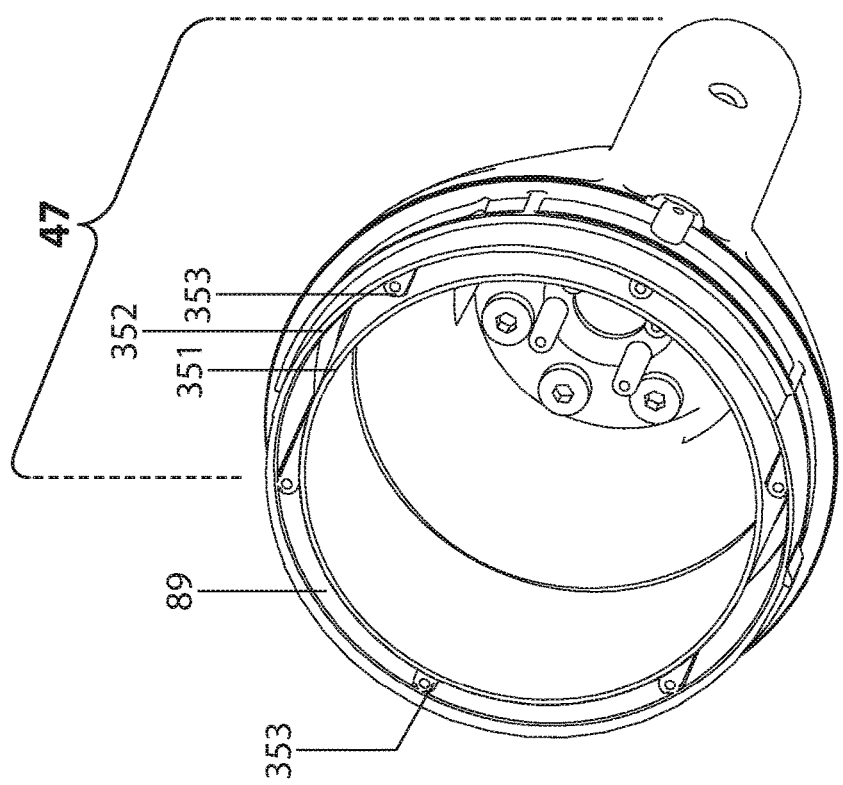
FIG. 36 shows a double hull design of the rear body of the underwater cleaner, according to an aspect of the present disclosure.
Figure 37:
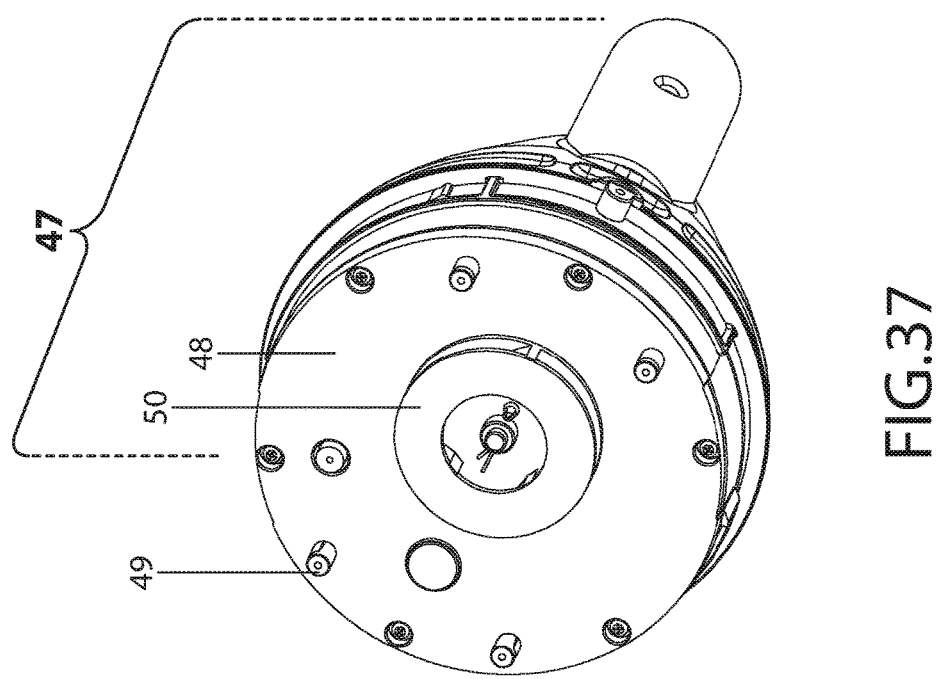
FIG. 37 shows a double hull design and the chamber cover of the rear body of the underwater cleaner, according to an aspect of the present disclosure.

FIGS. 35-37 show a double hull design of the rear body 12, according to an aspect of the present disclosure. As shown in FIG. 35, a double hull construction is provided having a watertight inner hull 351 that is the outer wall of the working system chamber 47, and an outer hull 352 that is the inside wall of the working system chamber 47 around the cavity 77 and that fills with water during operation of the cleaner 11. The outer hull 352 is sealed with the flexible ring 72 in order to prevent water from entering the cavity 77. When the cleaner 11 is removed from the water, the water drains from the side chamber 89, as discussed with respect to FIG. 4. Referring to FIG. 35, the side chamber 89 in is the area or gap between the inner and outer hulls. The working chamber 47 is the area within the inner hull 351. FIG. 36 is a more detail view of the double hull construction which shows the posts 353 with which screws 53 (with nuts 76) or other fasteners engage in order to secure the chamber cover 48 to cover the working system chamber 47. FIG. 37 shows a detailed view of the arrangement of FIG. 2 having the chamber cover 48 secured onto the working system chamber 47 of the rear body with screws 45 into the posts 49.

While posts, bosses, or pillars 353 as shown in FIG. 36 are provided receive the screws 53, in an alternate embodiment, screws or other fasteners may be provided to engage posts located on the outside of the inner hull chamber 351 to secure the chamber cover 48 onto the working system chamber 47. Advantageously, the double hull construction is robust design that provides for additional structural integrity. For example, if the outer wall of the outer hull 352 were to become banged and damaged, the inner hull chamber 351 would remain water tight, thus preserving the integrity of the inner hull chamber 351.

Figure 5:
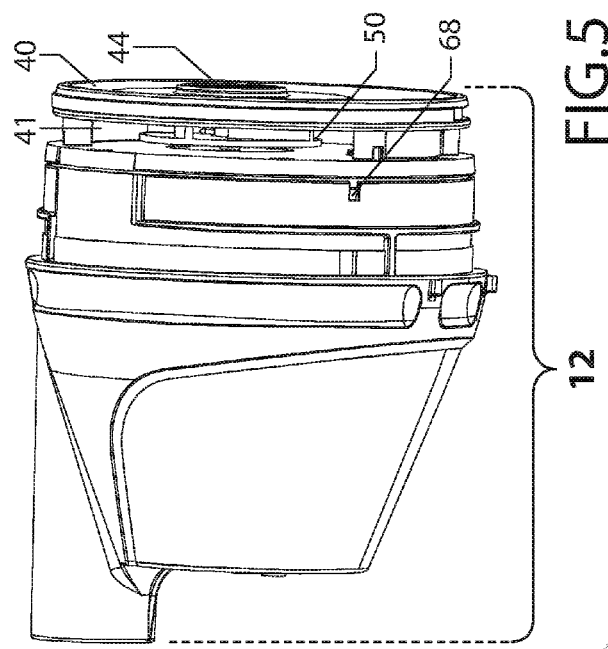
FIG. 5 is a partial plan view of one arrangement of the right side of the rear body of the underwater cleaner, according to an aspect of the present disclosure.

FIG. 5 is a partial plan view of the right side of the rear body of the underwater cleaner, according to an aspect of the present disclosure. As shown in FIG. 5, the impeller 50 is positioned in the gap 41 of the rear body 12. In operation of the cleaner 11, ingested water passes through the grid hole 44 in the sealing plate 40 and exits the rear body via the gap 41 by virtue of the draining water holes 68.

Figure 6:
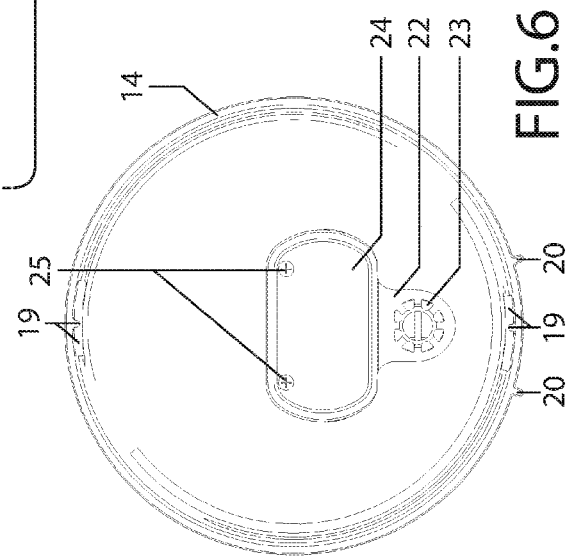
FIG. 6 is a front plan view of one arrangement of the underwater cleaner, according to an aspect of the present disclosure.

FIG. 6 is a front plan view of the underwater cleaner, according to an aspect of the present disclosure. The draining water channel 22, the draining extension 23 and the flexible flapper 24 are shown from a front view. The draining extension 23 is located below the draining water channel 22, which is below the flexible flapper 24. Flapper fixing screws 25 or other fasteners are used to secure the flexible flapper 24 onto the inlet extension 28.

FIG. 7 is a partial sectional view of right side of the rear body of the underwater cleaner, according to an aspect of the present disclosure. As shown in FIG. 6, the watertight cavity 77 houses components including the motor 81 and the battery pack 87. A metal plate 70 shown in FIG. 7 is fixed to the chamber cover 48 by screws 101 or other fasteners in order to hold the shaft seal 73 in place.

A shaft seal 73 provides a seal around the shaft 51 during operation thereof. A shaft locking pin 82 secures the gear 78 on the shaft 51. The shaft 51 is made of stainless steel in one embodiment, but me made from any suitable materials.

A flexible ring 72 accommodated inside notch under the chamber cover 48 acts as a sealing ring for assembly of the chamber cover 48 to the cavity 77 to prevent water from entering the cavity 77 during operation of the cleaner 11. The screws 53 or other fasteners fix the chamber cover 48 to the main body 47, thus compressing the flexible ring 72 against a top edge of the cavity 77 to achieve a seal for the cavity 77, thus preventing water leakage. Tunnels 75 such as screw tunnels on the bottom of the chamber cover 48 guide the screws 53 to screw nuts 76 to ensure proper retention.

Battery compartment 83 shown in FIG. 7 houses the battery pack 87. The battery compartment 83 includes a battery compartment base 84 and a battery compartment cover 85. The battery compartment cover 85 is held on by screws 86 or other fasteners.

FIG. 8 is a perspective of a charger base, according to an aspect of the present disclosure. The charger base includes a charge base top section 91 and a charger base bottom section 92 for connection to the cleaner for battery charging. Charging pins 93 extend from the charger base bottom section 92 and plug into socket 69, thus electrically connecting the electrical contacts, for charging the battery pack 87 when the user desires to charge the battery. After a charging operation, the user unplugs the charger 90 and its charging pins 93 from the socket 69. Screws 95 or other fasteners are provided for assembling the charger base top section 91 to the charger base bottom section 92. Supply cord 96 provides for the connection of the charger 90 to a source of alternating current. In a one embodiment, the charging pins 93 are 5 mm in length, corresponding to a socket 69 having a depth of 6 mm, such that the weight of the charger will be supported by virtue of the charging pins 93 being inserted into the socket 69. Advantageously, the charging pins 93 serve a dual purpose in that they also provide for the attachment of the charger 90 to the rear body 12 of the cleaner 11. Thus, no hooks or brackets are required to attach the charger 90 to the rear body 12. It is noted that other lengths of the charging pins 93 may be used and that other depths of the socket 69 may be used, such that the attachment of the charger 90 to the rear body is facilitated.

As shown in FIG. 8, the charger 90 is a generally u-shaped structure; although, any suitable shape may be used. In one embodiment, the shape of the charger 90 may generally correspond to the shape of the rear body 12. In one embodiment, the charger is made of substantially the same material as the rear body 12.

As shown, the rear body 12 may include a plurality of screws 95 or other fasteners to hold the charger 90 together. Optionally, the charger may be one integral piece, in which case the screws 95 are not needed. When the charging pins 93 are plugged into the charging socket 69 and the electrical supply cord 96 is connected to an appropriate source, such as 220 volt or 110 volt alternating current, the battery 87 will begin to charge. In a known manner, the alternating current input is step down by a transformer which lowers the voltage for conversion to direct current. The charger 90 is configured to sense a no load voltage and then increase the voltage until some fixed amount of current is being supplied to the battery. A temperature sensor may be used along with voltage and current readings to discontinue the charging current at an appropriate time, such as when a charging operation is complete.

FIG. 9 is a rear perspective showing the right side of the underwater cleaner, according to an aspect of the present disclosure. As shown in FIG. 9, a contact plate 94 ensures the prevention of a polarity short circuit as the cleaner 11 is used in water. A charging chamber 67 accommodates the charging socket 69. The charging chamber 67 is provided for connecting a charger 90 base (FIG. 8) to recharge a battery pack 87 that is configured to supply electrical power to the motor 81 (FIG. 7). Additionally, a charging chamber aqueduct 102 extends from inside the charging chamber 67 to the outside of the charging chamber 67, so that water is able to drain from the charging chamber 67. Further, with the charging chamber aqueduct 102 providing for the draining of water from the charging chamber 67, no plug covers are required, thus advantageously making the charging system both user-friendly and ergonomic.

FIG. 10 is a plan view of the right side of the underwater cleaner showing the charger base attached to the rear body, according to an aspect of the present disclosure. As shown, the charging pins 93 are inserted into the socket 69 in the rear body 12, and by virtue of the same, the charger 90 is entirely supported without the need for brackets and/or hooks on either of the rear body 12 or charger 90. As shown in FIGS. 4 and 10, the charging socket 69 is located generally beneath the flexible ON/OFF switch membrane 66 and includes a pair of charging holes having electrical contacts disposed therein. However, the charging socket 69 may be located anywhere on the rear body 12 and the number of charging holes and electrical contacts is not limited to two, but may be any suitable number.

As indicated, since the pair of charging pins 93 are configured to hold and support the charger 90 onto the rear body 12, no additional brackets, clips, or other structure susceptible to breakage is required to be incorporated into the charger 90 and/or the rear body 12.

Figure 11:
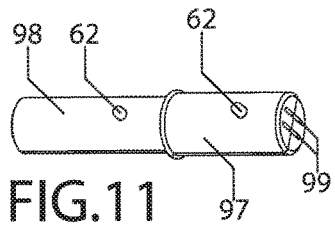
FIG. 11 is a perspective showing a right side of a handle that can be removably attached to the underwater cleaner, according to an aspect of the present disclosure.
Figure 12:
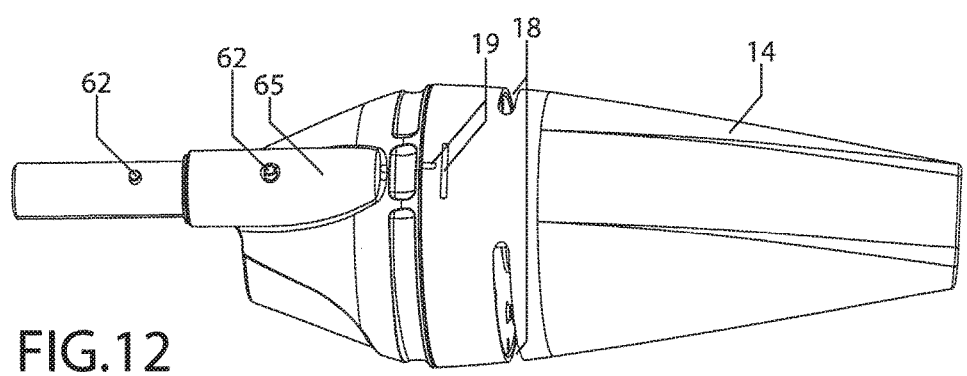
FIG. 12 is a top plan view of one arrangement of the underwater cleaner, according to an aspect of the present disclosure.
Figure 13:
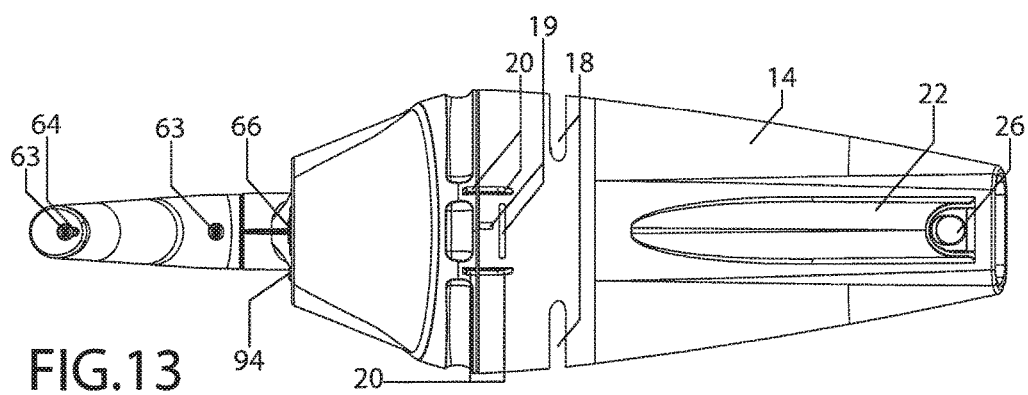
FIG. 13 is a bottom plan view of one arrangement of the underwater cleaner, according to an aspect of the present disclosure.
Figure 14:
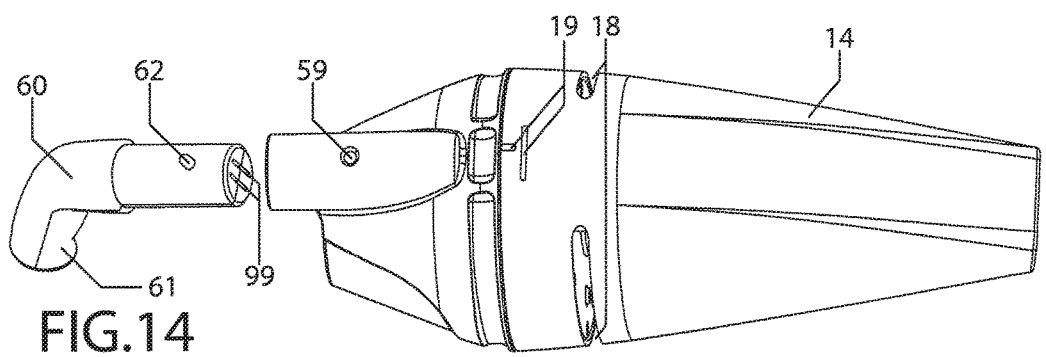
FIG. 14 is an exploded perspective view of one arrangement of the underwater cleaner and a removable handle, according to an aspect of the present disclosure.

FIG. 11 is a perspective showing a right side of a handle that can be attached to the underwater cleaner, according to an aspect of the present disclosure. The handle includes a plurality of v-clips or spring loaded detents (e.g., spring loaded buttons or bayonet mechanisms) that may be depressed to extend the handle into, for example, the handle/pole connector assembly chamber 65. Then, when the detent is aligned with a hole in the chamber 65 for receiving the detent, the detent extends or protrudes through the hole to secure the handle in place. Similarly, the handle may include a second detent for receiving a pole extension onto the handle. Alternatively, the long handle pole may be inserted directly into the chamber 65. As shown, the handle includes a pole connector to section 97, a pole connector bottom section 98, a plurality of v-clips or detents 62. A draining slot 99 is also provided to allow for the drainage of water from the handle. The pole connector bottom section 98 allows for the connection of an extended handle, affording the user with greater reach and coverage.

Various views of the handle attachment are shown in FIGS. 11-14. Thus, one or more handles and/or poles may be used to so that multiple lengths or reach may be obtained by the user. The versatility obtained by allowing one or more handles and/or poles, of various sizes to be used with the rear body 12 allows users to mix and match handles and poles to achieve maximum comfort and utilization of the cleaner 11. In operation, a user can carry and operate the cleaner 11 by lifting the cleaner 11 by the handle 60, 61 which is attached to the pole connector section 97 or the pole connector bottom section 98.

Figure 16:
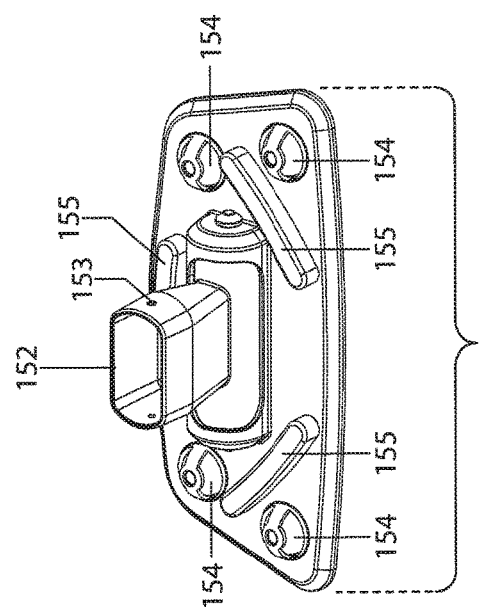
FIG. 16 is a perspective of a suction head for the underwater cleaner, according to an aspect of the present disclosure.
Figure 15:
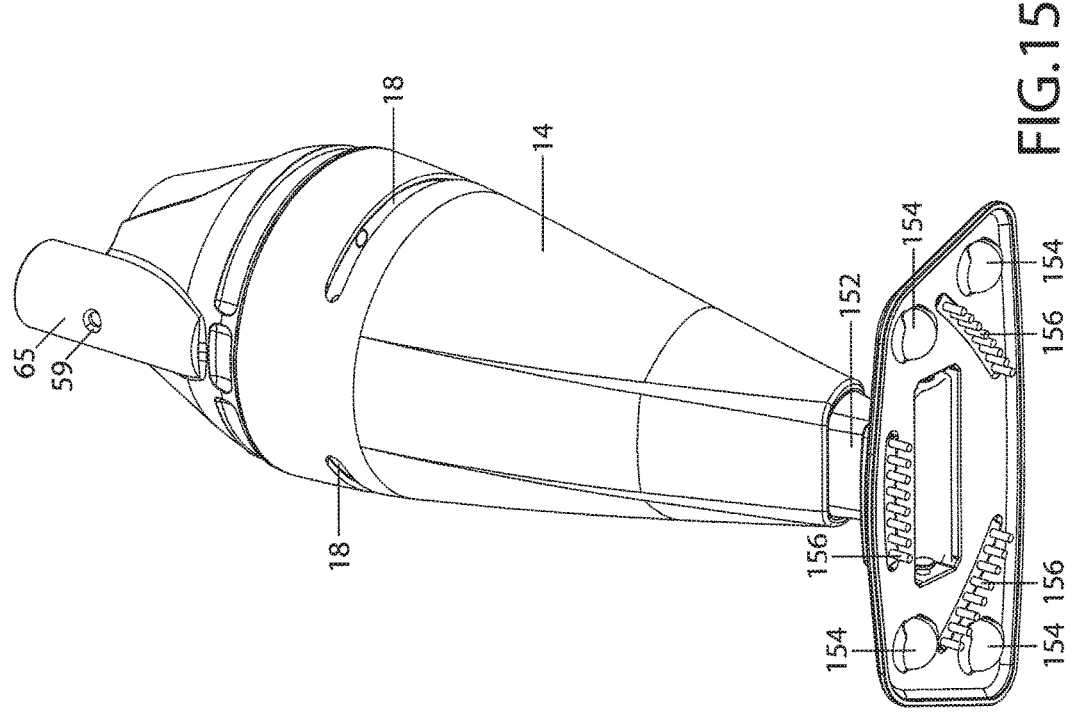
FIG. 15 is a perspective of one arrangement of the underwater cleaner with a suction head, according to an aspect of the present disclosure.

FIG. 15 is a perspective of the underwater cleaner with an attachment, according to an aspect of the present disclosure. FIG. 16 is a perspective of an attachment for the underwater cleaner, according to an aspect of the present disclosure. As shown in FIGS. 15 and 16, a suction head 151 is provided that is removably attachable to the cone-shaped housing 14. A variety of styles and configurations of the suction head 151 may be employed depending upon user preference the cleaning operation desired. For example, narrow spaces such as corners around steps or walls may require a thinner nozzle suction head. As another example, the suction head 151 is an accessory that provides additional features such as a brushing action, a pivoting angle for greater flexibility in cleaning, and smooth motion across the surface being cleaned. In one embodiment, the suction head 151 includes a pivoting suction nozzle 152 attached to the water inlet 15. The pivoting suction nozzle 152 provides versatility and the ability to reach a variety of areas to be cleaned.

The suction head 151 may include a hole 153 that mates with tab 16 to secure the pivoting suction nozzle 152 of the suction head 151 to the water inlet 15. Alternatively, a slot or other attachment mechanism may be provided in lieu of the hole 153 and tab 16 arrangement. The suction head 151 may also include a plurality of rolling balls 154. The rolling balls allow the suction head 151 to easily traverse the surface to be cleaned. The suction head 151 may also include one or more brush chambers 155 that accommodate one or more replaceable brushes 156. The replaceable brushes may be cartridges that are held in the brush chambers 155 and may be replaced by the user as needed. The brushes may be held in by friction or by other fastening devices such as screws. Instead of brushes 156, in another embodiment, squeegees or flappers may be used instead or in addition to. That is, the suction head 151 may include a replaceable squeegee and two replaceable brushes. In yet another embodiment, brushes or squeegees of different lengths may be used, depending upon the type of surface being cleaned.

While the user can operate the cleaner with a suction head 151, it is not necessary and the same principles of operation apply whether or not the suction head 151 is employed. In operation, as rolling balls 154 of the suction head 151 of the cleaner 11 shown in FIG. 15 are guided across a submerged surface with the motor 81 in an ON state, water is ingested through the bottom opening of the suction head 151 and into the pivoting suction nozzle 152 by a suction force generated by the impeller 50.

In operation, a user can connect an appropriate handle length to the handle/pole connector assembly chamber 65 prior to a cleaning operation. Then, the user will depress the flexibly membrane switch 66, which is electrically and/or mechanically connected to the ON/OFF switch 88, which turns the motor 81 ON. As indicated, when the motor 81 is turned ON, the motor shaft 80, the pinion 79, the gear 78, and the shaft 51 cause to turn the impeller shaft 51. When the impeller shaft 51 turns, the impeller rotates, causing a suction force to intake water through the water inlet 15 when the user places the cleaner in the water for a cleaning operation and moves the cleaner about a surface to be cleaned or suspended above the surface in order to remove debris suspended about the bottom of, for example, a pool. If the suction nozzle 152 is used by the user, water passing through the suction nozzle 152 then enters the water inlet 15. In either case, water will then enter the cone-shaped housing 14 and the filter cone 29. As the water traverses the filter cone 29, particulate and debris from the water is filtered from the water by the filter net 37. After the water traverses the filter cone 29, the water enters the grid hole 44. The water entering the grid hole 44 is then expelled from the gap 41 and a slot 18 in the cone-shaped housing 14 to an exterior of the cleaner 11 by continued action of the impeller 50. In this fashion, the gap 41 in the rear body 12 and the slot 18 in the filter cone 29 are coaxially aligned, when assembled, to facilitate the flow of water through the gap 41 and the slot 18 to an exterior of the cleaner 11.

Later, water remaining in the cone shaped housing 14 may be released after the motor 81 is turned OFF, by movement of the draining plug 26 to the outward position when the motor 81 is turned OFF, due to the weight/pressure of the water inside the front body 13, allowing the water to drain from the front body 13, via the draining water channel 22 and the cone draining opening 21. The filter cone 29 may be removed completely and opened in order to easily remove debris collected inside, and to thoroughly clean, for example, with a garden hose, if necessary or desired.

As discussed, a modular system is provided whereby different front bodies may be attached to the rear body, depending upon preference or need of the user. For example, front body 13 or front body 301 may be attached to the rear body 12. In one embodiment, the front body 13 is suitable for smaller areas, hard to reach areas, or where smaller more maneuverable cleaner is desired. Some examples of such small areas include hot tubs, bath tubs, steps of swimming pools, etc. In one embodiment, the front body 301 is suitable for larger areas such as swimming pool bottoms. Yet, the front body 301 may still be used for hot tubs as well. In any event, the user may interchangeably use both the front body 13 and the front body 301, as desired. Advantageously, according to the modular system of this embodiment, the user essentially has two cleaners in one. Of course, the system is not limited to two front bodies, and that any number of front bodies may be used.

FIG. 17 is a side plan view of a second arrangement of the underwater cleaner, according to an aspect of the present disclosure. Advantageously, the present disclosure allows for multiple inlet/filter front bodies to be used with a single rear body 12. The modularity affords the user with greater flexibility and the ability to quickly change the front bodies onto a single rear body.

In FIG. 17, the front body 301 is removably attachable to the rear body 12 in the previously described embodiment. Thus, the front body 301 is an alternative front body to the front body 13.

Figure 23:
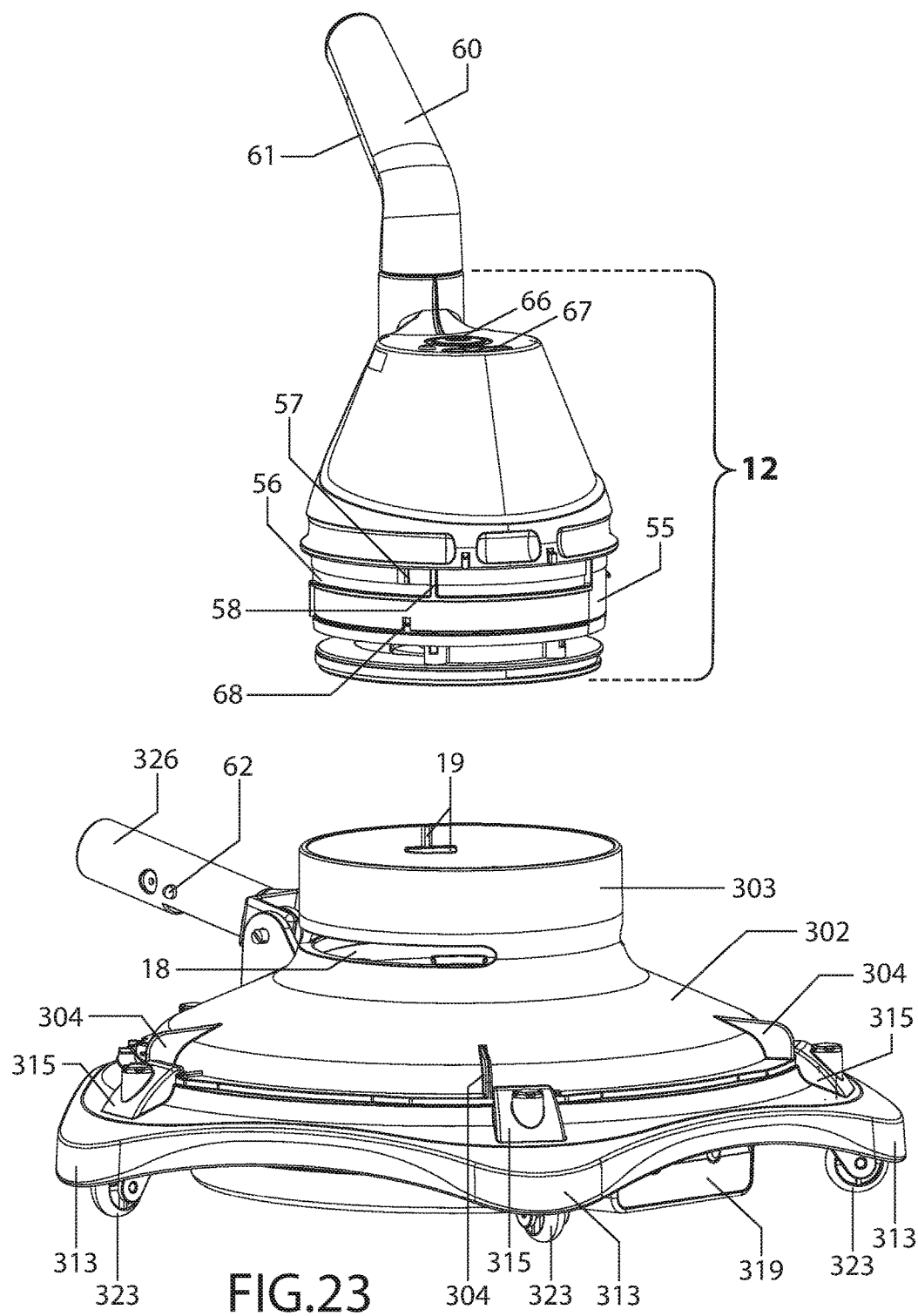
FIG. 23 is an exploded view of the second arrangement of the underwater cleaner, according to an aspect of the present disclosure.

The front body 301 includes a top cover 302, a filter cover 308, and a front base 312 having a collection chamber 316. The top cover 302 includes a side slot opening 18 for the discharge of water to the exterior of the cleaner 11 after having passed through the gap 41 in the rear body 12, as the side slot opening 18 and the gap 41 are coaxially aligned. The side slot opening 18 arranged in a vicinity between the top cover 302 and the top cover extension 303, as is also shown in FIG. 23.

The top cover also includes a vertical and horizontal locking rib 19, which functions the same as in the arrangement with the front body 13. The vertical and horizontal locking rib 19 is located along an edge of the top cover extension 303 as is also shown in FIG. 23. When attached to the rear body 12, at least a portion of the first end of the top cover extension 303 extends over at least part of a gap 41 in the rear body 12. In one embodiment, at least a part of the top cover 302 also extends over at least part of a gap 41 in the rear body 12.

In one embodiment, the front body 301 is substantially pentagonal-shaped. In one embodiment, the top cover 302 is substantially round, appearing dome-like. An upper portion of the top cover 302 includes a top cover extension 303. The top cover extension 303 of the front body 301 is removably attachable to the rear body 12 in the same manner as described previously with respect to FIG. 3. The top cover extension 303 has a radius smaller than a radius of the top cover 302. The smaller radius substantially corresponds to the dimensions of the rear body 12, while the larger radius section of the top cover 302 allows for a greater cleaning swath.

The front body 301 also includes a filter cover 308 and a filter frame 309. In one embodiment, the filter cover 308 and the filter frame 309 are round, matching the appearance of the top cover 302; although, other configurations are possible. A plurality of filter finger grips or tabs 310 are configured on an upper surface of the filter cover 308 so that the user may readily grasp and remove the filter cover 308, for example, in order to remove and/or replace the filter frame 309. The filter grips 30 are raised polygonal-shaped surfaces. A plurality of filter finger grips 310 may be provided to facilitate easier gripping. In one exemplary configuration, the filter finger grips 310 are l-shaped or z-shaped, extending in the direction of the rear body 12.

Filter frame 309 includes a net 37. However, a mesh, or screen for the filtration of debris and particulate from ingested water. In one embodiment, the user may select from a plurality of frames having differing filters, such as a net, screen, mesh, depending upon a degree of filtration desired.

In one embodiment, the front body 301 base section may be pentagonal. A flexible protective collar 313 is provided near the lower periphery of the front body 301 in order to prevent the cleaner from contacting and damaging delicate surfaces including pool liners. In this regard, the flexible protective collar 313 is made from a suitable material such as a polymer. In one embodiment, the flexible protective collar 313 functions to partially shroud each of a plurality of wheels 323.

The front body 301 includes a debris collection chamber 316, which is a main body of the front body 301, which collects debris and particulate from ingested water during operation of the cleaner 11. A flexible suction opening flapper 317 opens by suction created by rotary movement of the impeller 50 to allow debris to enter the debris collection chamber 316. The flexible suction opening flapper 317 closes once the suction generated by the impeller 50 is no longer applied when the rotary movement of the impeller 50 stops, in order to prevent debris from escaping from the debris collection chamber 316. In one embodiment, the suction opening flapper 317 is oval-shaped. A removable drainage filter plate 318 prevents debris from escaping when draining the ingested water from the debris collection chamber 316. In one embodiment, the removable drainage filter plate 318 is a grid or screen to allow water to pass through, but not let debris pass through.

A water drainage opening flap 319 is a water outlet valve that closes when a suction force is created by rotary movement of the impeller 50 and opens when rotary movement of the impeller 50 stops. The water drainage opening flap 319 allows the draining of water front the debris collection chamber 316. The water drainage opening flap 319 is a substantially raised structure on the bottom side surface of the basin 321. In one embodiment, the water drainage opening flap 319 is a rubber or polymer.

A suction nozzle 320, which is substantially oval in shape in one embodiment, is provided along a bottom side of the debris collection chamber 316, in order to allow water and debris to be ingested into the front body 301 by virtue of a suction force created by the impeller. The suction nozzle 320 is located on an opposite corresponding side of a basin 321 from the removable drainage filter plate 318 and flexible suction opening flapper 317.

The basin 321 is provided below the debris collection chamber 316 for storage of a weighted material such as sand or gravel, in order that the cleaner may sink and stay submerged, or suspended above the bottom, to perform underwater cleaning operations. For example, the weighted material will allow the cleaner to remain on the floor, as opposed to lifting off of the floor, of a swimming pool as it is being maneuvered across the floor of the swimming pool. A removable basin cover 322 is provided atop the basin 321, in order to prevent the escape of the weighted material. The basin cover 322 is attached to the basin 321 with a flexible ring in order to provide a watertight seal. In one embodiment, the basin cover 322 is substantially similar to a false floor that is sonic welded onto the basin 321. As shown, a plug 329 covers a hole through which the weighted material is deposited into the basin 321 during manufacture. After the weighted material is deposited into the basin 321, the plug 329 is inserted into the hole, such that the weighted material is completely isolated from water entering the front body 301 through the suction nozzle 320. The plug 329 may be secured into the basin 321 by an adhesive, by friction, or by another suitable fastening arrangement. In an alternative embodiment, the weighted material is deposited into the basin 321 by the user and sealed by the user using the plug 329.

The main body of the front body 301 supports a plurality of wheels 323 that allow maneuverability in 360° of movement. Instead of wheels 323, in another embodiment, rollers or casters may alternatively be provided, in which case, the user would have the option of wheels, rollers, or casters. The wheels 323 are positioned within side posts 324 covered by a decorative cover 325.

Figure 24:
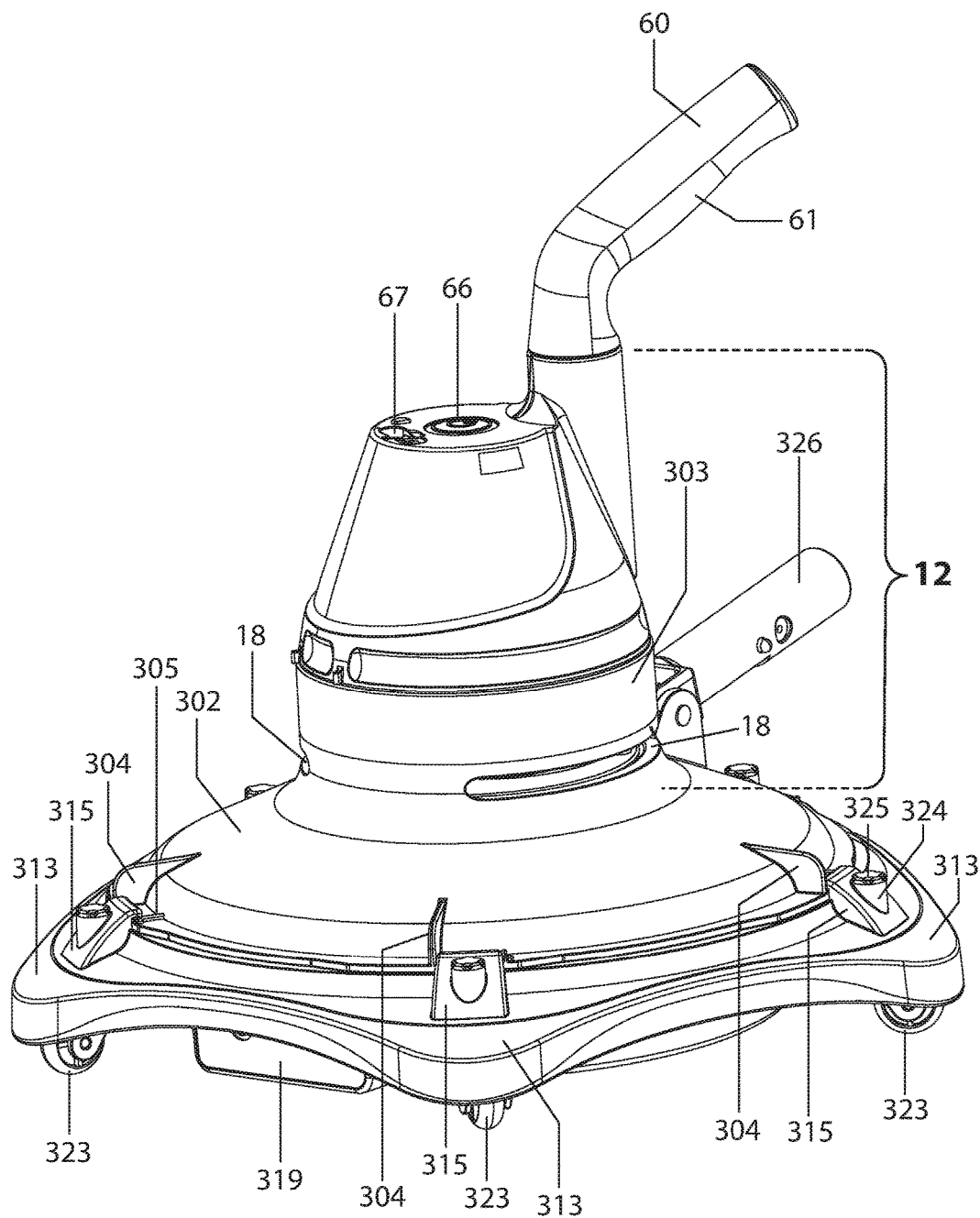
FIG. 24 is a perspective view of the assembled underwater cleaner of the second arrangement, according to an aspect of the present disclosure.

A cylindrically-shaped pole connector 326 affixed to the top cover 302 is for the attachment of a telescopic pole, in a manner as discussed previously or other suitable manner, so that the user may reach greater distances with the cleaner 11. A hinge 327 is provided on the top cover 302 for connection of the pole connector 326 to the front body 301. To secure the pole connector 326 on the hinge 327, a handle locking pin 328 is provided which is insertable through an opening in the hinge 327. A v-clip 62 is provided to secure the pole connector 326. Alternatively, the user may use a handle 60, 61 attached to the rear body 12, as shown in FIG. 24.

Figure 18:
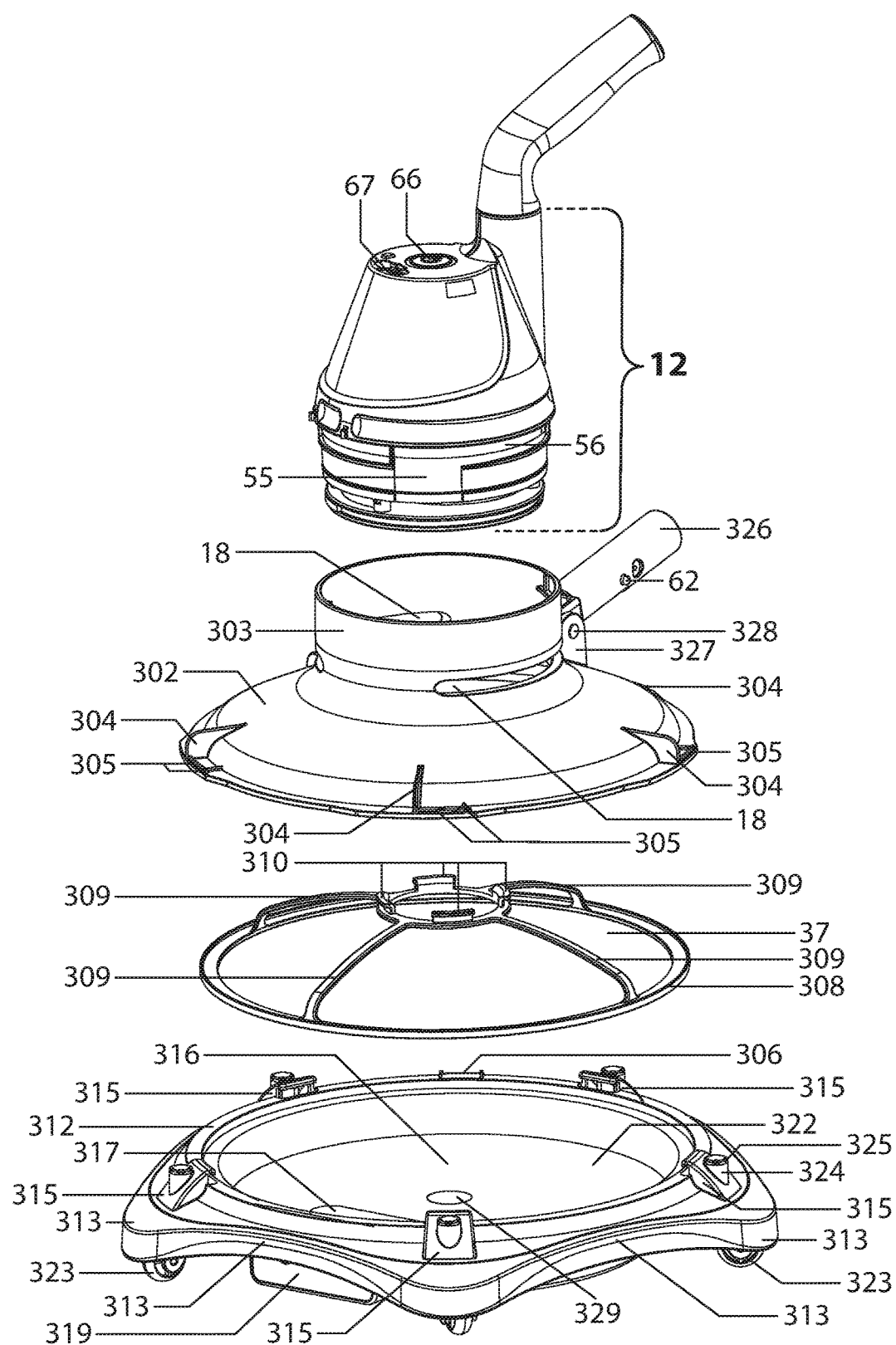
FIG. 18 is an exploded view of the second arrangement of the underwater cleaner, according to an aspect of the present disclosure.

FIG. 18 is an exploded view of the second arrangement of the underwater cleaner, according to an aspect of the present disclosure. The rear body 12 is removably attached to the front body 301. As shown in exploded form, the front body 301 includes three primary pieces that make up the front body, i.e., the top cover 302, the filter cover 308, and the front body base 312 including the debris collection chamber 316.

The top cover extension 303 of the top cover 302 has a smaller radius than the radius of the lower portion of the top cover 302 which has a larger radius, as is shown. The smaller radius of the top cover extension 303 allows the front body 301 to be removably attached to the rear body 12. Cover side flaps 304 on adjacent a periphery of the top cover 302 provide grasping parts for a user to engage to rotate the top cover 302 when installing and removing the top cover 302 from the debris collection chamber 316. The cover side flaps 304 are fin-like projections on an upper surface near a periphery of the top cover 302 and allow a user a raised surface with which to turn the top cover 302. Raised ribs 305 on the top cover 302 are provided for secure engagement with arches 315 on the debris collection chamber 316. The raised ribs 305 are formed near a periphery of the top cover 302 and mate with recessed grooves underneath the arches 315 located on a periphery of the base 312. In one embodiment, the periphery of the base 312 is scallop-shaped, thus advantageously allow affording greater maneuverability around objects.

The filter cover 308 includes the filter frame 309 which is a support including a ribbed or skeletal structure. The finger grips 310 provided atop the filter cover 308 for the user to grasp and rotate the filter cover 308 when installing or removing the filter cover 308. Additionally, a net 37 is provided in in the filter frame 309. In one embodiment, the net 37, mesh, or filter, is integrally formed with the filter frame 309. In another embodiment, the net 37, mesh, or filter is affixed to the inside or outside of the skeletal structure of the filter frame 309. In another embodiment, the net 37, mesh, or filter is sandwiched between upper and lower halves of the ribbed structure of the filter frame 309.

The base 312 includes the flexible protective collar 313, the debris collection chamber 316 includes the flexible suction opening flapper, the drainage opening flap 319, the basin cover 322, the wheels 323, and the side posts 324. As indicated, the water drainage opening flap 319 is a water outlet valve that closes when a suction force is created by rotary movement of the impeller 50 and opens when rotary movement of the impeller 50 stops. The water drainage opening flap 319 allows the draining of water front the debris collection chamber 316.

Figure 19:
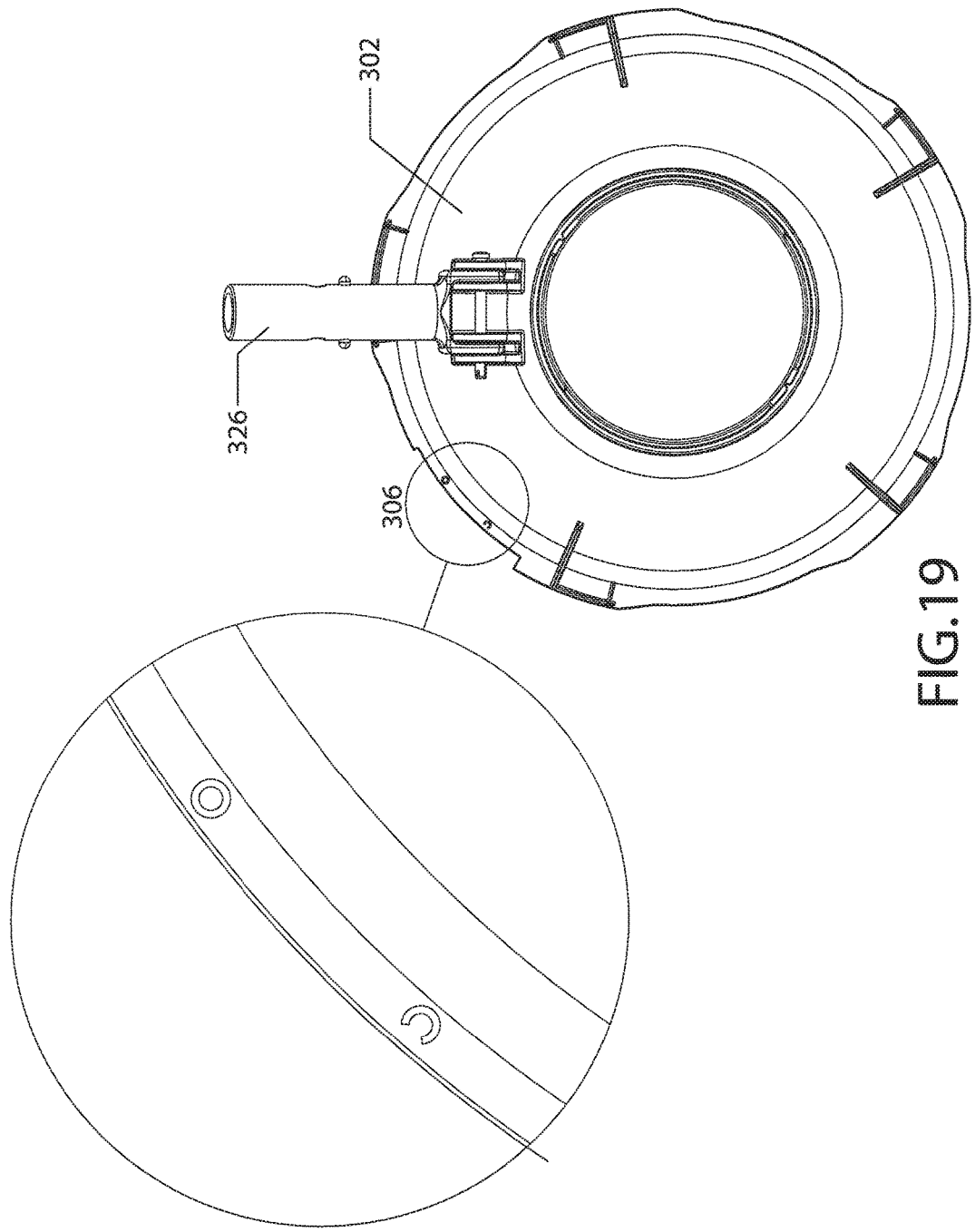
FIG. 19 is a detail view of the top cover of the second arrangement of the underwater cleaner, according to an aspect of the present disclosure.

FIG. 19 is a detail view of a portion of the top cover of the second arrangement of the underwater cleaner, according to an aspect of the present disclosure. The top cover 302 includes an indicator 306 which provides a visual indication to the user that the top cover 302 is on the base 312. The indicator 306 includes an open circle indicator (C) to indicate "open" and a closed circle indicator (O) to indicate "closed". During assembly of the top cover 302 onto the base 312, an open circle indicator marked on the top cover 302 is aligned with an open circle indicator on the base 312. To secure the top cover 302, the top cover 302 is rotated until the closed circle indicator on the top cover 302 is aligned with the closed circle indicator on the base 312.

Figure 20:
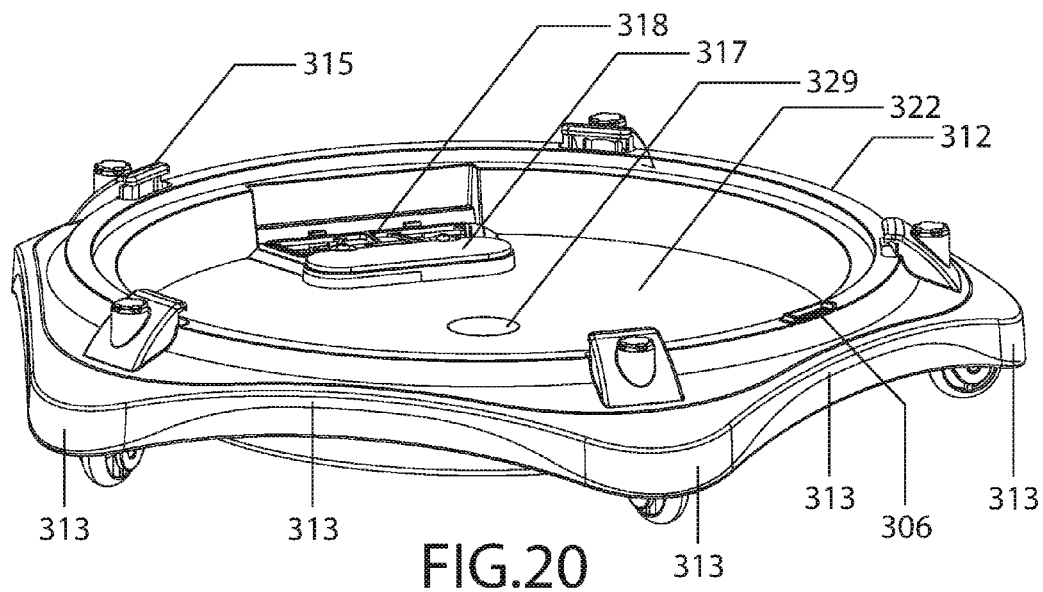
FIG. 20 is a partial perspective of the base of the second arrangement of the underwater cleaner, according to an aspect of the present disclosure.

FIG. 20 is a partial perspective of the base of the second arrangement of the underwater cleaner, according to an aspect of the present disclosure. As shown, the flexible suction opening flapper 317 and the removable drainage opening flap 318 are located substantially along a circumferential edge of the basin cover 322. As indicated, the flexible suction opening flapper 317 opens by suction created by rotary movement of the impeller 50 to allow debris to enter the debris collection chamber 316. The flexible suction opening flapper 317 closes once the suction generated by the impeller 50 is no longer applied when the rotary movement of the impeller 50 stops, in order to prevent debris from escaping from the debris collection chamber 316. A removable drainage filter plate 318 prevents debris from escaping when draining the ingested water from the debris collection chamber 316.

Figure 21:
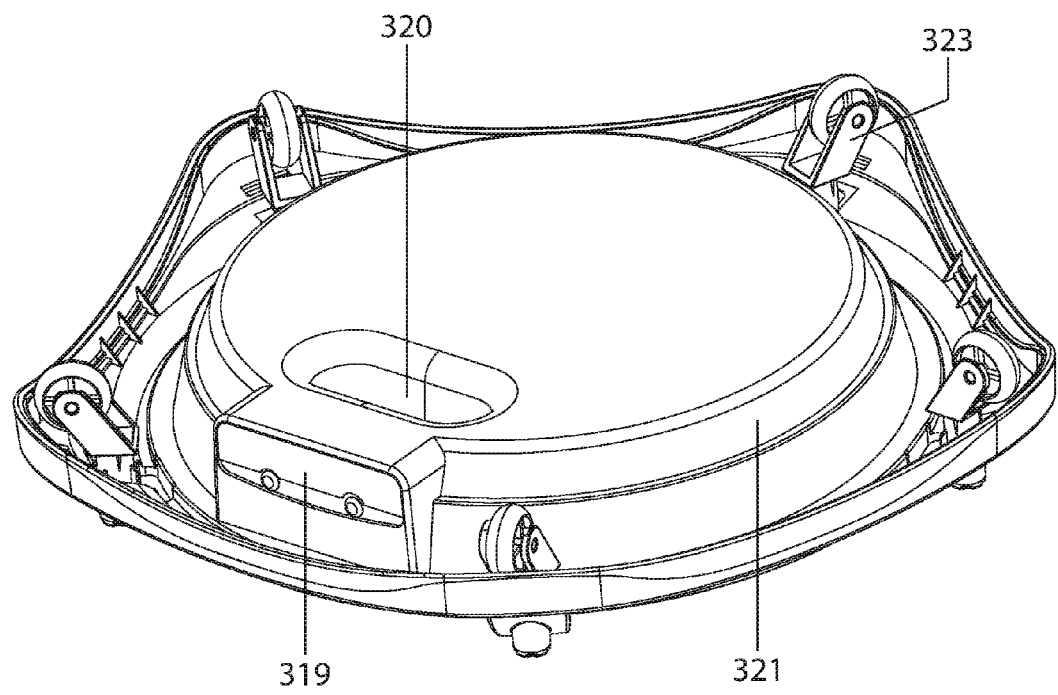
FIG. 21 is a bottom partial perspective of the base of the second arrangement of the underwater cleaner, according to an aspect of the present disclosure.

FIG. 21 is a bottom partial perspective of the second arrangement of the underwater cleaner, according to an aspect of the present disclosure. As shown, the suction nozzle 320 is disposed beneath the flexible suction opening flapper 317 and the removable drainage opening flap 318. The suction nozzle 320 ingests water as the user maneuvers the cleaner 11 across the surface to be cleaned. Water entering the suction nozzle 320 enters the debris collection chamber 316 before traversing the filter 37 where debris and particulate is filtered from the water. Water then traverses through the top cover 320, where it is expelled through the slot 18 in the top cover 302 via the gap 41 in the rear body 12.

Figure 22:
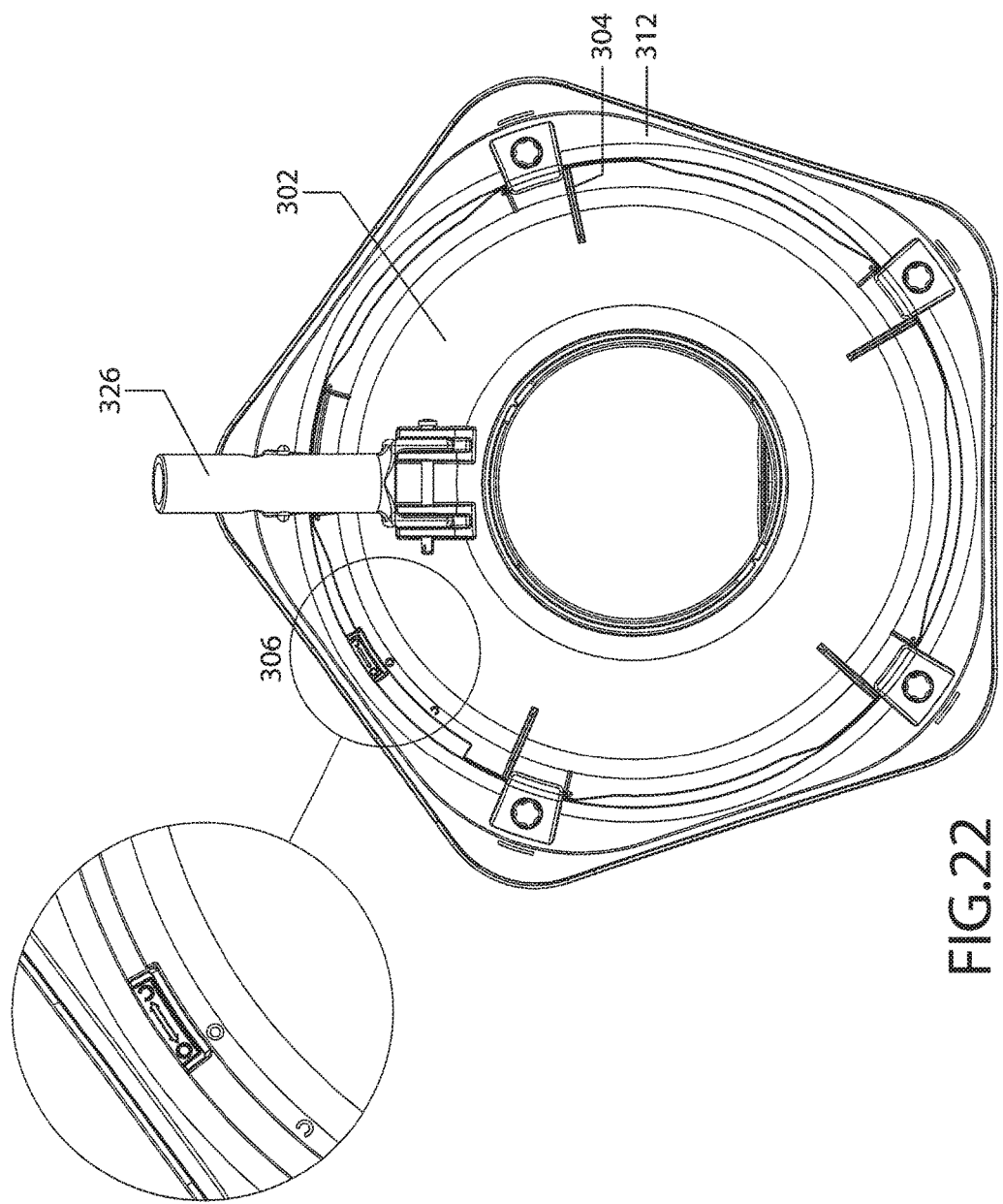
FIG. 22 is a detail view of the base of the second arrangement of the underwater cleaner, according to an aspect of the present disclosure.

FIG. 22 is a detail view of the base of the second arrangement of the underwater cleaner, according to an aspect of the present disclosure. The base 312 includes "open" and "closed" indicators that correspond to the indicators of the top cover 302 discussed with respect to FIG. 19. During assembly of the top cover 302 onto the base 312, an open circle indicator marked on the top cover 302 is aligned with an open circle indicator on the base 312. To secure the top cover 302, the top cover 302 is rotated until the closed circle indicator on the top cover 302 is aligned with the closed circle indicator on the base 312.

FIG. 23 is an exploded view of the second arrangement of the underwater cleaner, according to an aspect of the present disclosure. As shown in FIG. 23, the interface includes vertical and horizontal locking rib 19, matching notch 55, turning track channel 56, tab 57, and turning stopper 58. In order to attach the front body 301 onto the rear body 12, the vertical and horizontal locking rib 19 are aligned with the matching notch 55. In one embodiment, there may be a plurality of vertical and horizontal locking ribs that can be aligned with an equal number of matching notches.

When the vertical locking rib 19 of the top cover extension 303 of the top cover 302 of the front body 301 is aligned with the matching notch 55, a surface of the vertical locking rib 19 is placed into the turning track channel 56. When the vertical locking rib 19 is placed into the turning track channel 56, one of the rear body 12 and top cover extension 303 of the top cover 302 of the front body 301 is rotated with respect to the other of the rear body 12 and the top cover 302 of the front body 301, passing tab 57, until the vertical locking rib 19 contacts the turning stopper 58. At this point, the rear body 12 is securely attached to the top cover extension 303 of the top cover 302 of the front body 301. The horizontal locking rib 19 prevents detachment of the top cover extension 303 of the top cover 302 of the front body 301 from the rear body 12, unless the top cover extension 303 of the top cover 302 of the front body 301 is rotated in a direction away from the turning stopper 58, until the vertical locking rib 19 and the matching notch 55 are again aligned and separation of the rear body 12 and top cover extension 303 of the top cover 302 of the front body 301 is achieved.

When the rear body 12 is securely attached to the top cover extension 303 of the top cover 302 of the front body 301, the filter cover 308 and base 312 may be assembled onto the top cover 302. Alternatively, the filter cover 308 and the base 312 may have already been assembled onto the top cover 302 before connected the rear body 12 with the top cover extension 303.

As indicated, in order to detach the rear body 12 from the top cover extension 303 of the top cover 302 of the front body 301, the user can rotate one of the rear body 12 and top cover extension 303 of the top cover 302 of the front body 301 with respect to the other of the rear body 12 and top cover extension 303 of the top cover 302 of the front body 301, in a direction opposite to the turning stopper 58, clearing the tab 57, until the vertical locking rib 19 is aligned with the matching notch 55, at which time the rear body 12 may be separated from the top cover extension 303 of the top cover 302 of the front body 301. It should be noted that the vertical and horizontal locking rib 19 may alternatively be located on the rear body 12 and the matching notch 55, the turning track channel 56, the tab 57, and the turning stopper 58 may be alternatively be located on the top cover extension 303 of the top cover 302 of the front body 301.

FIG. 24 is a perspective view of the assembled underwater cleaner of the second, according to an aspect of the present disclosure. As shown, the front body 301 has been attached to the rear body 12. In operation, the user depresses flexible membrane switch 66 to turn the motor 81 ON, which turns the shaft 51 and the impeller 50 by virtue of the aforementioned gear 78 and pinion 79. During operation, water is ingested into the suction nozzle 320 and into the base 312. Water then traverses the filter cover 308, where debris and particulate is trapped in the net 37. The water then passes through the top cover 302 where it is discharged via the gap 41 in the rear body and the side slot opening 18 in the top cover 302.

The user can optionally carry, manipulate, and/or maneuver the cleaner 11 with the handle assembly 60, 61, or alternatively, connect a pole or a telescoping pole into the pole connector 326 to achieve a longer reach. When the user has completed a cleaning operation, or when the user wishes to clean the filter or remove collected debris from the debris collection chamber 316, the user can depress the flexible membrane switch again to turn the motor 81 OFF.

When desiring to remove debris from the filter cover 308 or change the filter frame 309, the user can remove the top cover 302 by rotating the same in a direction opposite to the installation direction, with respect to the top cover 302, and lift out the filter frame 309, where it can be removed and cleaned, or replaced. Advantageously, the filter frame 309 is not connected to the rear body 12. At this time, the user could also clear debris from the debris collection chamber 316. Thus, removing and replacing the filter frame 309 is user-friendly. In this regard, the cleaner 11 is practical for cleaning.

In another embodiment, the handle assembly 60, 61 can be a T-handle formed by one vertical portion and a horizontal portion at the user end, such that the user can grip the horizontal portion with two hands.

In operation, a user can connect an appropriate handle length to the pole connector 306 prior to a cleaning operation. Alternatively, the user can use the handle 60, 61. Then, the user will depress the flexibly membrane switch 66 on the rear body 12, which is electrically and/or mechanically connected to the ON/OFF switch 88, which turns the motor 81 ON. As indicated, when the motor 81 is turned ON, the motor shaft 80, the pinion 79, the gear 78, and the shaft 51 cause to turn the impeller shaft 51. When the impeller shaft 51 turns, the impeller 50 rotates, causing a suction force to intake water through the water inlet 15 when the user places the cleaner in the water for a cleaning operation and moves the cleaner about a surface to be cleaned or suspended above the surface in order to remove debris suspended about the bottom of, for example, a pool. When the impeller 50 rotates, the flexible suction opening flapper 317 opens by the suction created by the rotary movement of the impeller 50 to allow water to enter the debris collection chamber 316. The suction nozzle 320 allows water and debris to be ingested into the cleaner by virtue of the suction force created by the impeller 50. Ingested water passes through the base 312 and through the filter cover 308. As the water traverses the filter cover 308, particulate and debris from the water is filtered from the water by the filter net 37. After the water traverses the filter cone 29, the water passes through the top cover 302 enters the grid hole 44 of the rear body 12. The water entering the grid hole 44 is then expelled from the gap 41 and a slot 18 in the cone-shaped housing 14 to an exterior of the cleaner 11 by continued action of the impeller 50. In this fashion, the gap 41 in the rear body 12 and the slot 18 in the filter cone 29 are coaxially aligned, when assembled, to facilitate the flow of water through the gap 41 and the slot 18 to an exterior of the cleaner 11.

The removable drainage filter plate 318 prevents debris from escaping when draining the ingested water from the debris collection chamber 316. The water drainage opening flap 319 is a water outlet valve that closes when a suction force is created by rotary movement of the impeller 50 and opens when rotary movement of the impeller 50 stops. Thus water can be drained from the debris collection chamber 316 without debris escaping, which is retained by the drainage filter plate 318. Later, the user can remove the top cover 302, the filter cover 308, and remove debris from the debris collection chamber 316 and/or net 37. The filter cover 308 may be removed completely and opened in order to easily remove debris collected inside, and to thoroughly clean, for example, with a garden hose, if necessary or desired.

Figure 25:
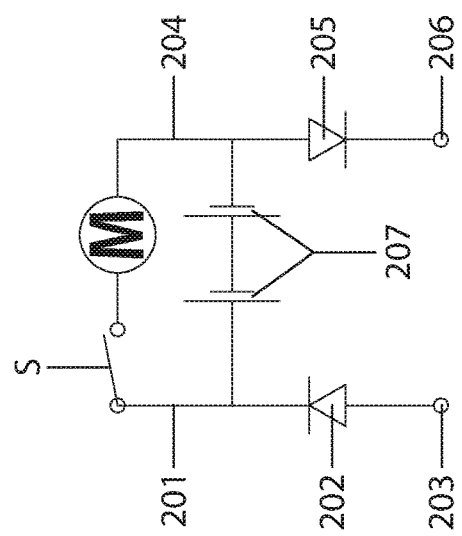
FIG. 25 is a schematic diagram of a charging circuit for, the underwater cleaner, according to an aspect of the present disclosure.

FIG. 25 is a schematic circuit diagram of the circuit arrangement of the cleaner 11. As shown, the circuit includes a motor "M", a switch "S", a battery positive lead 201, a negative lead 204, diodes 202, 205, a positive contact 203, a negative contact 206, and a battery 207. Any combination of diodes, leads, resistors, variable resistors, relays, switches, capacitors, and other electrical elements may be used to provide suitable circuitry to charge the battery and deliver current from the battery to the motor upon actuation of a switch and to operate the cleaner 11. The positive contact 203 and the negative contact 206 correspond to the pair of electrical contacts disposed within the charging holes in the rear of the rear body that can be electrically connected to the pair of charging pins 93, referring to FIGS. 4, 8, and 10. The battery 207 corresponds to the battery pack 87 as shown in FIG. 7.

When the flexible membrane switch 66 is depressed, the output power from the battery 207 is used to drive the motor M. As indicated, when the motor 81 is turned ON, the motor shaft 80, the pinion 79, the gear 78, and the shaft 51 cause to turn the impeller shaft 51.

In another embodiment, the motor 81 can also drive wheels 323 in a self-propelled or semi-self-propelled arrangement. In another embodiment, the output power from the battery 87 can also drive separate drive wheel motors (not shown) for each of the plurality of wheels 323. For example, drive wheel motors may be mounted in or to base 312 which are configured to drive each of the wheels 323. In this fashion, the wheels may assist the user with maneuvering the cleaner 11 during a cleaning operation.

In another embodiment, the motor 81 is a multi-speed or variable speed motor, such that repeated depression of the flexible membrane switch 66 cycles the selection of a speed of the motor 81 between low, medium, and high. In this fashion, a user can determine the speed of the motor to modify the speed of the impeller, thus creating a customizable suction force. In this embodiment, an LED display or indicator light may be mounted on the rear of the rear body 12, so as to indicate the current motor speed setting selected.

In another embodiment, an LED display or indicator light maybe provided to indicate an amount of charge residing in the battery and/or whether charging is currently taking place. In this fashion, the user can visually detect the charge in the battery and when the battery should be charged. Similarly, the user could visually discern whether or not charging is occurring.

In another embodiment, at least one lighting source is provided on an exterior of the cleaner 11 so that the user can operate the cleaner 11 in low ambient light conditions, or when the water in which the cleaner 11 is being operated is stained or murky. In this fashion, the lighting source is powered by the battery pack 87. For example, a strip of LED headlights may be attached to the base 312, the cone-shaped housing 14, or elsewhere on the cleaner.

FIG. 26A is a top plan view of a second embodiment of an interface between a front body and a rear body of the first arrangement with the front body detached from the rear body, according to an aspect of the present disclosure. FIG. 26B is a top plan view of a second embodiment of an interface between a front body and a rear body of the first arrangement with the front body attached to the rear body, according to an aspect of the present disclosure. FIG. 27A is a bottom plan view of a second embodiment of an interface between a front body and a rear body of the first arrangement with the front body detached from the rear body, according to an aspect of the present disclosure. FIG. 27B is a bottom plan view of a second embodiment of an interface between a front body and a rear body of the first arrangement with the front body attached to the rear body, according to an aspect of the present disclosure.

In the second embodiment, the twist and lock interface having the turning track channel 56 and the vertical and horizontal locking rib 19, tab 57, and stopper 58 are not employed. Rather, as shown, the rear body 12 includes a locking knob screw cover 401, a locking knob 402, a locking knob flap 403, a locking knob flange 404, a locking knob fixation screw 405 (FIG. 28), a rear body top locking knob assembly base 406, and a rear body bottom locking knob assembly base 407. A front body housing locking arch 408A and a front body housing locking arch 409A are provided as raised arcuate projections or supports on the cone shaped housing 14 of the front body 13. Thus, this embodiment also includes a lock as an exemplary interface, albeit a different type of lock than that previously described.

The locking knob screw cover 401 covers the locking knob fixation screw 405, or other fastener, which secures each locking knob onto the rear body 12. One locking knob 402 is assembled on each of a top and on a bottom of the rear body 12 onto a respective rear body top locking knob assembly base 406 and rear body bottom locking knob assembly base 407. Each locking knob 402 is substantially circular and dome-like; although, any configuration may be employed.

Figure 28:
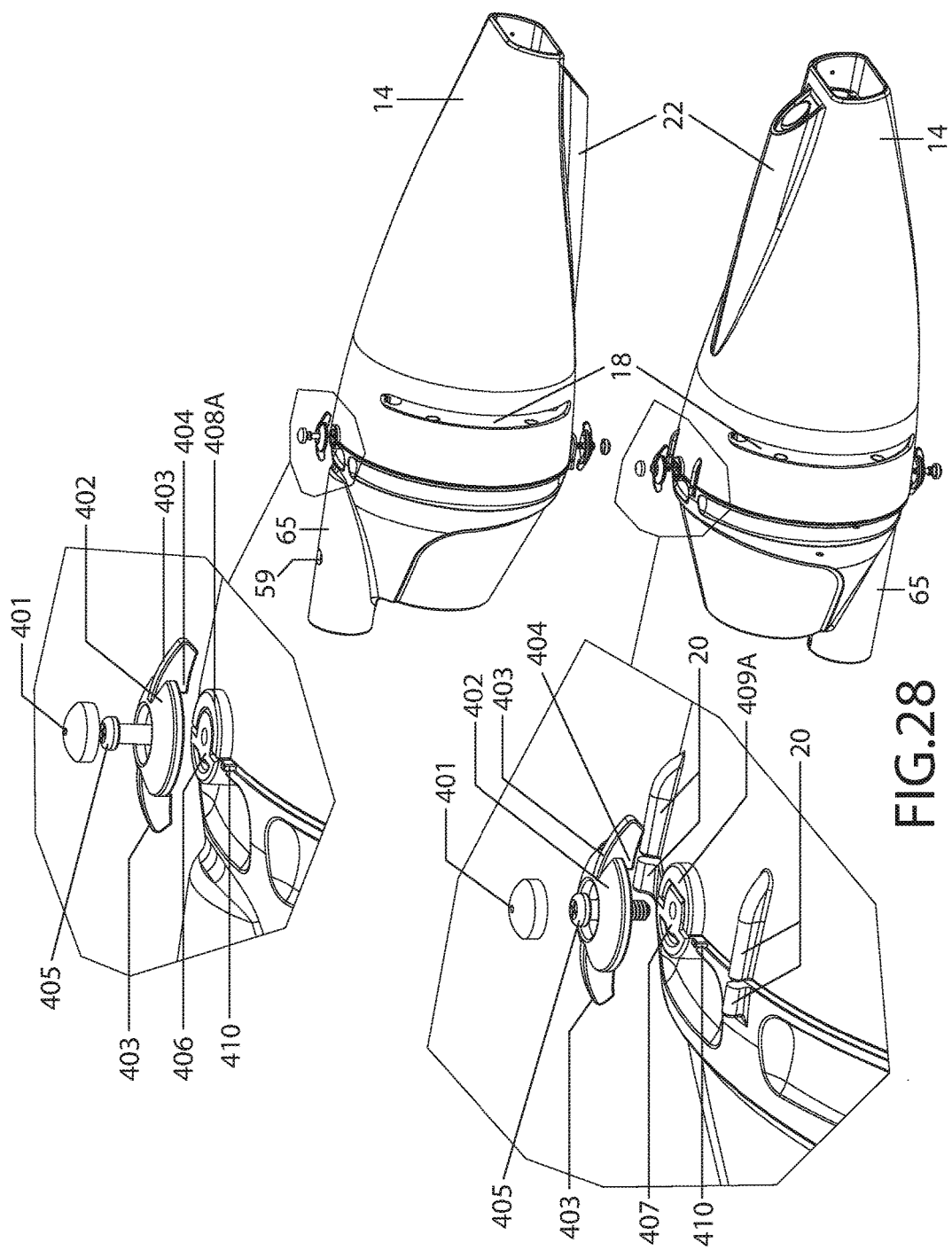
FIG. 28 is a detail exploded view of the second embodiment of the interface between a front body and a rear body of the first arrangement, according to an aspect of the present disclosure.

In order to secure the front body 13 onto the rear body 12, the user turns each of the locking knobs 402, by a finger or thumb on the respective locking knob flap 403, in a clockwise direction so that a locking knob flange 404 (i.e., engagement surface) on each of the locking knobs 402 contacts and rests upon the respective front body housing locking arch 408A (i.e., engagement receiving surface) and front body housing locking arch 409A (engagement receiving surface). Rotation of the locking knobs 402 in the clockwise direction is stopped by a locking knob turning stopper 410 on each of the rear body top locking knob assembly base 406 and rear body bottom locking knob assembly base 407, respectively, that corresponds with each of the locking knobs 402 (FIG. 28). Each of the locking knob turning stoppers 410 prevent the over rotation of a corresponding one of the locking knobs 402. In this fashion, when both of the locking knobs 402 have been rotated in a clockwise direction as described, the front body 13 is secured to the rear body 12.

The locking knob flaps 403 are projections that extend beyond the periphery of each locking knob 402. Any suitable number of locking knob flaps 403 may be provided to facilitate the user's grasp of the locking knob 402.

In order to remove the front body 13 from the rear body 12, the user turns each of the locking knobs 402, by a finger or thumb on the respective locking knob flap 403, in a counter-clockwise direction so that the locking knob flange 404 (i.e., engagement surface) on each of the locking knobs 402 is rotated off of the respective front body housing locking arch 408A (i.e., engagement receiving surface) and the front body housing locking arch 409A (engagement receiving surface). In this fashion, when both of the locking knobs 402 have been rotated in the counter-clockwise direction as described, the front body 13 may be removed from the rear body 12. Of course, in an alternative embodiment, the counter-clockwise direction could be for assembly and the clockwise direction could be for disassembly.

The construction of the rear body top locking knob assembly base 406 is substantially the same as the rear body bottom locking knob assembly base 407. In one embodiment, a shape of the rear body top locking knob assembly base 406 differs from the shape of the rear body bottom locking knob assembly base 407, as the shape of each is governed by the shape of the rear body 12 and the direction with which the front body 13 or top cover extension 303 are assembled onto the rear body 12. That is, by using a different shape, a user would be prevented from installing the cone shaped housing 14 in the wrong direction, i.e., rotated by 180° with respect to the rear body 12. In this fashion, the rear body top locking knob assembly base 406 will only be installed with one of the locking arches 408A or 409A. For example, the shape of the shape of the rear body top locking knob assembly base 406 and the rear body bottom locking knob assembly base 407 will each match only one of the front body housing locking arch 408A and the front body housing locking arch 409A.

The front body housing locking arch 408A and the front body housing locking arch 409A are each provided on one side of the cone shaped housing 14 of the front body 13 to be secured by a respective locking knob flange 404. Similarly, the construction of the front body housing locking arch 408A and the front body housing locking arch 409A is the substantially the same.

As will be discussed and shown in FIGS. 32 and 33, a front body housing side locking arch 408B and a front body housing side locking arch 409B, both of which are attached to the top cover extension 303 perform substantially identical functions as the front body housing locking arch 408A and the front body housing locking arch 409A.

Each of the locking knob flanges 404 (engagement surfaces) of the rear body 12 is a substantially flat edge configured to secure a respective one of the locking arches 408A, 409A, (engagement receiving surfaces), when rotated to rest upon a respective one of the locking arches 408A, 409A. Each of the locking arches 408A, 409A includes a semi-circular ridge. In another embodiment, the semi-circular ridge may be a shape other than semi-circular, such as generally rectangular or triangular.

In another embodiment, each of the locking knobs 402 are integrally formed with the rear body 12 rather than being secured with a respective fixation screw 405.

In one embodiment, each of the arches 408A, 409A are attached to the cone shaped housing 14 of the front body 13 by a molding technique or a fastener. In another embodiment, each of the arches 408A, 409A is integrally formed with the cone shaped housing 14 of the front body 13.

In a one embodiment, the knobs 402, flaps 403, flanges 404, bases 406 and 407 reside on the rear body 12 and the arches 408A, 409A reside on the cone shaped housing 14 of the front body 13. However, in an alternative embodiment, the arches 408A, 409A (engagement receiving surfaces) reside on the rear body 12 and the knobs 402, flaps 403, flanges 404, bases 406 and 407 reside on the cone shaped housing 14 of the front body 13.

Advantageously, the engagement surfaces and engagement receiving surfaces allow for the removable attachment of the rear body 12 and the front body 13, respectively, as discussed. In this fashion, a user may connect the rear body 12 to multiple front bodies, such as front body 13, depending upon need or preference. The interface provides a simple, efficient, and user friendly configuration for attaching and detaching the rear body 12 from the front body 13. Further, since at least a portion of the front body 13 is placed over the gap 41 in the rear body, the filter cone 29 need not be connected to the rear body 12, allowing for easier cleaning.

FIG. 28 is a detail exploded view of the second embodiment of the interface between a front body and a rear body of the first arrangement, according to an aspect of the present disclosure. As shown, each of the locking knobs 402 are affixed to a respective locking knob assembly base 406, 407 by the fixing screw 405 covered by the screw cover 401. The locking knobs 402 and the locking knob assembly bases 406, 407 are substantially round; however, any shaped may be employed. The stoppers 410 extend outwardly from each of the locking arches 408A, 409A to prevent the over rotation of the locking knobs 402. As shown, the rear body bottom locking knob assembly base 407 is located between feet 20; although, any suitable location may accommodate the base 407.

FIG. 29 is a detail exploded view of the second embodiment of the interface between a front body and a rear body in a knob locking position of the first arrangement, according to an aspect of the present disclosure. As shown, the locking knob 402 has been rotated in a clockwise direction such that the flange 404 is resting on the locking arch 408A.

FIG. 30 is a detail exploded view of the second embodiment of the interface between a front body and a rear body in a knob release position of the first arrangement, according to an aspect of the present disclosure. As shown, the locking knob 402 has been rotated in a counter-clockwise direction such that the flange 404 does not rest on the locking arch 408A.

Figure 31A:
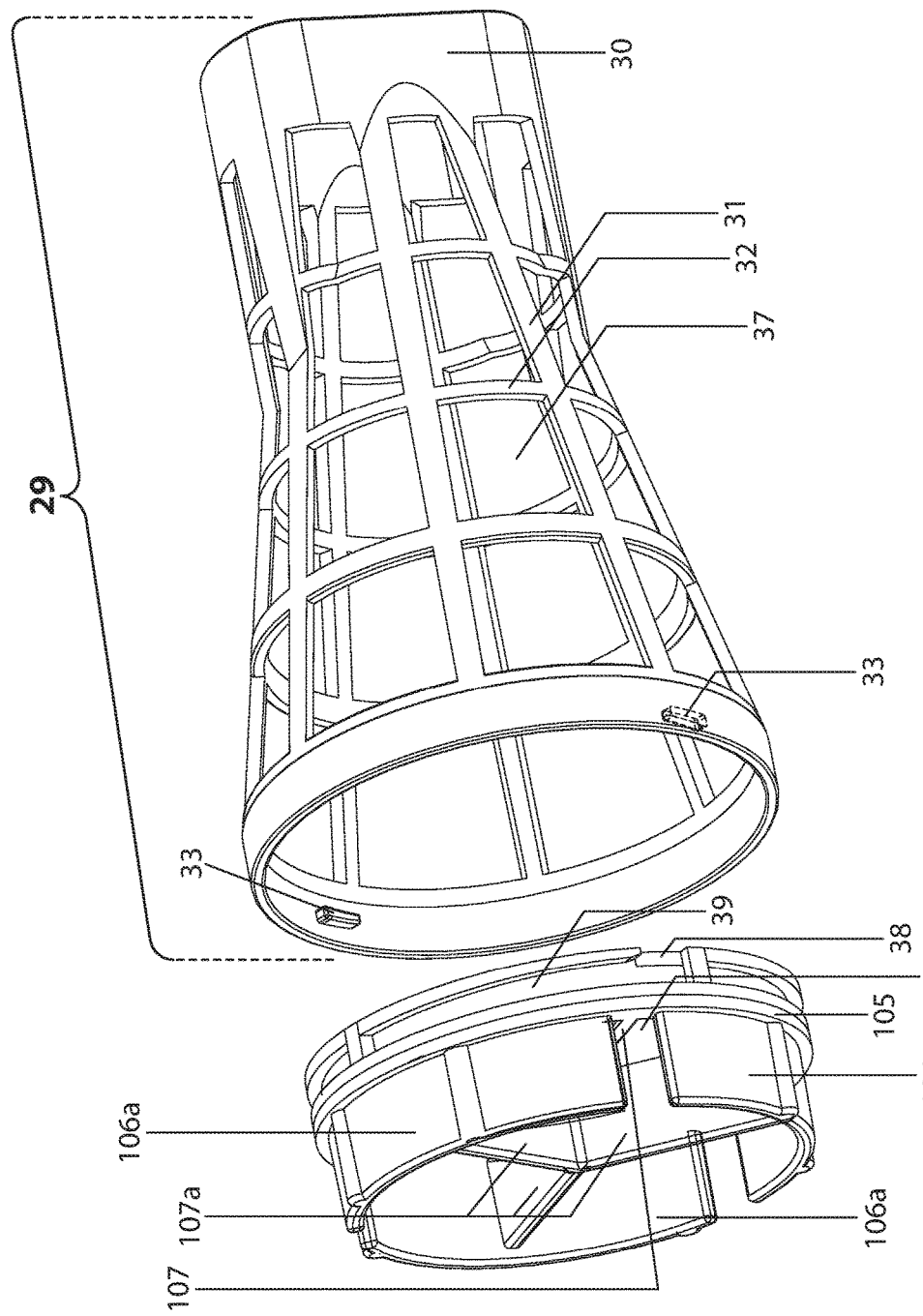
FIG. 31A is an exploded view of an embodiment of the filter cone 29 of the first arrangement, according to an aspect of the present disclosure.

FIG. 31A is an exploded view of an embodiment of the filter cone 29 of the first arrangement, according to an aspect of the present disclosure. In this embodiment, a filter cone base 105 serves as the base for the filter cone 29 and is rotatable to install and remove the base 105 from the filter cone 29. The matching notch 38 is aligned to the rib 33 and is turned along the turning track 39 until it stops to close the base 105 onto the filter cone 29, at which time the filter cone 29 is ready to be used.

A filter bottom side extension 106*a* is an extension on the filter base 105 that is provided for user to grasp the filter base 105 when attempting to install and remove the base 105 from the filter cone 29. That is, the filter bottom side extension 106*a* provides for a finger or fingers to hold and turn the filter base 105 when it is desired to remove debris inside the filter cone 29. A filter base support rib 107 is provided at an end of the filter base 105. A y-shaped middle extension support 107*a* provides for a finger or fingers to hold and turn the filter base 105 when it is desired to remove debris inside the filter cone 29. The filter bottom side extension 106*a* and the y-shaped middle extension support 107*a* also provide a space between the filter cone 29 and grid hole 44 in order to maximize suction force when the filter cone 29 becomes full of debris. Essentially, the sliding rib 33 guides the filter cone 29 onto turning track channel 39 of the filter cone base 105, and then secures the filter cone 29 onto the filter cone base 105. Filter cone base y-shaped middle extension support 107*a* reinforces the filter cone base 105 and are connected to the net 37, such that the net 37 is on the ribs of the filter cone 29 and on the filter cone base 105, e.g., supported by, merged with or attached on, etc.

As shown, a plurality (e.g., three) gaps in the base 105 form three discrete sub-rings. The gaps, which are in the range of 0.25 cm-5.0 cm each and preferably in the range of 0.5 cm-2.0 cm, serve to enable better flow of water from the sides of the filter cone 29 in towards a grid hole 44. Advantageously, the filter cone 29 is not connected to the rear body 12. Thus, removing and replacing the filter cone 29 is user-friendly. In this regard, the cleaner 11 is practical for cleaning.

Figure 31B:
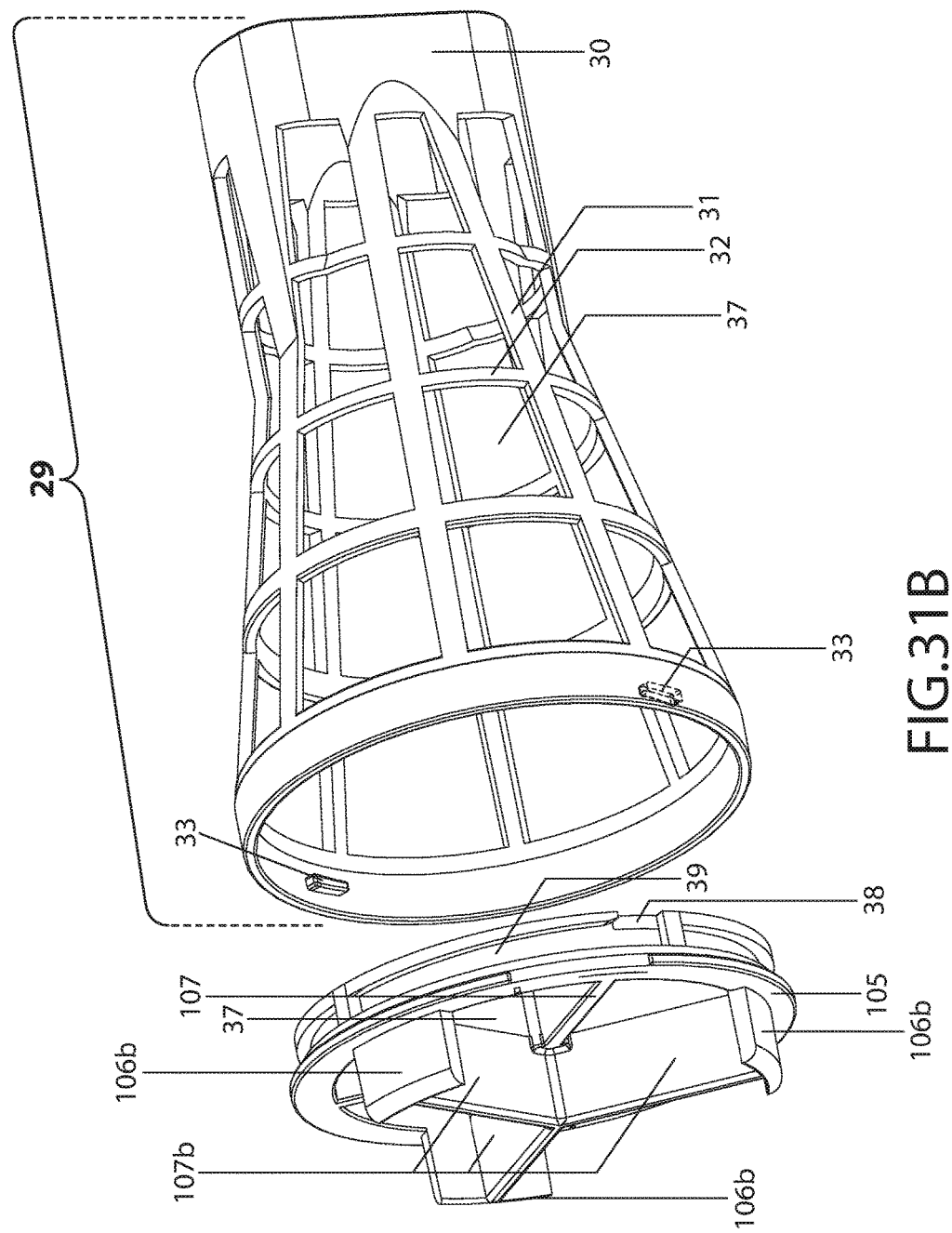
FIG. 31B is an exploded view of another embodiment of the filter cone 29 of the first arrangement, according to another aspect of the present disclosure.

FIG. 31B is an exploded view of another embodiment of the filter cone 29 of the first arrangement, according to another aspect of the present disclosure. In the embodiment of FIG. 31B, the y-shaped middle extension support 107*b* includes a plurality of bottom side extensions 106*b* at each distal end of the y-shaped support rib 107*b*. The bottom side extensions 106*b* extend fractionally in the circumferential direction from each distal end of the y-shaped middle extension support 107*b* by a length shorter than a length of one leg of the y-shaped middle extension support 107*b*. For example, the bottom side extensions 106*b* are arcuate circumferential extensions. As shown in FIG. 31B, gaps between the bottom side extensions 106*b* are longer than the bottom side extensions 106*b* themselves, creating more ergonomic gripping structures for the user. The y-shaped middle extension support 107*b* provides for a finger or fingers to hold and turn the filter base 105 when it is desired to remove debris inside the filter cone 29. The filter bottom side extension 106*b* and the y-shaped middle extension support 107*b* also provide a space between the filter cone 29 and grid hole 44 in order to maximize suction force when the filter cone 29 becomes full of debris. The truncated filter cone base side extensions 106*b* allow for a greater water flow and reduced possibility of clogging by debris.

Figure 31C:
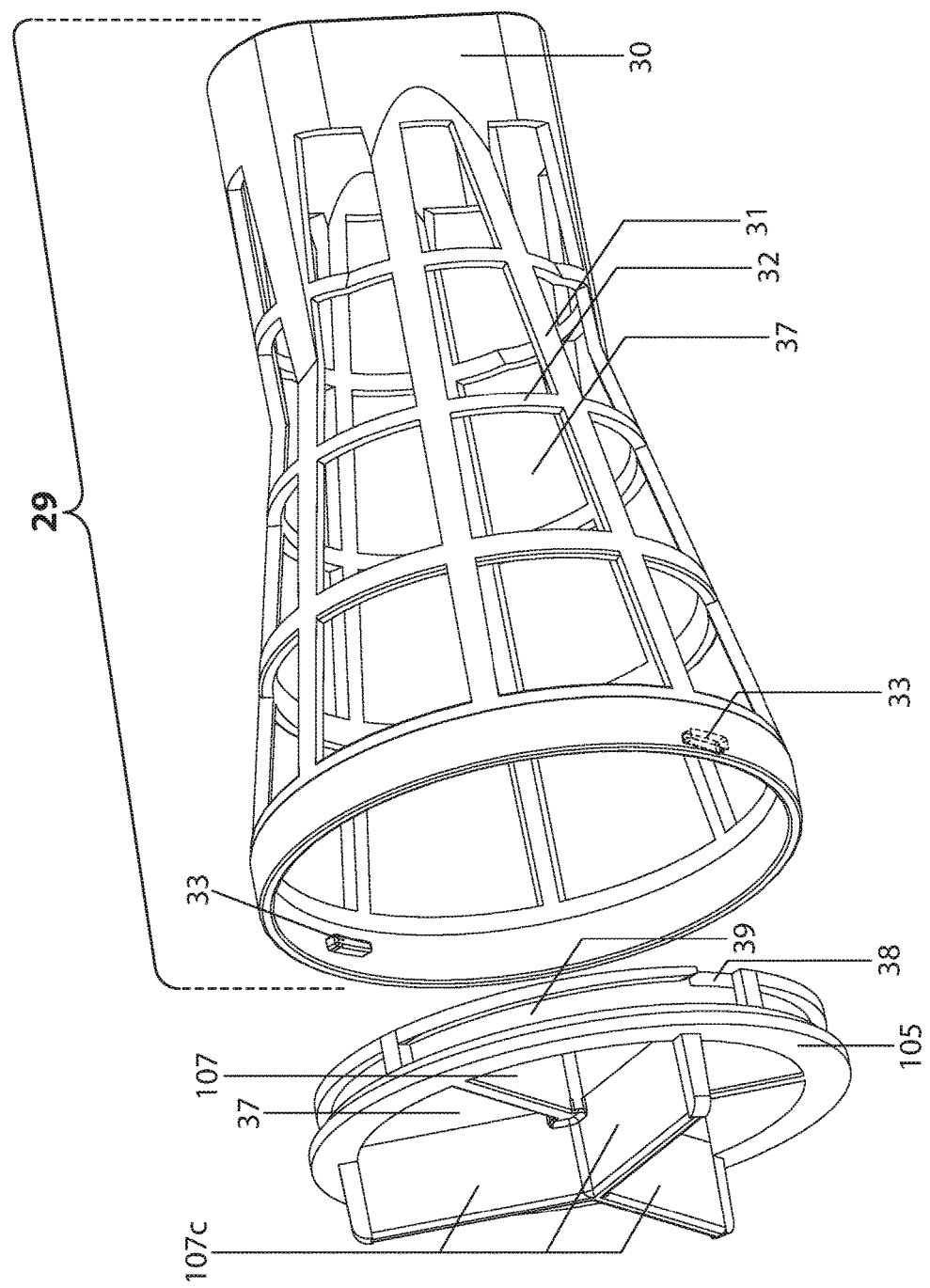
FIG. 31C is an exploded view of another embodiment of the filter cone 29 of the first arrangement, according to another aspect of the present disclosure.

FIG. 31C is an exploded view of another embodiment of the filter cone 29 of the first arrangement, according to another aspect of the present disclosure. In the embodiment of FIG. 31C, the y-shaped middle extension support 107*c* is provided without any bottom side extensions such as then in FIGS. 31A and 31B. Thus, a user may grasp one or more legs of the y-shaped middle extension support 107*c* when attempting to install and remove the base 105 from the filter cone 29. The y-shaped middle extension support 107*c* provides for a finger or fingers to hold and turn the filter base 105 when it is desired to remove debris inside the filter cone 29. The y-shaped middle extension support 107*c* also provides a space between the filter cone 29 and grid hole 44 in order to maximize suction force when the filter cone 29 becomes full of debris. The lack of filter cone base side extensions allow for a greater water flow and reduced possibility of clogging by debris.

Figure 32:
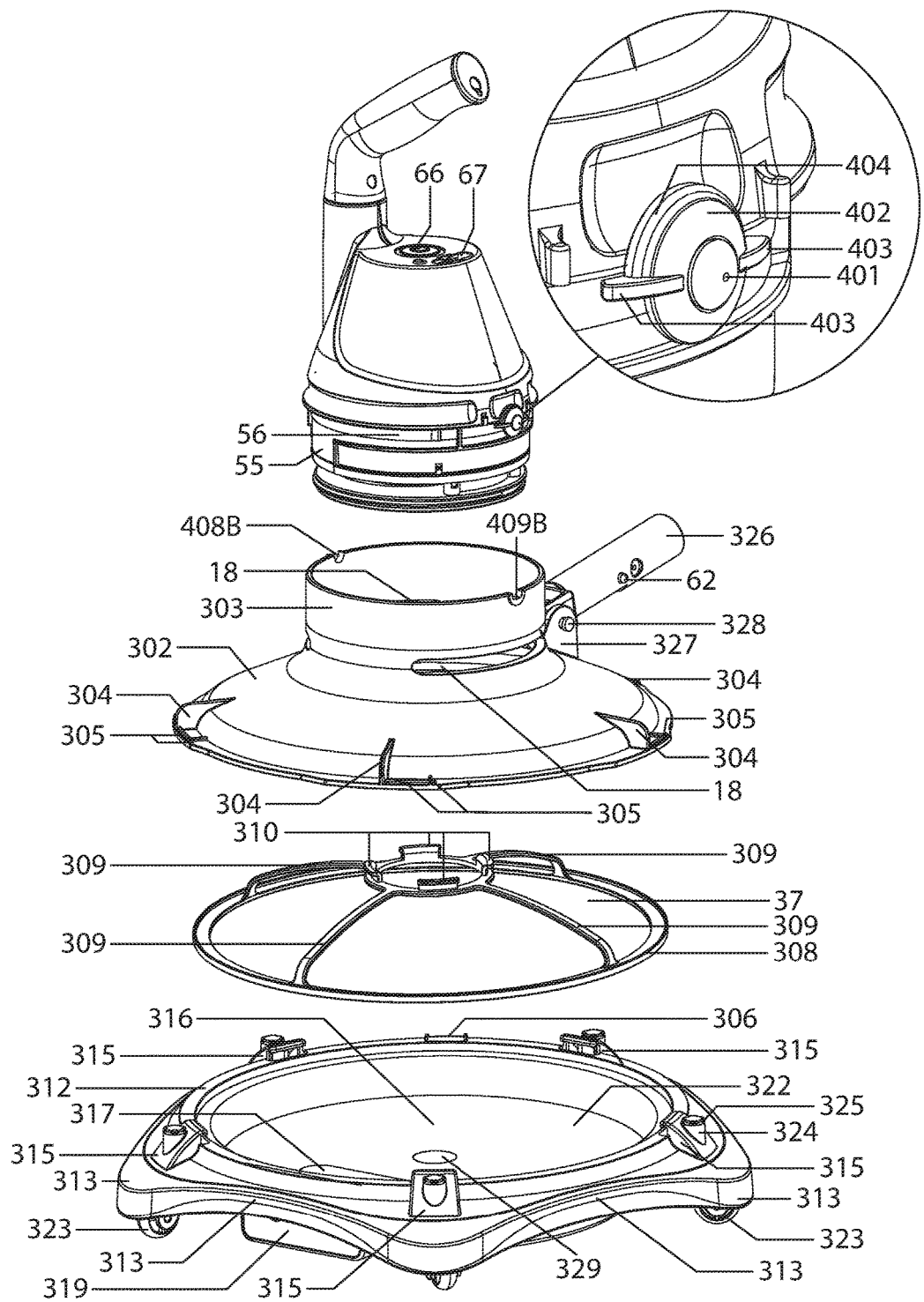
FIG. 32 is a detail exploded view of the second embodiment of the interface between a front body and a rear body of the second arrangement of the underwater cleaner, according to an aspect of the present disclosure.

FIG. 32 is a detail exploded view of the second embodiment of the interface between a front body and a rear body of the second arrangement of the underwater cleaner, according to an aspect of the present disclosure. The locking knob screw cover 401, the locking knob 402, the locking knob flap 403, and the locking knob flange 404 are identical to that as discussed above with respect to FIGS. 26A, 26B, 27A, 27B, and 28. In this arrangement, however, the rear body 12 is secured to the top cover extension 303 of the cover 302, and as a result, to the front body 301.

The front body housing side locking arch 408B (engagement receiving surface) and the front body housing side locking arch 409B (engagement receiving surface) are located on an edge of the top cover extension 303 to be secured by a respective locking knob flange 404 (engagement surface), in a manner described above.

The locking knob screw cover 401 covers the locking knob fixation screw 405, or other fastener, which secures each locking knob onto the rear body 12. One locking knob 402 is assembled on each of a top and on a bottom of the rear body 12 onto a respective rear body top locking knob assembly base 406 and rear body bottom locking knob assembly base 407.

In order to secure the top cover 302 of the front body 301 onto the rear body 12, the user turns each of the locking knobs 402 (one located on either side of the rear body), by a finger or thumb on a respective locking knob flap 403, in a clockwise direction so that a locking knob flange 404 (i.e., engagement surface) on each of the locking knobs 402 contacts and rests upon a respective front body housing side locking arch 408B (i.e., engagement receiving surface) and front body housing side locking arch 409B (engagement receiving surface). Rotation of the locking knobs 402 in the clockwise direction is stopped by a locking knob turning stopper 410 on each of the rear body top locking knob assembly base 406 and rear body bottom locking knob assembly base 407, respectively, that corresponds with each of the locking knobs 402 (FIG. 28). Each of the locking knob turning stoppers 410 prevent the over rotation of a corresponding one of the locking knobs 402. In this fashion, when both of the locking knobs 402 have been rotated in a clockwise direction as described, the top cover 302 of the front body 301 is secured to the rear body 12.

In order to remove the top cover 302 of the front body 301 from the rear body 12, the user turns each of the locking knobs 402, by a finger or thumb on a respective locking knob flap 403, in a counter-clockwise direction so that the locking knob flange 404 (i.e., engagement surface) on each of the locking knobs 402 is rotated off of the respective front body housing side locking arch 408B (i.e., engagement receiving surface) and the front body housing side locking arch 409B (engagement receiving surface). In this fashion, when both of the locking knobs 402 have been rotated in the counter-clockwise direction as described, the top cover 302 of the front body 13 is secured to the rear body 12. Of course, in an alternative embodiment, the counter-clockwise direction could be for assembly and the clockwise direction could be for disassembly.

The construction of the rear body top locking knob assembly base 406 is substantially the same as the rear body bottom locking knob assembly base 407. In one embodiment, a shape of the rear body top locking knob assembly base 406 differs from the shape of the rear body bottom locking knob assembly base 407, as the shape of each is governed by the shape of the rear body 12 and the direction with which the top cover 301 of the front body 13 or top cover extension 303 are assembled onto the rear body 12. That is, by using a different shape, a user would be prevented from installing the cover top extension 303 in the wrong direction, i.e., rotated by 180° with respect to the rear body 12. In this fashion, the rear body top locking knob assembly base 406 will only be installed with one of the locking arches 408B or 409B. For example, the shape of the shape of the rear body top locking knob assembly base 406 and the rear body bottom locking knob assembly base 407 will each match only one of the front body housing locking arch 408B and the front body housing locking arch 409B.

The front body housing side locking arch 408B and the front body housing side locking arch 409B are each provided on one side of the top cover extension 303 to be secured by a respective locking knob flange 404. Similarly, the construction of the front body housing side locking arch 408B and the front body housing side locking arch 409B is the substantially the same.

Accordingly, the front body housing side locking arch 408B and the front body housing side locking arch 409B, both of which are attached to the top cover extension 303 perform substantially identical functions as the front body housing locking arch 408A and the front body housing locking arch 409A.

Each of the locking knob flanges (engagement surfaces) of the rear body 12 is a substantially flat edge configured to secure a respective one of the side locking arches 408B, 409B (engagement receiving surfaces), when rotated to rest upon a respective one of the side locking arches 408B, 409B. Each of the locking arches 408B, 409B includes a semi-circular ridge. In another embodiment, the semi-circular ridge may be a shape other than semi-circular, such as generally rectangular or triangular.

In another embodiment, each of the locking knobs 402 are integrally formed with the rear body 12 rather than being secured with a respective fixation screw 405.

In one embodiment, each of the side locking arches 408B, 409B are attached to the top cover extension 303, respectively, by a molding technique or a fastener. In another embodiment, each of the side locking arches 408B, 409B is integrally formed with the front body 301 or top cover extension 303, respectively.

In one embodiment, the locking arches 408A, 408B, 409A, and 409B are arcuate notches.

In a one embodiment, the knobs 402, flaps 403, flanges 404, bases 406 and 407 reside on the rear body 12 and the side locking arches 408B, 409B reside on the top cover 303 of the front body 301. However, in an alternative embodiment, the side locking arches 408B, 409B (engagement receiving surfaces) reside on the rear body 12 and the knobs 402, flaps 403, flanges 404, bases 406 and 407 reside on the top cover extension 30 of the front body 301.

Advantageously, the engagement surfaces and engagement receiving surfaces allows for the removable attachment of the rear body 12 and the top cover extension 303, respectively, as discussed. In this fashion, a user may connect the rear body 12 to multiple front bodies, such as front body 301, depending upon need or preference. The interface provides a simple, efficient, and user friendly configuration for attaching and detaching the rear body 12 from the front body 301. Further, since at least a portion of the front body 301 is placed over the gap 41 in the rear body, the filter frame 309 need not be connected to the rear body 12, allowing for easier cleaning.

Figure 33:
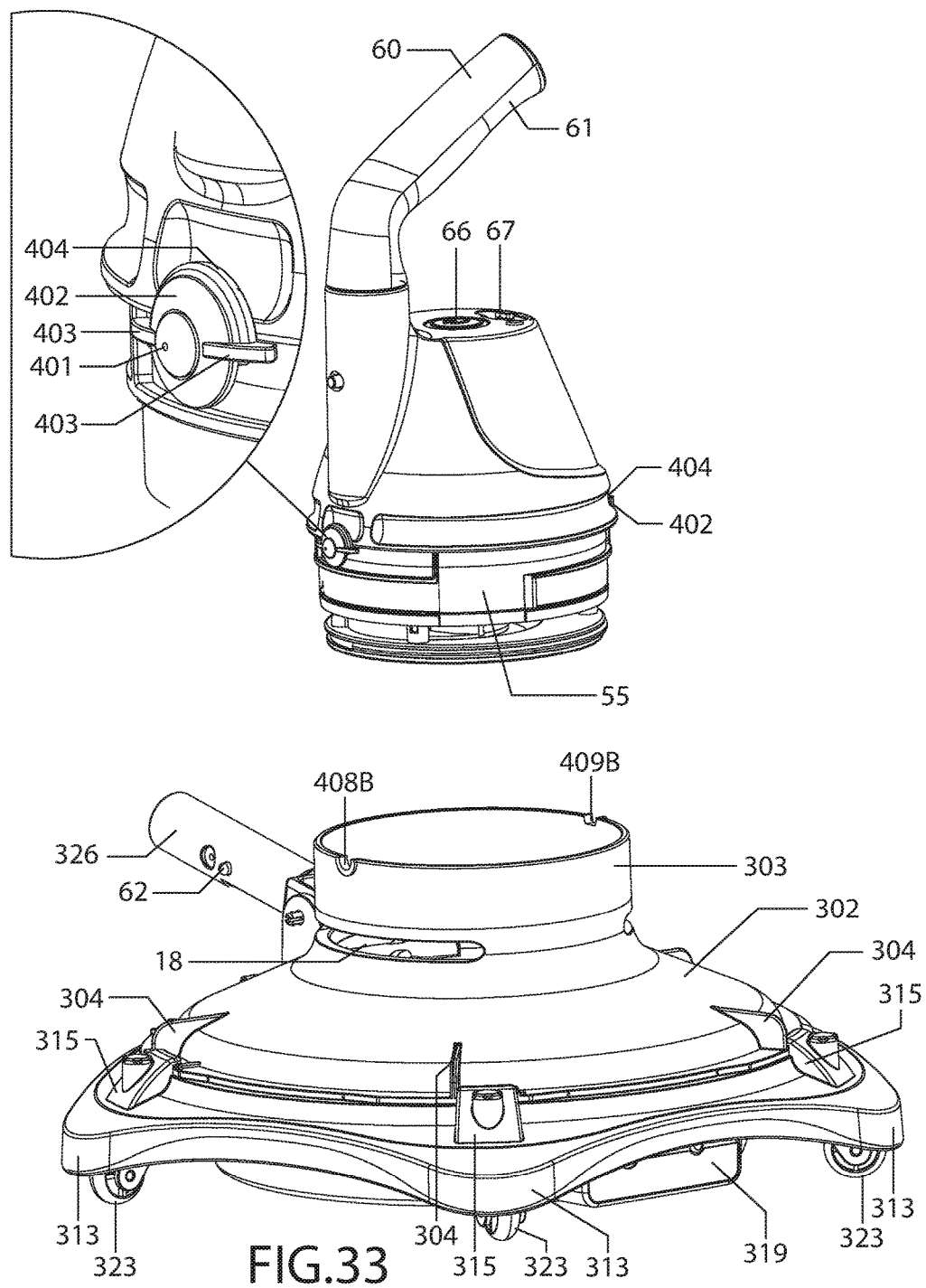
FIG. 33 is a detail exploded view of the second embodiment of the interface between a front body and a rear body of the second arrangement of the underwater cleaner, according to an aspect of the present disclosure.

FIG. 33 is a detail exploded view of the second embodiment of the interface between a front body and a rear body of the second arrangement of the underwater cleaner, according to an aspect of the present disclosure. As shown, the top cover extension 303 includes one or more respective engagement receiving surfaces, each being formed on the top cover extension 303 and each including a semi-circular ridge. The locking knobs 402 are configured to have a minimal profile so as not to interfere with operation of the cleaner as it is maneuvered about.

Figure 34:
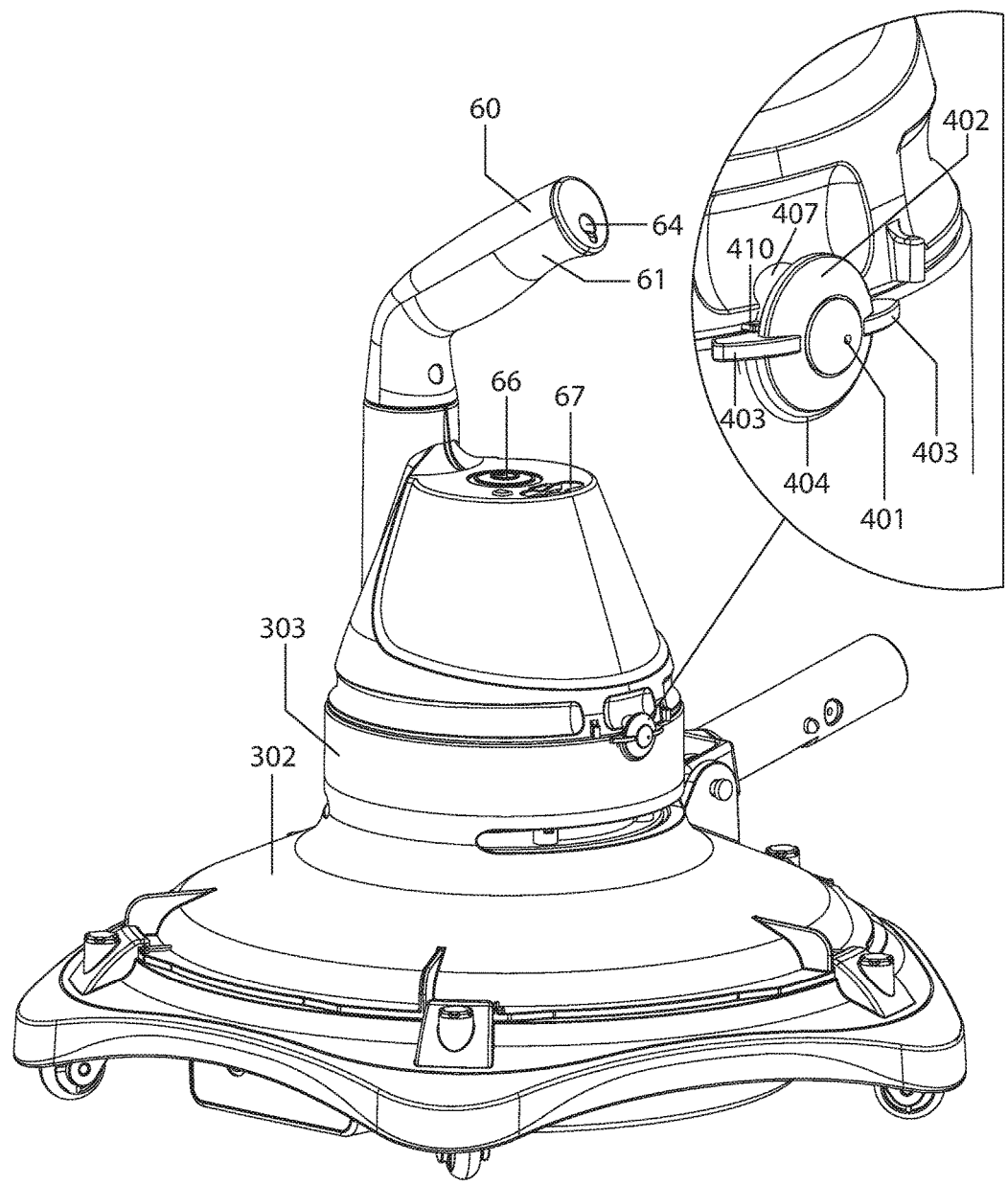
FIG. 34 is detail view of the second embodiment of the interface between a front body and a rear body of the second arrangement of the underwater cleaner, according to an aspect of the present disclosure.

FIG. 34 is detail view of the second embodiment of the interface between a front body and a rear body of the second arrangement of the underwater cleaner, according to an aspect of the present disclosure. As shown, the locking knob 402 has been rotated in a clockwise direction such that the locking knob flange 404 covers the a side locking arch 408B or 409B to secure the rear body 12 to the top cover extension 303.

Accordingly, the present disclosure enables an underwater cleaner including modular system that would allow a user to use a single motor housing with multiple front end heads or bodies using an interface to secure a front body onto a rear body. This modularity allows the cleaning of both large and small areas with a single rear body. In the first arrangement described, smaller areas such as steps and hot tubs would be easier to clean. In the second arrangement described, large surface areas would be easier to clean. Further, disclosure enables a fully and easily removable filter which is free from any attachment to the rear body. Additionally, charging operations are provided with plug-in contacts without the need for any hooks, brackets, or plug covers.

Although the underwater cleaner has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, an underwater cleaning apparatus includes a front body having a filter, a rear body removably attachable to the front body, the rear body including a motor having a shaft, an impeller configured to draw in water through an inlet opening in the front body, and a gap, the impeller being positioned in the gap in the rear body. The apparatus also includes a lock configured to secure the rear body to the front body, a battery configured to supply electrical power to the motor to drive the shaft, and a power switch configured to control the supply of electrical power to the motor.

According to another aspect of the present disclosure, the front body includes a cone-shaped housing having a first end configured to engage the rear body and a second end including the inlet opening, at least a part of the cone-shaped housing extending over at least a part of the gap in the rear body.

According to another aspect of the present disclosure, the gap is formed by a main chamber portion spaced apart from a plate.

According to another aspect of the present disclosure, the apparatus includes a ribbed structure within the cone-shaped housing adapted to support a material configured to filter particulate from the water.

According to another aspect of the present disclosure, the apparatus includes a drain channel configured to guide water filtered by the filter to a drain opening at a front end of the front body.

According to another aspect of the present disclosure, the apparatus includes a plug at a front end of the front body, the plug held in a closed position during a driving operation of the impeller by the motor via a suction force created by rotation of the impeller, and movable to an open position when the impeller is idle, and a housing with which the plug is moveably retained.

According to another aspect of the present disclosure, the ribbed structure is removably attachable to the cone-shaped housing.

According to another aspect of the present disclosure, the apparatus includes a slot opening in the cone-shaped housing to discharge water that passes through the gap in the rear body.

According to another aspect of the present disclosure, the slot and the gap are coaxially aligned to facilitate the flow of the water through the gap and through the slot.

According to another aspect of the present disclosure, the rear body also includes a sealing plate circumferentially adjacent to the impeller, in which the sealing plate includes a hole to allow a suction force generated by the impeller to extend therethrough; and a notch configured to accommodate a flexible ring configured to create a sealed watertight cavity between the rear body and the front body.

According to another aspect of the present disclosure, the front body includes a cover including a cap having a first end with a first radius removably attachable to the rear body and a second end with a second radius larger than the first radius; a handle attachment bracket; a filter support; a main body; and a plurality of wheels supported by the main body.

According to another aspect of the present disclosure, the apparatus includes a slot in the cap, in which the slot and the gap are coaxially aligned to facilitate the flow of the water through the gap and through the slot.

According to another aspect of the present disclosure, the apparatus includes a main body cover configured to retain a weight in the main body.

According to another aspect of the present disclosure, the inlet opening of the front body is configured to receive a cleaning attachment.

According to another aspect of the present disclosure, the rear body includes a double wall hull.

According to another aspect of the present disclosure, the lock includes a circumferential channel on one of the rear body and the front body configured to engage a surface on the other of the rear body and the front body, in order to secure the rear body to the front body when the circumferential channel and the surface are aligned and one of the rear body and the front body are rotated with respect to the other of the rear body and the front body.

According to another aspect of the present disclosure, the lock includes a flange extending from a rotatable knob on one of the rear body and the front body and an arcuate notch on the other of the rear body and the front body, in order to secure the rear body to the front body when the flange is rotated from a first position in which the flange does not contact the arcuate notch to a second position in which the flange contacts the arcuate notch.

According to another aspect of the present disclosure, the lock includes an engagement surface on one of the rear body and the front body configured to engage an engagement receiving surface on the other of the rear body and the front body when the engagement surface on one of the rear body and the front body is rotated with respect to the engagement receiving surface on the other of the rear body and the front body.

According to another aspect of the present disclosure, the filter includes a base having a y-shaped support rib at a proximal end.

According to yet another aspect of the present disclosure, a rear body and a front body are removably attachable to the rear body, in which the rear body includes a main body, a sealing plate having an aperture, a gap between the main body portion and the sealing plate, an impeller positioned within the gap, and a lock configured to hold the front body to the rear body. The front body includes a filter removably attachable to a front end of the front body and spaced from the rear body to create a space between the rear body and one end of the filter.

According to another aspect of the present disclosure, at least a part of the front body extends over the gap in the rear body.

According to another aspect of the present disclosure, the front body includes a slot that coincides with the gap in the rear body.

According to another aspect of the present disclosure, the main body includes an indicator regarding a positioning of the cover.

According to another aspect of the present disclosure, the filter is removably attachable to only a front end of the front body.

According to another aspect of the present disclosure the filter is removably attachable to only a front end of the front body.

According to another aspect of the present disclosure, the rear body includes a double wall hull.

According to another aspect of the present disclosure, the lock includes a circumferential channel on one of the rear body and the front body configured to engage a surface on the other of the rear body and the front body, in order to secure the rear body to the front body when the circumferential channel and the surface are aligned and one of the rear body and the front body are rotated with respect to the other of the rear body and the front body.

According to another aspect of the present disclosure, the lock includes a flange extending from a rotatable knob on one of the rear body and the front body and an arcuate notch on the other of the rear body and the front body, in order to secure the rear body to the front body when the flange is rotated from a first position in which the flange does not contact the arcuate notch to a second position in which the flange contacts the arcuate notch.

According to another aspect of the present disclosure, the lock includes an engagement surface on one of the rear body and the front body configured to engage an engagement receiving surface on the other of the rear body and the front body when the engagement surface on one of the rear body and the front body is rotated with respect to the engagement receiving surface on the other of the rear body and the front body.

According to another aspect of the present disclosure, the filter includes a base having a y-shaped support rib at a proximal end.

According to yet another aspect of the present disclosure, an underwater cleaning apparatus includes a rear body attachable to a front body having a removable filter, in which the rear body includes a motor, an impeller driven by a shaft and configured to draw in water through an inlet opening in the front body, a lock configured to attach the rear body to the front body, a rechargeable battery configured to supply electrical power to the motor to drive the impeller, a charging socket on a rear of the rear body, the charging socket including a pair of contacts disposed within charging holes in the rear of the rear body, the pair of contacts being configured for electrical communication with a pair of charging pins of a removably attachable charger to charge the rechargeable battery, in which the pair of charging pins are configured to hold the charger to the rear body; and a power switch.

According to another aspect of the present disclosure the rear body includes a double wall hull.

According to another aspect of the present disclosure, the lock includes a circumferential channel on one of the rear body and the front body configured to engage a surface on the other of the rear body and the front body, in order to secure the rear body to the front body when the circumferential channel and the surface are aligned and one of the rear body and the front body are rotated with respect to the other of the rear body and the front body.

According to another aspect of the present disclosure, the lock includes a flange extending from a rotatable knob on one of the rear body and the front body and an arcuate notch on the other of the rear body and the front body, in order to secure the rear body to the front body when the flange is rotated from a first position in which the flange does not contact the arcuate notch to a second position in which the flange contacts the arcuate notch.

According to another aspect of the present disclosure, the lock includes an engagement surface on one of the rear body and the front body configured to engage an engagement receiving surface on the other of the rear body and the front body when the engagement surface on one of the rear body and the front body is rotated with respect to the engagement receiving surface on the other of the rear body and the front body.

According to another aspect of the present disclosure, the removable filter includes a base having a y-shaped support rib at a proximal end.

According to another aspect of the present disclosure, each distal end of the y-shaped support rib includes an arcuate circumferential support, in which a gap exists between each of the arcuate circumferential supports, and in which each of the gaps is longer than each of the arcuate circumferential supports.

According to another aspect of the present disclosure, the removable filter includes a circular skeletal frame having a plurality of radial supports, the round frame having a distal end opening and a proximal end opening, in which the proximal end opening has a smaller diameter than the distal end opening; and a plurality of tabs arranged about the proximal end opening and extending in a direction of the rear body.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An underwater cleaning apparatus comprising:
   a front body having a filter;
   a rear body removably attachable to the front body, the rear body comprising a motor having a shaft, an impeller configured to draw in water through an inlet opening in the front body, and a gap, the impeller being positioned in the gap in the rear body;
   a lock configured to secure the rear body to the front body;
   a battery configured to supply electrical power to the motor to drive the shaft; and
   a power switch configured to control the supply of electrical power to the motor,
   wherein the filter comprises a base having a y-shaped support rib at a proximal end.

2. The underwater cleaning apparatus according to claim 1, the front body comprising:
a cone-shaped housing having a first end configured to engage the rear body and a second end including the inlet opening, at least a part of the cone-shaped housing extending over at least a part of the gap in the rear body.

3. The underwater cleaning apparatus according to claim 2, further comprising:
a ribbed structure within the cone-shaped housing adapted to support a material configured to filter particulate from the water.

4. The underwater cleaning apparatus according to claim 3, further comprising:
a drain channel configured to guide water filtered by the filter to a drain opening at a front end of the front body.

5. The underwater cleaning apparatus according to claim 3, further comprising:
a plug at a front end of the front body, the plug held in a closed position during a driving operation of the impeller by the motor via a suction force created by rotation of the impeller, and movable to an open position when the impeller is idle; and
a housing with which the plug is moveably retained.

6. The underwater cleaning apparatus according to claim 3, wherein the ribbed structure is removably attachable to the cone-shaped housing.

7. The underwater cleaning apparatus according to claim 2, further comprising a slot opening in the cone-shaped housing to discharge water that passes through the gap in the rear body.

8. The underwater cleaning apparatus according to claim 7, wherein the slot and the gap are coaxially aligned to facilitate the flow of the water through the gap and through the slot.

9. The underwater cleaning apparatus according to claim 1, wherein the gap is formed by a main chamber portion spaced apart from a plate.

10. The underwater cleaning apparatus according to claim 1, the rear body further comprising:
a sealing plate circumferentially adjacent to the impeller, the sealing plate comprising:
a hole to allow a suction force generated by the impeller to extend therethrough; and
a notch configured to accommodate a flexible ring configured to create a sealed watertight cavity between the rear body and the front body.

11. The underwater cleaning apparatus according to claim 1, wherein the inlet opening of the front body is configured to receive a cleaning attachment.

12. The underwater cleaning apparatus according to claim 1, wherein the rear body comprises a double wall hull.

13. The underwater cleaning apparatus according to claim 1, wherein the lock comprises a circumferential channel on one of the rear body and the front body configured to engage a surface on the other of the rear body and the front body, in order to secure the rear body to the front body when the circumferential channel and the surface are aligned and one of the rear body and the front body are rotated with respect to the other of the rear body and the front body.

14. The underwater cleaning apparatus according to claim 1, wherein the lock comprises an engagement surface on one of the rear body and the front body configured to engage an engagement receiving surface on the other of the rear body and the front body when the engagement surface on one of the rear body and the front body is rotated with respect to the engagement receiving surface on the other of the rear body and the front body.

15. An underwater cleaning apparatus comprising:
a front body having a filter;
a rear body removably attachable to the front body, the rear body comprising a motor having a shaft, an impeller configured to draw in water through an inlet opening in the front body, and a gap, the impeller being positioned in the gap in the rear body;
a lock configured to secure the rear body to the front body;
a battery configured to supply electrical power to the motor to drive the shaft;
a power switch configured to control the supply of electrical power to the motor;
a cover comprising a cap having a first end with a first radius removably attachable to the rear body and a second end with a second radius larger than the first radius;
a handle attachment bracket;
a filter support;
a main body; and
a plurality of wheels supported by the main body.

16. The underwater cleaning apparatus according to claim 15, further comprising a slot in the cap, wherein the slot and the gap are coaxially aligned to facilitate the flow of the water through the gap and through the slot.

17. The underwater cleaning apparatus according to claim 15, further comprising a main body cover configured to retain a weight in the main body.

18. An underwater cleaning apparatus comprising:
a front body having a filter;
a rear body removably attachable to the front body, the rear body comprising a motor having a shaft, an impeller configured to draw in water through an inlet opening in the front body, and a gap, the impeller being positioned in the gap in the rear body;
a lock configured to secure the rear body to the front body;
a battery configured to supply electrical power to the motor to drive the shaft; and
a power switch configured to control the supply of electrical power to the motor,
wherein the lock comprises a flange extending from a rotatable knob on one of the rear body and the front body and an arcuate notch on the other of the rear body and the front body, in order to secure the rear body to the front body when the flange is rotated from a first position in which the flange does not contact the arcuate notch to a second position in which the flange contacts the arcuate notch.

19. The underwater cleaning apparatus according to claim 18, wherein the filter comprises a base having a y-shaped support rib at a proximal end.

20. An underwater cleaning apparatus comprising:
a rear body and a front body removably attachable to the rear body;
the rear body comprising:
a main body;
a sealing plate having an aperture;
a gap between the main body portion and the sealing plate;
an impeller positioned within the gap; and
a lock configured to hold the front body to the rear body;
the front body comprising:
a filter removably attachable to a front end of the front body and spaced from the rear body to create a space between the rear body and one end of the filter, wherein the filter comprises a base having a y-shaped support rib at a proximal end.

21. The underwater cleaning apparatus according to claim 20, wherein at least a part of the front body extends over the gap in the rear body.

22. The underwater cleaning apparatus according to claim 21, wherein the front body comprises a slot that coincides with the gap in the rear body.

23. The underwater cleaning apparatus according to claim 20, the main body further comprising a cover and an indicator regarding a positioning of the cover.

24. The underwater cleaning apparatus according to claim 20, wherein the filter is removably attachable to only a front end of the front body.

25. The underwater cleaning apparatus according to claim 20, wherein the filter is removably fixed to only a front end of the front body.

26. The underwater cleaning apparatus according to claim 20, wherein the rear body comprises a double wall hull.

27. The underwater cleaning apparatus according to claim 20, wherein the lock comprises a circumferential channel on one of the rear body and the front body configured to engage a surface on the other of the rear body and the front body, in order to secure the rear body to the front body when the circumferential channel and the surface are aligned and one of the rear body and the front body are rotated with respect to the other of the rear body and the front body.

28. The underwater cleaning apparatus according to claim 20, wherein the lock comprises an engagement surface on one of the rear body and the front body configured to engage an engagement receiving surface on the other of the rear body and the front body when the engagement surface on one of the rear body and the front body is rotated with respect to the engagement receiving surface on the other of the rear body and the front body.

29. An underwater cleaning apparatus comprising:
a rear body and a front body removably attachable to the rear body;
the rear body comprising:
a main body;
a sealing plate having an aperture;
a gap between the main body portion and the sealing plate;
an impeller positioned within the gap; and
a lock configured to hold the front body to the rear body;
the front body comprising:
a filter removably attachable to a front end of the front body and spaced from the rear body to create a space between the rear body and one end of the filter,
wherein the lock comprises a flange extending from a rotatable knob on one of the rear body and the front body and an arcuate notch on the other of the rear body and the front body, in order to secure the rear body to the front body when the flange is rotated from a first position in which the flange does not contact the arcuate notch to a second position in which the flange contacts the arcuate notch.

30. The underwater cleaning apparatus according to claim 29, wherein the filter comprises a base having a y-shaped support rib at a proximal end.

31. An underwater cleaning apparatus comprising:
a rear body attachable to a front body having a removable filter, the rear body comprising:
a motor;
an impeller driven by a shaft and configured to draw in water through an inlet opening in the front body;
a lock configured to attach the rear body to the front body;
a rechargeable battery configured to supply electrical power to the motor to drive the impeller;
a charging socket on a rear of the rear body, the charging socket comprising a pair of contacts disposed within charging holes in the rear of the rear body, the pair of contacts being configured for electrical communication with a pair of charging pins of a removably attachable charger to charge the rechargeable battery, wherein the pair of charging pins are configured to hold the charger to the rear body; and
a power switch,
wherein the removable filter comprises a base having a y-shaped support rib at a proximal end.

32. The underwater cleaning apparatus according to claim 31, wherein the rear body comprises a double wall hull.

33. The underwater cleaning apparatus according to claim 31, wherein the lock comprises a circumferential channel on one of the rear body and the front body configured to engage a surface on the other of the rear body and the front body, in order to secure the rear body to the front body when the circumferential channel and the surface are aligned and one of the rear body and the front body are rotated with respect to the other of the rear body and the front body.

34. The underwater cleaning apparatus according to claim 31, wherein the lock comprises an engagement surface on one of the rear body and the front body configured to engage an engagement receiving surface on the other of the rear body and the front body when the engagement surface on one of the rear body and the front body is rotated with respect to the engagement receiving surface on the other of the rear body and the front body.

35. The underwater cleaning apparatus according to claim 31, where the removable filter comprises:
a circular skeletal frame having a plurality of radial supports, the round frame having a distal end opening and a proximal end opening, in which the proximal end opening has a smaller diameter than the distal end opening; and
a plurality of tabs arranged about the proximal end opening and extending in a direction of the rear body.

36. An underwater cleaning apparatus comprising:
a rear body attachable to a front body having a removable filter, the rear body comprising:
a motor;
an impeller driven by a shaft and configured to draw in water through an inlet opening in the front body;
a lock configured to attach the rear body to the front body;
a rechargeable battery configured to supply electrical power to the motor to drive the impeller;
a charging socket on a rear of the rear body, the charging socket comprising a pair of contacts disposed within charging holes in the rear of the rear body, the pair of contacts being configured for electrical communication with a pair of charging pins of a removably attachable charger to charge the rechargeable battery, wherein the pair of charging pins are configured to hold the charger to the rear body; and
a power switch,
wherein the lock comprises a flange extending from a rotatable knob on one of the rear body and the front body and an arcuate notch on the other of the rear body and the front body, in order to secure the rear body to the front body when the flange is rotated from a first position in which the flange does not contact the arcuate notch to a second position in which the flange contacts the arcuate notch.

37. The underwater cleaning apparatus according to claim 36, wherein the removable filter comprises a base having a y-shaped support rib at a proximal end.

38. The underwater cleaning apparatus according to claim 37,
- wherein each distal end of the y-shaped support rib includes an arcuate circumferential support, wherein a gap exists between each of the arcuate circumferential supports, and
- wherein each of the gaps is longer than each of the arcuate circumferential supports.

* * * * *